United States Patent
Tasaka et al.

(10) Patent No.: US 11,680,722 B2
(45) Date of Patent: Jun. 20, 2023

(54) DEVICE CONTROL SYSTEM

(71) Applicant: Daikin Industries, LTD., Osaka (JP)

(72) Inventors: Akio Tasaka, Osaka (JP); Tadashi Hirose, Osaka (JP); Yoshihiro Kitaura, Osaka (JP); Atsushi Matsubara, Osaka (JP); Kousuke Tsuboi, Osaka (JP); Shimei Tei, Osaka (JP); Naoko Kuriyama, Osaka (JP); Seiichi Sakai, Osaka (JP); Naoki Matsumura, Osaka (JP); Hisanori Ohshima, Osaka (JP); Naveen Gunturu, Osaka (JP); Toshiyuki Maeda, Osaka (JP); Tetsushi Tsuda, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 322 days.

(21) Appl. No.: 16/618,438

(22) PCT Filed: Jul. 13, 2018

(86) PCT No.: PCT/JP2018/026445
§ 371 (c)(1),
(2) Date: Dec. 2, 2019

(87) PCT Pub. No.: WO2019/013316
PCT Pub. Date: Jan. 17, 2019

(65) Prior Publication Data
US 2020/0232671 A1 Jul. 23, 2020

(30) Foreign Application Priority Data

Jul. 14, 2017 (JP) .............................. JP2017-138612
Jul. 14, 2017 (JP) .............................. JP2017-138613

(Continued)

(51) Int. Cl.
*F24F 11/56* (2018.01)
*F24F 11/46* (2018.01)
*G10L 15/30* (2013.01)

(52) U.S. Cl.
CPC .............. *F24F 11/56* (2018.01); *F24F 11/46* (2018.01); *G10L 15/30* (2013.01)

(58) Field of Classification Search
CPC ............ F24F 11/56; F24F 11/46; G10L 15/30
See application file for complete search history.

(56) References Cited

U.S. PATENT DOCUMENTS 6,469,751 B1 10/2002 Isobe et al.
8,078,318 B2 12/2011 Kumazawa et al.
(Continued)

FOREIGN PATENT DOCUMENTS

CN  103905871 A1  7/2014
EP  2 014 994 A2  1/2009
(Continued)

OTHER PUBLICATIONS

European Search Report of corresponding EP Application No. 18 831 931.3 dated Jul. 16, 2021.
(Continued)

*Primary Examiner* — Fan S Tsang
*Assistant Examiner* — David Siegel
(74) *Attorney, Agent, or Firm* — Global IP Counselors, LLP

(57) ABSTRACT

A setting facilitation apparatus (1400) includes a keyword input reception section (1410), a control command selection section (1420), and a specific control registration section (1430) and is used to facilitate setting of specific control in a control system (1001) that controls a control device through sound inputs. The keyword input reception section (1410) receives an input of information corresponding to a
(Continued)

keyword. The control command selection section (1420) displays a certain control command to the control device (1010, 1020) on an edit screen (G) and receives selection of the control command. The specific control registration section (1430) registers a keyword (K) input by the keyword input reception section (1410) and the control command selected by the control command selection section (1420) to a specific control (DB 1104T) while associating the keyword and the control command with each other.

7 Claims, 57 Drawing Sheets

(30) Foreign Application Priority Data

| | | |
|---|---|---|
| Jul. 14, 2017 | (JP) | JP2017-138624 |
| Jul. 14, 2017 | (JP) | JP2017-138625 |
| Jul. 14, 2017 | (JP) | JP2017-138626 |
| Jul. 14, 2017 | (JP) | JP2017-138627 |
| Nov. 2, 2017 | (JP) | JP2017-213117 |

(56) References Cited

U.S. PATENT DOCUMENTS

| | | | | |
|---|---|---|---|---|
| 8,108,218 | B1 * | 1/2012 | Huboi | G10L 15/22 704/251 |
| 2002/0161572 | A1 * | 10/2002 | Kusumoto | H04N 21/42203 348/E5.103 |
| 2012/0330469 | A1 | 12/2012 | Kinugasa et al. | |
| 2014/0136205 | A1 * | 5/2014 | Jang | H04N 21/4131 704/249 |
| 2015/0268648 | A1 | 9/2015 | Zhang et al. | |
| 2016/0089955 | A1 | 3/2016 | Ham | |
| 2016/0123617 | A1 | 5/2016 | Vega | |
| 2016/0156764 | A1 | 6/2016 | Mahasenan et al. | |
| 2016/0327921 | A1 | 11/2016 | Ribbich et al. | |
| 2016/0350193 | A1 | 12/2016 | Katou | |
| 2018/0073761 | A1 * | 3/2018 | Iuchi | G10L 15/22 |

FOREIGN PATENT DOCUMENTS

| | | | | |
|---|---|---|---|---|
| EP | 2014994 | A2 * | 1/2009 | F24D 19/1006 |
| EP | 2 725 817 | A1 | 4/2014 | |
| JP | 3-95348 | A | 4/1991 | |
| JP | 2552744 | B2 | 8/1996 | |
| JP | 2001-36981 | A | 2/2001 | |
| JP | 2001-197379 | A | 7/2001 | |
| JP | 2001-324202 | A | 11/2001 | |
| JP | 2002-287796 | A | 10/2002 | |
| JP | 2003-100471 | A | 4/2003 | |
| JP | 2003-111157 | A | 4/2003 | |
| JP | 2003-185221 | A | 7/2003 | |
| JP | 2004-185612 | A | 7/2004 | |
| JP | 2005-110218 | A | 4/2005 | |
| JP | 2005110218 | A * | 4/2005 | |
| JP | 2005-142905 | A | 6/2005 | |
| JP | 3827058 | B2 * | 9/2006 | |
| JP | 2006-308848 | A | 11/2006 | |
| JP | 2006-320621 | A | 11/2006 | |
| JP | 2006320621 | A * | 11/2006 | |
| JP | 2008-40726 | A | 2/2008 | |
| JP | 2009-228910 | A | 10/2009 | |
| JP | 2009-290967 | A | 12/2009 | |
| JP | 2010-181064 | A | 8/2010 | |
| JP | 2011-193577 | A | 9/2011 | |
| JP | 2013-130371 | A | 7/2013 | |
| JP | 2013-200080 | A | 10/2013 | |
| JP | 2013200080 | A * | 10/2013 | |
| JP | 2014-182583 | A | 9/2014 | |
| JP | 2015-108464 | A | 6/2015 | |
| JP | 2016-68929 | A | 5/2016 | |
| JP | 2016-200782 | A | 12/2016 | |
| JP | 2017-180943 | A | 10/2017 | |
| JP | 2018-136062 | A | 8/2018 | |
| WO | 2012/075485 | A1 | 6/2012 | |
| WO | WO-2012075485 | A1 * | 6/2012 | H04L 12/28 |
| WO | 2012/176690 | A1 | 12/2012 | |
| WO | 2016/157537 | A1 | 10/2016 | |
| WO | 2018/074224 | A1 | 4/2018 | |

OTHER PUBLICATIONS

International Preliminary Report of corresponding PCT Application No. PCT/JP2018/026445 dated Jan. 23, 2020.
International Search Report of corresponding PCT Application No. PCT/JP2018/026445 dated Oct. 16, 2018.
European Search Report of corresponding EP Application No. 22 163 667.3 dated Jun. 30, 2022.
European Search Report of corresponding EP Divisional Application No. 22 163 670.7 dated Jul. 1, 2022.
European Search Report of corresponding EP Divisional Application No. 22 164 015.4 dated Jul. 1, 2022.
European Search Report of corresponding EP Divisional Application No. 22 164 555.9 dated Jul. 1, 2022.
European Search Report of corresponding EP Divisional Application No. 22 163 669.9 dated Jul. 6, 2022.

* cited by examiner

| | |
|---|---|
| TARGET TEMPERATURE | XX °C |
| HEAT LOAD | XX kcal/h |
| HUMIDITY | XX % |
| WIND VOLUME | XX m3/h |
| WIND PRESSURE | XX Pa |
| ILLUMINANCE | XX lx |
| FRAGRANCE CODE | XX |
| NOISE LEVEL | XX dB |
| ... | ... |

FIG. 21

ANGER CATEGORY DB

| ANGER TERM W | SOUND VOLUME | ANGER CATEGORY | CONTROL CONTENT |
|---|---|---|---|
| TERM 1 "DON'T BE SILLY" | HIGH | ANGER CATEGORY 1 (INTENSE QUARREL) | CONTROL OPERATION a (DECREASE TEMPERATURE) + CONTROL OPERATION b (DECREASE HUMIDITY) + CONTROL OPERATION c (INCREASE WIND VOLUME) |
| | MODERATE | ANGER CATEGORY 1 (INTENSE QUARREL) | CONTROL OPERATION a (DECREASE TEMPERATURE) + CONTROL OPERATION b (DECREASE HUMIDITY) + CONTROL OPERATION c (INCREASE WIND VOLUME) |
| | LOW | ANGER CATEGORY 2 (SLIGHTLY INTENSE QUARREL) | CONTROL OPERATION b (DECREASE TEMPERATURE) + CONTROL OPERATION c (INCREASE WIND VOLUME) |
| TERM 2 "STUPID" | HIGH | ANGER CATEGORY 2 (SLIGHTLY INTENSE QUARREL) | CONTROL OPERATION b (DECREASE TEMPERATURE) + CONTROL OPERATION c (INCREASE WIND VOLUME) |
| | MODERATE | ANGER CATEGORY 2 (SLIGHTLY INTENSE QUARREL) | CONTROL OPERATION b (DECREASE TEMPERATURE) + CONTROL OPERATION c (INCREASE WIND VOLUME) |
| | LOW | ANGER CATEGORY 3 (MINOR QUARREL) | CONTROL OPERATION c (INCREASE WIND VOLUME) |
| ... | ... | ... | ... |

| TIME | DEVICE | INSTRUCTION/DETECTION |
|---|---|---|
| 2017/07/10 19:05 | LIGHTING DEVICE | TURN ON |
| 2017/07/10 19:06 | AIR CONDITIONER | START COOLING OPERATION |
| 2017/07/10 19:06 | AIR CONDITIONER | ROOM TEMPERATURE 30°C |
| 2017/07/10 19:10 | TELEVISION | POWER ON |
| 2017/07/10 19:11 | REFRIGERATOR | OPEN DOOR |
| 2017/07/10 19:12 | REFRIGERATOR | CLOSE DOOR |
| 2017/07/10 19:16 | AIR CONDITIONER | ROOM TEMPERATURE 25°C |
| ... | ... | ... |

FIG. 46

DEVICE CONTROL SYSTEM

TECHNICAL FIELD

The present invention relates to a device control system.

BACKGROUND ART

Various devices for making surrounding environments of users comfortable have been developed. Some of such devices recognize sounds uttered by users.

PTL 1 (Japanese Unexamined Patent Application Publication No. 2006-308848) discloses a technique for controlling a device on the basis of a sound uttered by a user.

PTL 2 (Japanese Patent No. 2552744) discloses a system capable of setting an environment of a bathroom for each user.

PTL 3 (Japanese Unexamined Patent Application Publication No. 2006-320621) discloses an air conditioner that emits a scent for reducing stress.

PTL 4 (Japanese Unexamined Patent Application Publication No. 2001-324202) discloses an air conditioner including sound input/output means.

PTL 5 (International Publication No. WO 2012/176690) discloses a configuration that estimates a user's degree of tolerance to "energy-saving automatic control" in order to achieve both comfort and reduction of power consumption.

PTL 6 (Japanese Unexamined Patent Application Publication No. 2009-290967) discloses a system that facilitates suppression of power consumption in a house.

PTL 7 (Japanese Unexamined Patent Application Publication No. 2010-181064) discloses an air conditioner that can be operated using sounds.

SUMMARY OF THE INVENTION

Technical Problem

When a plurality of devices are controlled through sound inputs, it might be cumbersome to control individual devices as necessary. Furthermore, it is difficult to reproduce, in another place, an environment of a place in which a user feels comfortable. Furthermore, conventional systems might not be able to calm down a person having a feeling of anger. Furthermore, the same user might feel differently about comfort of an environment. Furthermore, usability decreases when a user is asked to input his/her intention as to whether to permit reduction in power consumption. Furthermore, in the conventional systems, information regarding sequential operations of a plurality of devices is not used. Furthermore, the conventional systems do not sufficiently assume a case where a user owns a plurality of devices that can be operated using sounds. A first object is to provide a setting facilitation apparatus and a program for improving a user's convenience in a control system that controls devices through sound inputs.

A second object is to easily reproduce a user's favorite environment in another place.

A third object is to provide an air conditioning system capable of calming down a speaker.

A fourth object is to faithfully achieve a user's desire about control of an indoor environment.

A fifth object is to estimate, without a user operation, a user's degree of tolerance to reduction of power consumption of an air conditioner or the like and maintain comfort.

A sixth object is to provide comfort for a user by using information regarding sequential operations of a plurality of devices provided in a house.

A seventh object is to provide a device control system, a device controlled by the device control system, and a method for controlling the device, capable of stopping, through a simple operation, processes for recognizing a sound for a plurality of devices that can be operated using sounds.

Solution to Problem

[First Configuration]

A setting facilitation apparatus according to a first aspect is a setting facilitation apparatus that is used for a control system including a sound input reception unit which receives an input of a sound uttered by a user, a sound input analysis section which analyzes the sound, a control section which controls a control device on a basis of a result of the analysis conducted by the sound input analysis unit, and a specific control storage section which stores an input of a sound corresponding to a certain keyword and a certain type of control performed on the control device as specific control while associating the input of the sound and the certain type of control with each other and the setting facilitation apparatus facilitates setting of the specific control. Here, the setting facilitation apparatus includes a keyword input reception section, a control command selection section, and a specific control registration section. Here, the keyword input reception section receives an input of information corresponding to the keyword. The control command selection section displays a certain control command to the device on an edit screen and receives selection of the control command. The specific control registration section registers the keyword input by the keyword input reception section and the control command selected by the control command selection section to the specific control storage section while associating the keyword and the control command with each other.

Since the setting facilitation apparatus according to the first aspect can associate a keyword corresponding to a sound input and a control command to a device with each other on the edit screen, a user can easily set a control command in the control system that controls a device through a sound input. As a result, the user's convenience can be improved in the control system that controls a device through sound inputs.

A setting facilitation apparatus according to a second aspect is the setting facilitation apparatus according to the first aspect in which the control command selection section displays a plurality of the control commands on the edit screen in a pulldown format.

Since the control command selection section displays a plurality of the control commands on the edit screen in a pulldown format in the setting facilitation apparatus according to the second aspect, the user can set a control command by intuitively performing an operation.

A setting facilitation apparatus according to a third aspect is the setting facilitation apparatus according to the first or second aspect in which the specific control registration section associates a single keyword with a plurality of control commands.

Since the specific control registration section associates a single keyword with a plurality of control commands in the setting facilitation apparatus according to the third aspect, the user can set a control command by intuitively performing an operation.

A setting facilitation apparatus according to a fourth aspect is the setting facilitation apparatus according to any of the first to third aspects in which the keyword input reception section displays, on the edit screen, a keyword image in which a keyword can be input. In addition, the control command selection section displays a control command image corresponding to a control command on the edit screen. In addition, the specific control registration section associates the keyword and the control command with each other by specifying and moving the keyword image and the control command image and associating the keyword image and the control command image with each other on the edit screen.

Since the setting facilitation apparatus according to the fourth aspect has the above configuration, the user can set a control command by intuitively performing an operation.

A setting facilitation apparatus according to a fifth aspect is the setting facilitation apparatus according to any of the first to fourth aspects in which the specific control registration section registers specific control to the specific control storage section while associating the specific control with user information for identifying the user.

Since the specific control registration section registers specific control and user information while associating the specific control and the user information with each other in the setting facilitation apparatus according to the fifth aspect, specific control that suits each user's taste can be set.

A setting facilitation apparatus according to a sixth aspect is the setting facilitation apparatus according to any of the first to fifth aspects in which the specific control registration section registers specific control to the specific control storage section while associating the specific control with a voiceprint at a time when the user has read out a keyword.

Since the specific control registration section registers specific control and a voiceprint of the user at a time when the user has read a keyword to the specific control storage section while associating the specific control and the voiceprint with each other in the setting facilitation apparatus according to the sixth aspect, specific control controllable only by a user whose voiceprint has been registered can be set.

A program according to a seventh aspect is a program for achieving a setting facilitation apparatus that is used for a control system including a sound input reception unit which receives an input of a sound uttered by a user, a sound input analysis section which analyzes the sound, a control section which controls a control device on a basis of a result of the analysis conducted by the sound input analysis unit, and a specific control storage section which stores an input of a sound corresponding to a certain keyword and a certain type of control performed on the control device as specific control while associating the input of the sound and the certain type of control with each other and the program facilitates setting of the specific control. More specifically, the program according to the seventh aspect causes a computer to function as a keyword input reception section, a control command selection section, and a specific control registration section. Here, the keyword input reception section receives an input of information corresponding to the keyword. The control command selection section displays a certain control command to the control device on an edit screen and receives selection of the control command. The specific control registration section registers the keyword input by the keyword input reception section and the control command selected by the control command selection section to the specific control storage section while associating the keyword and the control command with each other.

Since a keyword corresponding to a sound input and a control command to a control device can be associated with each other on the edit screen using the computer in the program according to the seventh aspect, the user can easily set a control command in the control system that controls a control device through sound inputs. As a result, the user's convenience can be improved in the control system that controls a device through sound inputs.

[Second Configuration]

An environment control system according to an eighth aspect adjusts an environment using a target environment control device provided in a target space. The environment control system includes a device information obtaining unit, a storage unit, a calculation unit, and a control unit. The device information obtaining unit obtains information regarding the target environment control device. The storage unit stores a state of the environment to be achieved. The calculation unit calculates a control parameter of the target environment control device for achieving the state of the environment. The control unit controls the target environment control device on the basis of the control parameter.

With this configuration, the state of the environment stored in the storage unit is reproduced as an environment of the target space as a result of control based on the control parameter. A user's favorite environment can therefore be reproduced.

An environment control system according to a ninth aspect is the environment control system according to the eighth aspect in which the state of the environment is calculated by the calculation unit on the basis of information obtained by the device information obtaining unit from a reference environment control device or a reference environment sensor provided in a reference space, which is different from the target space.

With this configuration, a state of an environment is created on the basis of an environment of the reference space, and the state of the environment is reproduced in the target space. The environment of the reference space can therefore be reproduced in the target space.

An environment control system according to the tenth aspect is the environment control system according to the ninth aspect further including an input unit that receives an input from a user and an instruction extraction unit that extracts an instruction from the input. If the instruction extraction unit extracts the instruction to reproduce the state of the environment, the control unit controls the target environment control device on the basis of the control parameter calculated to achieve the state of the environment.

With this configuration, when an instruction to reproduce a state of an environment is received, the control unit controls the target environment control device in accordance with the state of the environment. The user's favorite environment can therefore be reproduced in accordance with the instruction given by the user.

An environment control system according to an eleventh aspect is the environment control system according to the tenth aspect further including an authentication unit that authenticates a user on the basis of an input. When the authentication unit authenticates the user as an authorized person, the control unit can control the target environment control device.

This configuration enables the user to control the environment control device if the user is authenticated as an authorized person. Since an unauthorized person cannot control the environment control device, security can be easily secured.

An environment control system according to a twelfth aspect is the environment control system according to any one of the ninth to eleventh aspects in which the target environment control device and the reference environment control device both include an air conditioner.

In this configuration, the environment control devices in the reference space and the target space both include an air conditioner. Air conditioning that affects the user's comfort can therefore be reproduced in the target space.

An environment control system according to a thirteenth aspect is the environment control system according to any one of the ninth to twelfth aspects in which the storage unit is configured to update the state of the environment to a value calculated by the calculation unit on the basis of information obtained by the device information obtaining unit from the target environment control device or a target environment sensor provided in the target space.

With this configuration, the state of the environment stored in the storage unit can be updated using the environment of the target space. If the user likes the environment of the target space, therefore, settings relating to the environment can be saved.

An environment control system according to a fourteenth aspect is the environment control system according to any one of the eighth to thirteenth aspects in which the state of the environment includes temperature.

In this configuration, the state of the environment includes temperature. The user's favorite temperature can therefore be reproduced in the target space.

An environment control system according to a fifteenth aspect is the environment control system according to any one of the eighth to fourteenth aspects in which the state of the environment includes wind volume.

In this configuration, the state of the environment includes wind volume. The user's favorite wind volume can therefore be reproduced in the target space.

An environment control system according to a sixteenth aspect is the environment control system according to any one of the eighth to fifteenth aspects in which the state of the environment includes humidity.

In this configuration, the state of the environment includes humidity. The user's favorite humidity can therefore be reproduced in the target space.

An environment control system according to a seventeenth aspect is the environment control system according to any one of the eighth to sixteenth aspects in which the state of the environment includes illuminance. The target environment control device includes a lighting device.

In this configuration, the state of the environment includes illuminance. The user's favorite illuminance can therefore be reproduced in the target space.

An environment control system according to an eighteenth aspect is the environment control system according to any one of the eighth to seventeenth aspects in which the state of the environment includes fragrance. The target environment control device includes a fragrance generation device.

In this configuration, the state of the environment includes fragrance. The user's favorite fragrance can therefore be reproduced in the target space.

[Third Configuration]

An air conditioning system according to a nineteenth aspect includes a conditioned-air blowout unit, a sound detection unit, a sound input analysis unit, a determination unit, and a control unit. The conditioned-air blowout unit blows out conditioned air to a target space. The sound detection unit detects a sound uttered by a speaker present in the target space. The sound analysis unit analyzes an input sound and converts the input sound into verbal information. The determination unit determines whether the verbal information obtained as a result of the analysis conducted by the sound input analysis unit includes a certain anger term. If the determination unit determines that the verbal information includes the anger term, the control unit controls a state of the conditioned air.

Since the state of the conditioned air is controlled in the air conditioning system according to the nineteenth aspect if the verbal information obtained as a result of the analysis conducted by the sound input analysis unit includes the certain anger term, the speaker can be calmed down.

An air conditioning system according to a twentieth aspect is the air conditioning system according to the nineteenth aspect in which, if it is determined that the anger term is included, the control unit controls the state of the conditioned air on the basis of the anger term and the volume of the sound uttered by the speaker.

Since the state of the conditioned air is controlled in consideration of not only the anger term but also the volume of the sound uttered by the speaker in the air conditioning system according to the twentieth aspect, the control can be performed more precisely in accordance with the speaker's anger.

An air conditioning system according to a twenty-first aspect is the air conditioning system according to the twentieth aspect further including an anger category storage unit that stores an anger term, a sound volume, and an anger category while associating the anger term and the sound volume with the anger category. With this configuration, an air conditioning system capable of performing control according to the anger category can be achieved.

An air conditioning system according to a twenty-second aspect is the air conditioning system according to any of the nineteenth to twenty-first aspects further including a position identification unit that identifies a position of the speaker. If it is determined that the anger term is included, the control unit controls the state of the conditioned air in accordance with the position of the speaker.

In the air conditioning system according to the twenty-second aspect, the conditioned air can be precisely controlled in accordance with the position of the speaker. An air conditioning system capable of performing fine control in accordance with the anger category, for example, can be provided.

An air conditioning system according to a twenty-third aspect is the air conditioning system according to any of the nineteenth to twenty-second aspects further including a sound output unit that, if it is determined that the anger term is included, outputs a sound of a sentence for reducing anger.

Since the conditioned air is controlled and the sound of the sentence for reducing anger is output in the air conditioning system according to the twenty-third aspect, an effect of calming down the speaker can be enhanced.

An air conditioning system according to a twenty-fourth aspect is the air conditioning system according to any of the nineteenth to twenty-third aspects further including an air conditioning apparatus and an information processing apparatus capable of communicating with the air conditioning apparatus through a network. The air conditioning apparatus includes the conditioned-air blowout unit, the sound detection unit, and the control unit. The information processing apparatus includes the sound input analysis unit and the determination unit.

The air conditioning system according to the twenty-fourth aspect can be constructed using the information processing apparatus in the network using the above configuration. More specifically, a sound analysis can be accurately conducted using the information processing apparatus that achieves a neural network or the like constructed in the network. As a result, the accuracy of analyzing a sound input can be increased, and the reliability of the system can be increased.

[Fourth Configuration]

An indoor environment control system according to a twenty-fifth aspect includes a storage unit, a detection unit, an indoor environment control device, an output unit, and an input unit. The storage unit stores a set value of an indoor environment. The detection unit detects a state value of the indoor environment. The indoor environment control device adjusts the indoor environment in accordance with the set value. If the state value detected by the detection unit reaches the set value, the output unit outputs a message for asking a user whether to accept the state value. The input unit obtains an answer of the user to the message.

This configuration enables the user to feed back his/her desire to the indoor environment control system through the input unit as to whether to accept an environment in which the set temperature has been achieved or further change indoor temperature. The user's satisfaction at the control of the indoor environment therefore improves.

An indoor environment control system according to a twenty-sixth aspect is the indoor environment control system according to the twenty-fifth aspect further including a control unit. The control unit repeats, until the user accepts a latest state value, a process in which the set value is changed, the indoor environment control device is controlled such that the state value detected by the detection unit reaches the set value, and the output unit outputs the message for asking the user whether to accept the state value detected by the detection unit.

In this configuration, the indoor environment control system repeats the control of the indoor environment and the asking of a question to the user until the user accepts. The user's satisfaction at the control of the indoor environment therefore further improves.

An indoor environment control system according to a twenty-seventh aspect is the indoor environment control system according to the twenty-fifth or twenty-sixth aspect in which the indoor environment control device is an air conditioner. The set value is a set temperature. The set value is an indoor temperature.

In this configuration, the indoor environment control device is an air conditioner. The user's satisfaction at the indoor temperature therefore improves.

An indoor environment control system according to a twenty-eighth aspect is the indoor environment control system according to the twenty-fifth or twenty-sixth aspect in which the indoor environment control device is a humidifier. The set value is a set humidity. The state value is an indoor humidity.

In this configuration, the indoor environment control device is a humidifier. The user's satisfaction at the indoor humidity therefore improves.

An indoor environment control system according to a twenty-ninth aspect is the indoor environment control system according to the twenty-fifth or twenty-sixth aspect in which the indoor environment control device is a lighting device. The set value is a set illuminance. The state value is an indoor illuminance.

In this configuration, the indoor environment control device is a lighting device. The user's satisfaction at the indoor illuminance therefore improves.

An indoor environment control system according to a thirtieth aspect is the indoor environment control system according to any of the twenty-fifth to twenty-ninth aspects in which the input unit is a sound input unit that obtains sound data from the user's voice. The indoor environment control system further includes a text extraction unit that extracts text from the sound data and an interpretation unit that extracts the user's instruction by interpreting the text.

In this configuration, the input unit receives the user's voice. Since the user can verbally give an instruction to the indoor environment control system, operation is easy.

An indoor environment control system according to a thirty-first aspect is the indoor environment control system according to the thirtieth aspect in which at least either the text extraction unit or the interpretation unit is connected to the indoor environment control device through a network.

In this configuration, at least either the text extraction unit or the interpretation unit is provided at a place distant from the indoor environment control device. The indoor environment control device, therefore, need not bear high processing capacity.

An indoor environment control system according to a thirty-second aspect is the indoor environment control system according to the thirtieth or thirty-first aspects further including a user identification unit that extracts a voiceprint from the sound data and identifies a plurality of users on the basis of the voiceprint. The storage unit stores each user and a record of a set value for the user while associating the user and the record with each other. The indoor environment control system handles a record of a set value corresponding to a user identified by the user identification unit as the set value.

In this configuration, the user identification unit identifies a user from a voiceprint. The indoor environment can therefore reflect an optimal set value for each user.

An indoor environment control system according to a thirty-third aspect is the indoor environment control system according to the thirty-second aspect in which the record of the set value stored in the storage unit is updated on the basis of acceptance of a user identified by the user identification unit.

This configuration enables each of the plurality of users to update the set value optimal for himself/herself. Each user's satisfaction therefore further improves.

[Fifth Configuration]

An air conditioning management system according to a thirty-fourth aspect includes an air conditioner, a sound input unit, a state extraction unit, a determination unit, and a control unit. The sound input unit obtains a sound uttered by a user. The state extraction unit extracts a state of the user from the sound. The determination unit determines whether to perform an energy-saving operation on the basis of the state of the user. The control unit performs the energy-saving operation in accordance with the determination made by the determination unit.

In this configuration, the determination unit automatically determines whether to perform the energy-saving operation. As a result, a burden on the user that would otherwise be caused by a determination is reduced.

An air conditioning management system according to a thirty-fifth aspect includes an air conditioner, an image input unit, a state extraction unit, a determination unit, and a control unit. The image input unit obtains an image or a moving image of a user. The state extraction unit extracts a state of the user from the image or the moving image. The determination unit determines, on the basis of the state of the user, whether to perform an energy-saving operation. The control unit performs the energy-saving operation in accordance with the determination made by the determination unit.

In this configuration, the determination unit automatically determines whether to perform the energy-saving operation. As a result, a burden on the user that would otherwise be caused by a determination is reduced.

An air conditioning management system according to a thirty-sixth aspect is the air conditioning management system according to the thirty-fourth aspect in which the state is the user's feeling obtained from the sound. If the feeling is positive, the determination unit determines that the energy-saving operation is to be performed. If the feeling is negative, the determination unit determines that the energy-saving operation is not to be performed.

With this configuration, if there is a user having a negative feeling, the energy-saving operation is not performed. As a result, an operation that takes into consideration the user having a negative feeling is performed.

An air conditioning management system according to a thirty-seventh aspect is the air conditioning management system according to the thirty-fifth aspect in which the state is the user's feeling obtained from the image or the moving image. If the feeling is positive, the determination unit determines that the energy-saving operation is to be performed. If the feeling is negative, the determination unit determines that the energy-saving operation is not to be performed.

With this configuration, if there is a user having a negative feeling, the energy-saving operation is not performed. As a result, an operation that takes into consideration the user having a negative feeling is performed.

An air conditioning management system according to a thirty-eighth aspect is the air conditioning management system according to any of the thirty-fourth to thirty-seventh aspects in which the energy-saving operation includes decreasing the capacity of the air conditioner.

With this configuration, the capacity of the air conditioner decreases during the energy-saving operation. As a result, the power consumption of the air conditioner is reduced.

An air conditioning management system according to a thirty-ninth aspect is the air conditioning management system according to any of the thirty-fourth to thirty-seventh aspects in which the energy-saving operation includes accepting a suppression request from a power company.

In this configuration, the energy-saving operation includes accepting a suppression request from a power company. Since acceptance or refusal is automatically determined on the basis of the state of the user, a burden on the user is reduced.

[Sixth Configuration]

A home system according to a fortieth aspect includes an input unit, a clock unit, a recording unit, a control unit, and a pattern extraction unit. The input unit receives an instruction from a user. The clock unit obtains a time point. The recording unit records a log in which the time point and the instruction are associated with each other. The control unit controls a plurality of devices in accordance with the instruction. The pattern extraction unit extracts, by analyzing the log, a sequential instruction pattern including a plurality of instructions given to the plurality of devices within a certain time difference.

With this configuration, a characteristic sequential instruction pattern can be obtained. As a result, the home system can learn a control pattern that the user will likely feel comfortable with.

A home system according to a forty-first aspect is the home system according to the fortieth aspect further including a prediction unit that predicts, on the basis of the extracted sequential instruction pattern, an instruction that the user will likely give.

In this configuration, the prediction unit predicts, on the basis of the sequential instruction pattern, a type of control that the user will likely perform on a device next. As a result, the home system can learn a next type of control that the user will likely feel comfortable with.

A home system according to a forty-second aspect is the home system according to the forty-first aspect further including an output unit that outputs a message. The control unit causes, on the basis of the prediction, the output unit to output a message for notifying the user of the instruction that the user will likely give.

In this configuration, a message output unit notifies the user of a type of control that the user might likely to perform on a device next. As a result, the user can be kept from forgetting performing a device operation for making the user feel comfortable.

A home system according to a forty-third aspect is the home system according to the forty-first aspect in which the control unit causes, on the basis of the prediction, at least one of the plurality of devices to execute the instruction that the user will likely give.

In this configuration, the message output unit notifies the user of a type of control that the user might like to perform on a device next. As a result, the user can be kept from forgetting performing a device operation for making the user feel comfortable.

A home system according to a forty-fourth aspect is the home system according to any one of the fortieth to forty-third aspects in which the input unit is a sound input unit that obtains sound data from the user's voice. The home system further includes a text extraction unit that extracts text from the sound data and an interpretation unit that extracts an instruction from the user by interpreting the text.

This configuration enables the user to verbally give an instruction. The user can therefore easily operate the home system.

A home system according to a forty-fifth aspect is the home system according to any one of the fortieth to forty-fourth aspects in which the plurality of devices include an air conditioner.

In this configuration, the home system controls the air conditioner. As a result, the home system can achieve a temperature and the like that the user feels comfortable with.

[Seventh Configuration]

A device control system according to a forty-sixth aspect controls a first device and a second device. The first device includes a first sound input unit and transmits sound data regarding a sound received by the first sound input unit. The second device includes a second sound input unit and transmits sound data regarding a sound received by the second sound input unit. The device control system includes a first sound data reception unit, a second sound data reception unit, a first sound analysis unit, a second sound analysis unit, a detection unit, and a stop determination unit. The first sound data reception unit receives the sound data transmitted from the first device. The second sound data reception unit receives the sound data transmitted from the second device. The first sound analysis unit analyzes the sound data received by the first sound data reception unit. The second sound analysis unit analyzes the sound data received by the second sound data reception unit. The detection unit detects that the first device has received an instruction to stop a first function, which is at least a part of functions relating to sound recognition processing, in which the first sound input unit receives a sound, sound data regarding the received sound is transmitted, the first sound data reception unit receives the transmitted sound data, and the first sound analysis unit is caused to analyze the received sound data. If the detection unit detects that the first device has received the instruction to stop the first function, the stop determination unit determines to stop a second function, which is at least a part of functions relating to sound recognition processing corresponding to the second device, in which the second sound input unit receives a sound, sound data regarding the received sound is transmitted, the second sound data reception unit receives the transmitted sound data, and the second sound analysis unit is caused to analyze the received sound data.

In the device control system, if the first device receives an instruction to stop the first function, which is at least a part of the functions relating to the sound recognition processing, the second function, which is at least a part of the functions relating to the sound recognition processing corresponding to the second device, is to be stopped. In other words, in the device control system, if the user stops the sound recognition processing corresponding to the first device, the sound recognition processing corresponding to the second device is also stopped. When the device control system is used, therefore, processes for recognizing a sound corresponding to a plurality of devices need not be individually stopped and can be stopped through a simple operation.

A device control system according to a forty-seventh aspect is the device control system according to the forty-sixth aspect in which the second function is a function of receiving a sound executed by the second sound input unit or a function of transmitting sound data executed by the second device.

Since the second device does not transmit sound data here, problems such as those of privacy and interception of sound data that would otherwise be caused when sound data is transmitted tend to be prevented.

A device control system according to a forty-eighth aspect is the device control system according to the forty-seventh aspect further includes a stop request unit. The stop request unit transmits a signal for requesting a stop of the second function to the second device in accordance with the determination made by the stop determination unit.

Since the second device is directly instructed to stop the second function in the second device here, the sound recognition processing corresponding to the second device can be reliably stopped.

A device control system according to a forty-ninth aspect is the device control system according to the forty-sixth aspect in which the second function is a function of receiving, with the second sound data reception unit, sound data transmitted from the second device, a function of analyzing, with the second sound analysis unit, sound data transmitted from the second device, or a function of accumulating sound data transmitted from the second device.

Here, the sound recognition processing corresponding to the second device can be stopped only by a process performed by the device control system.

A device control system according to a fiftieth aspect is the device control system according to any one of the forty-sixth to forty-ninth aspects in which the second function is of the same type as that of the first function.

Here, if a function relating to the sound recognition processing regarding the first device is stopped, a function of the same type relating to the sound recognition processing regarding the second device can be stopped. As a result, both the first and second devices enter a state desired by the user with respect to the processes for recognizing a sound.

A device control system according to a fifty-first aspect is the device control system according to any one of the forty-sixth to fiftieth aspects in which the second device further includes a notification unit that notifies a user that the second function has been stopped. In addition, the device control system preferably further includes a stop information transmission unit. If the stop determination unit determines that the second function is to be stopped, the stop information transmission unit transmits function stop information to the second device so that the notification unit notifies the user of the stop of the second function.

Here, if the user stops the sound recognition processing corresponding to the first device, the user can confirm that the sound recognition processing corresponding to the second device has also been stopped.

A device control system according to a fifty-second aspect is the device control system according to any of the forty-sixth to fifty-first aspects further includes an identification unit that identifies devices associated with the first device. If the detection unit detects that the first device has received an instruction to stop the first function and the devices determined by the identification unit to be associated with the first device include the second device, the stop determination unit determines that the second function is to be stopped for the second device.

Here, the sound recognition processing regarding the second device associated with the first device can be stopped along with the sound recognition processing regarding the first device. Conversely, if it is determined that the first device and the second device are not associated with each other, the sound recognition processing regarding the second device remains enabled even if the sound recognition processing regarding the first device is stopped.

A device control system according to a fifty-third aspect is the device control system according to any one of the forty-sixth to fifty-second aspects in which the instruction to stop the first function received by the first device includes any of an instruction to a physical switch, an instruction given using a remote control, and a verbal instruction to the first sound input unit.

A device control system according to a fifty-fourth aspect is the device control system according to any one of the forty-sixth to fifty-third aspects in which the detection unit further detects that the first device has received an instruction to start the first function. The device control system preferably further includes a start determination unit. If the detection unit detects that the first device has received an instruction to start the first function, the start determination unit determines that the second device is to start the second function.

Here, if the first device receives an instruction to start (resume) the first function relating to the sound recognition processing corresponding thereto, the second function relating to the sound recognition processing corresponding to the second device is also started (resumed). In other words, in the device control system, the user can enable the sound recognition processing regarding the second device by enabling the sound recognition processing regarding the first device. By using the device control system, processes for recognizing a sound regarding a plurality of devices need not be individually enabled and can be started through a simple operation.

A device according to a fifty-fifth aspect is a device that can be operated using sounds. The device includes a sound input unit, a sound data transmission unit, an instruction reception unit, and a stop information reception unit. The sound input unit receives a sound. The sound data transmission unit transmits the sound received by the sound input unit as sound data to a device control system including a sound analysis unit. The instruction reception unit receives an instruction to stop at least a part of functions relating to a sound recognition processing, in which the sound input unit receives a sound, the sound data transmission unit transmits sound data, and the sound analysis unit of the device control system is caused to analyze the transmitted sound data. The stop information reception unit receives function stop information, which is transmitted from the device control system, regarding a determination of a stop of at least a part of the functions relating to the sound recognition processing corresponding to the device according to a stop of at least a part of functions relating to sound recognition processing corresponding to another device that can be operated using sounds.

With the device, the sound recognition processing corresponding to the device can be stopped in accordance with an instruction from the user, and the sound recognition processing corresponding to the device can be stopped in accordance with a stop of sound recognition processing corresponding to another device. When the device is used, therefore, processes for recognizing a sound corresponding to a plurality of devices need not be individually stopped and can be stopped through a simple operation.

A device according to a fifty-sixth aspect is the device according to the fifty-fifth aspect in which the instruction reception unit is a physical switch.

Since a function relating to the sound recognition processing is stopped using the physical switch in the device, the sound recognition processing can be reliably stopped.

A control method according to a fifty-seventh aspect is a method for controlling a first device and a second device. The first device includes a first sound input unit and a first sound data transmission unit. The first sound data transmission unit transmits first sound data regarding a sound received by the first sound input unit to the device control system. The device control system includes a first sound data reception unit that receives the first sound data and a first sound analysis unit that analyzes the first sound data received by the first sound data reception unit. The second device includes a second sound input unit and a second sound data transmission unit. The second sound data transmission unit transmits second sound data regarding a sound received by the second sound input unit to the device control system. The device control system further includes a second sound data reception unit that receives the second sound data and a second sound analysis unit that analyzes the second sound data received by the second sound data reception unit. The control method includes a detection step and a determination step. In the detection step, it is detected that the first device has received an instruction to stop a first function, which is at least a part of functions relating to sound recognition processing corresponding thereto, in which the first sound input unit receives a first sound, the first sound data transmission unit transmits first sound data, the first sound data reception unit receives the transmitted first sound data, and the first sound analysis unit is caused to analyze the received first sound data. In the determination step, if it is detected that the first device has received an instruction to stop the first function, it is determined to stop a second function, which is at least a part of functions relating to sound recognition processing corresponding to the second device, in which the second sound input unit receives a second sound, the second sound data transmission unit transmits second sound data, the second sound data reception unit receives the transmitted second sound data, and the second sound analysis unit is caused to analyze the received second sound data.

In the control method, if it is detected that the first device has received an instruction to stop the first function, which is at least a part of the functions relating to the sound recognition processing corresponding thereto, it is determined that the second function, which is at least a part of the functions relating to the sound recognition processing corresponding to the second device, is also to be stopped. When the control method is used, therefore, processes for recognizing a sound corresponding to a plurality of devices need not be individually stopped and can be stopped through a simple operation.

BRIEF DESCRIPTION OF THE DRAWINGS

[First Configuration]

[Second Configuration]

Figure 17:
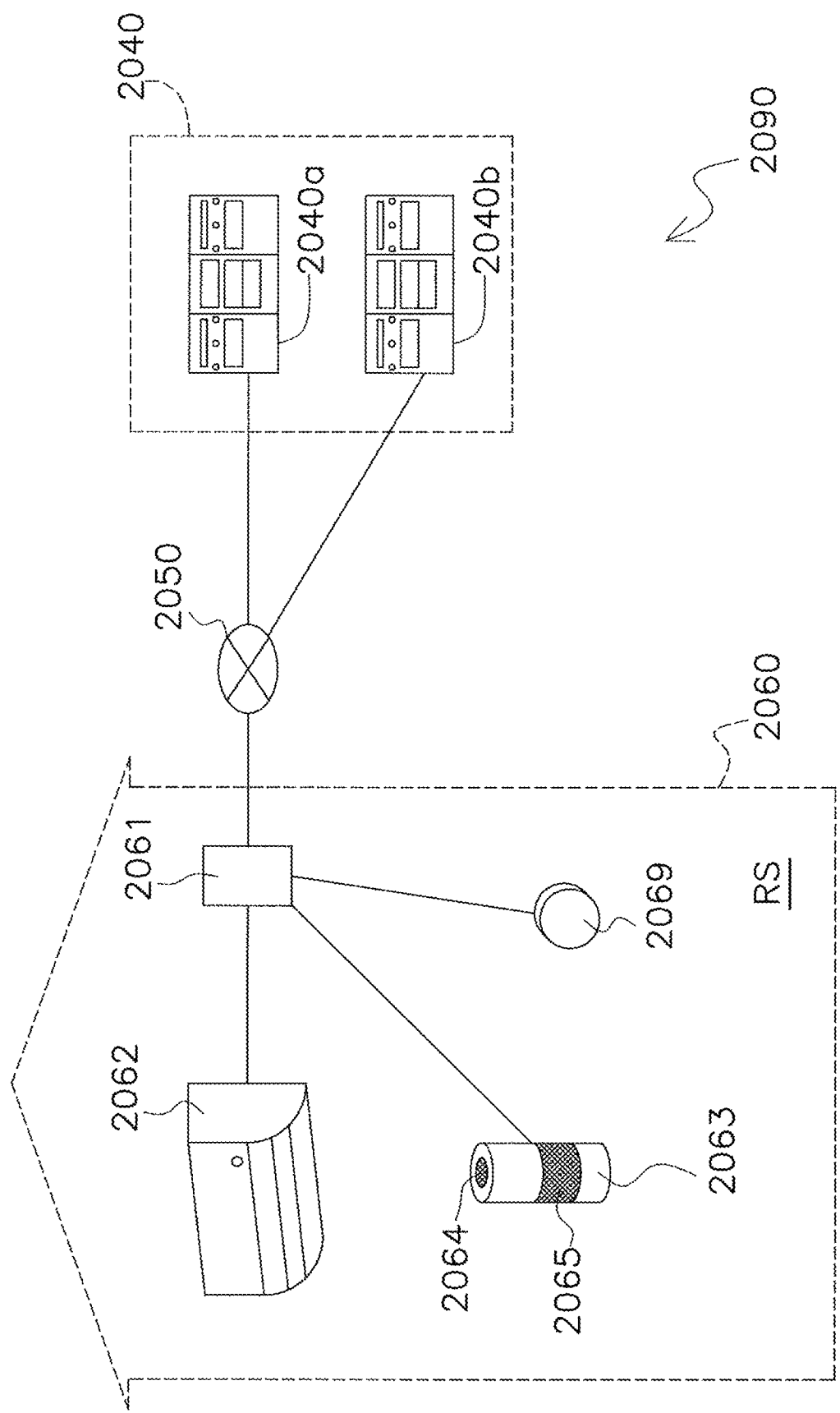

FIG. 17 is a schematic diagram illustrating an environment control system 2090 according to an embodiment of a second configuration.

Figure 18:
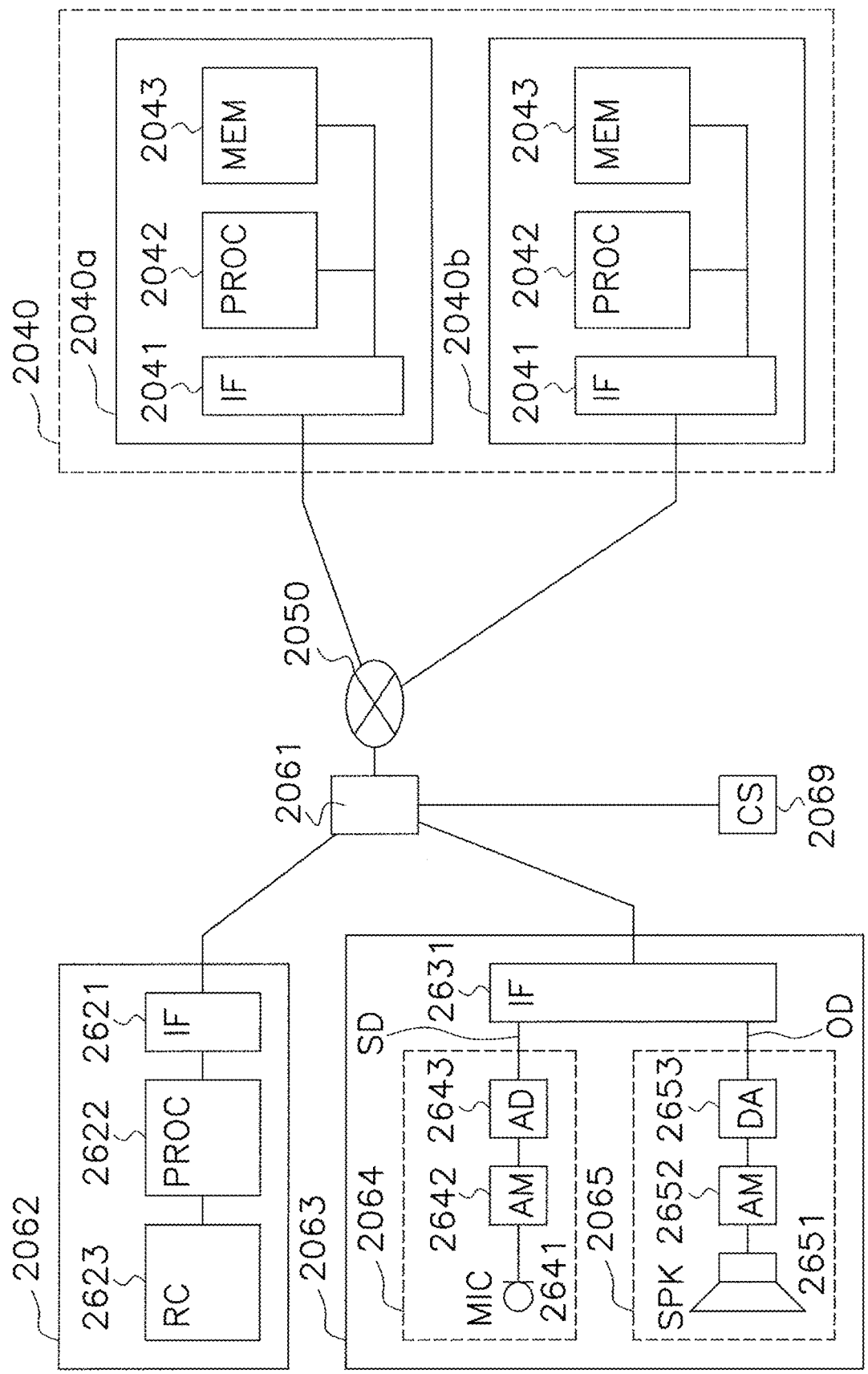

FIG. 18 is a block diagram illustrating the configuration of the environment control system 2090.

Figure 19:
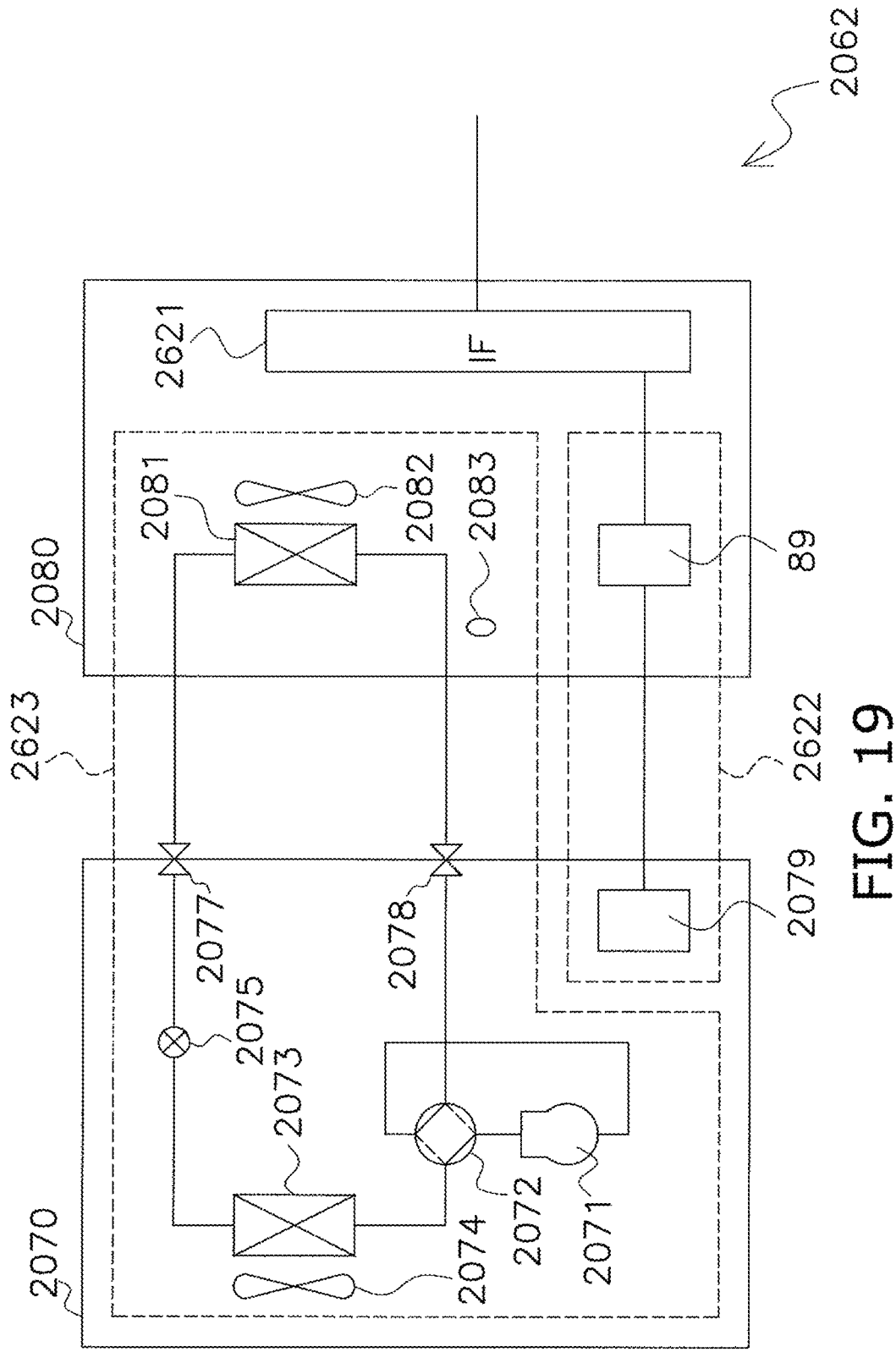

FIG. 19 is a detailed block diagram illustrating a reference environment control device 2062.

Figure 20:
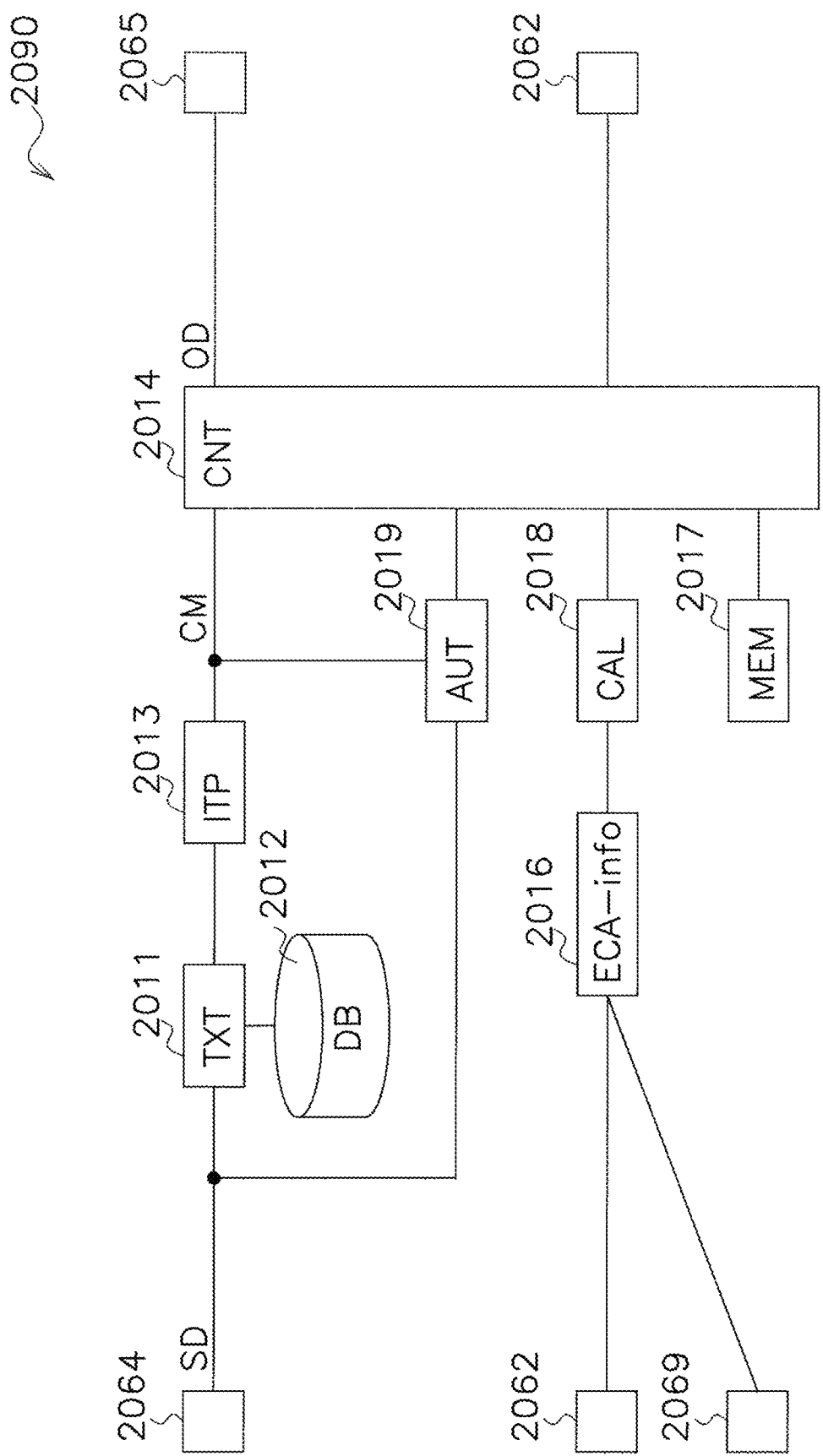

FIG. 20 is a block diagram illustrating functions of the environment control system 2090.

FIG. 21 illustrates an example of a state of an environment saved in a storage unit 2017.

Figure 22:
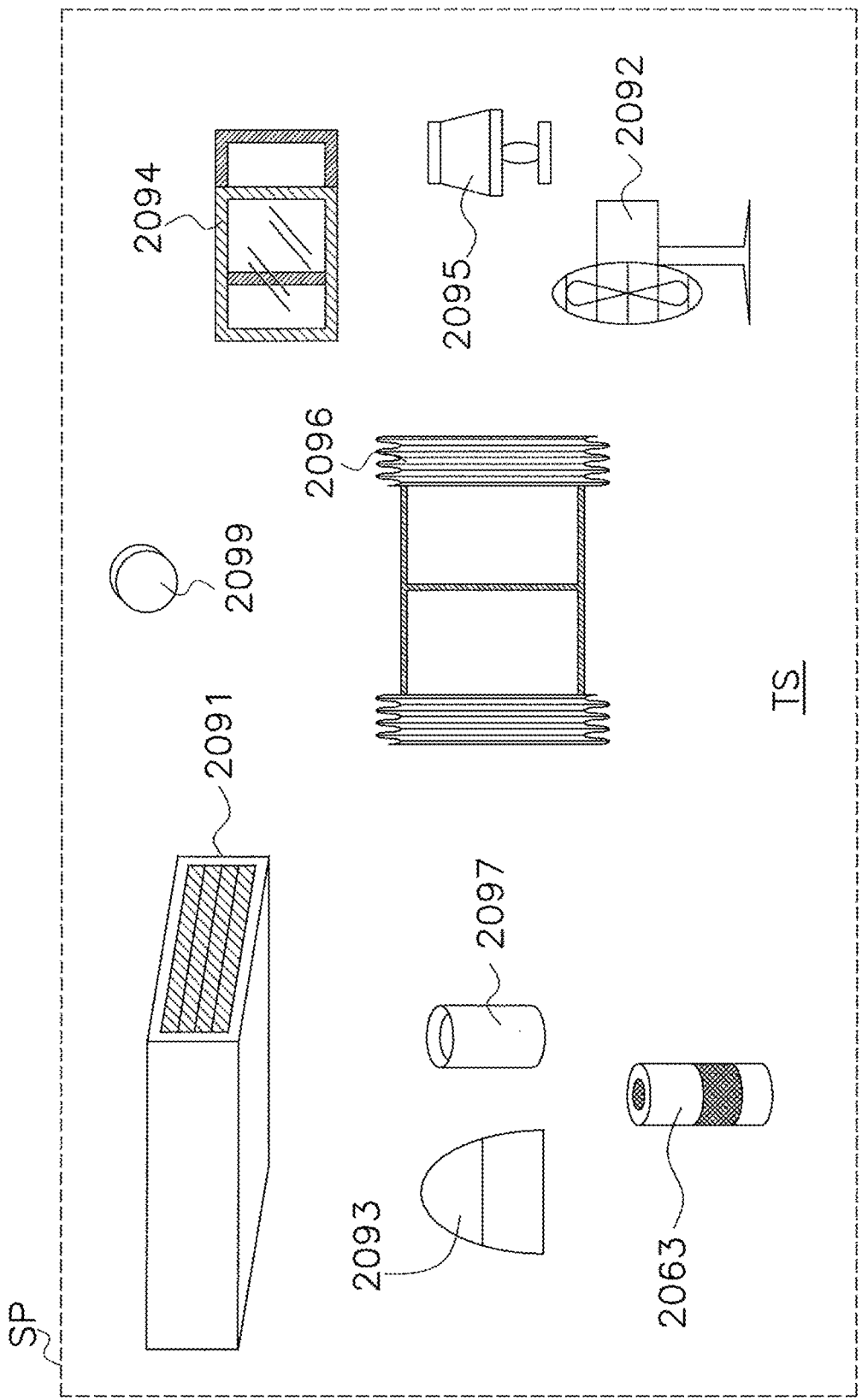

FIG. 22 is a diagram illustrating a target space TS in which the state of the environment is reproduced.

Figure 23:
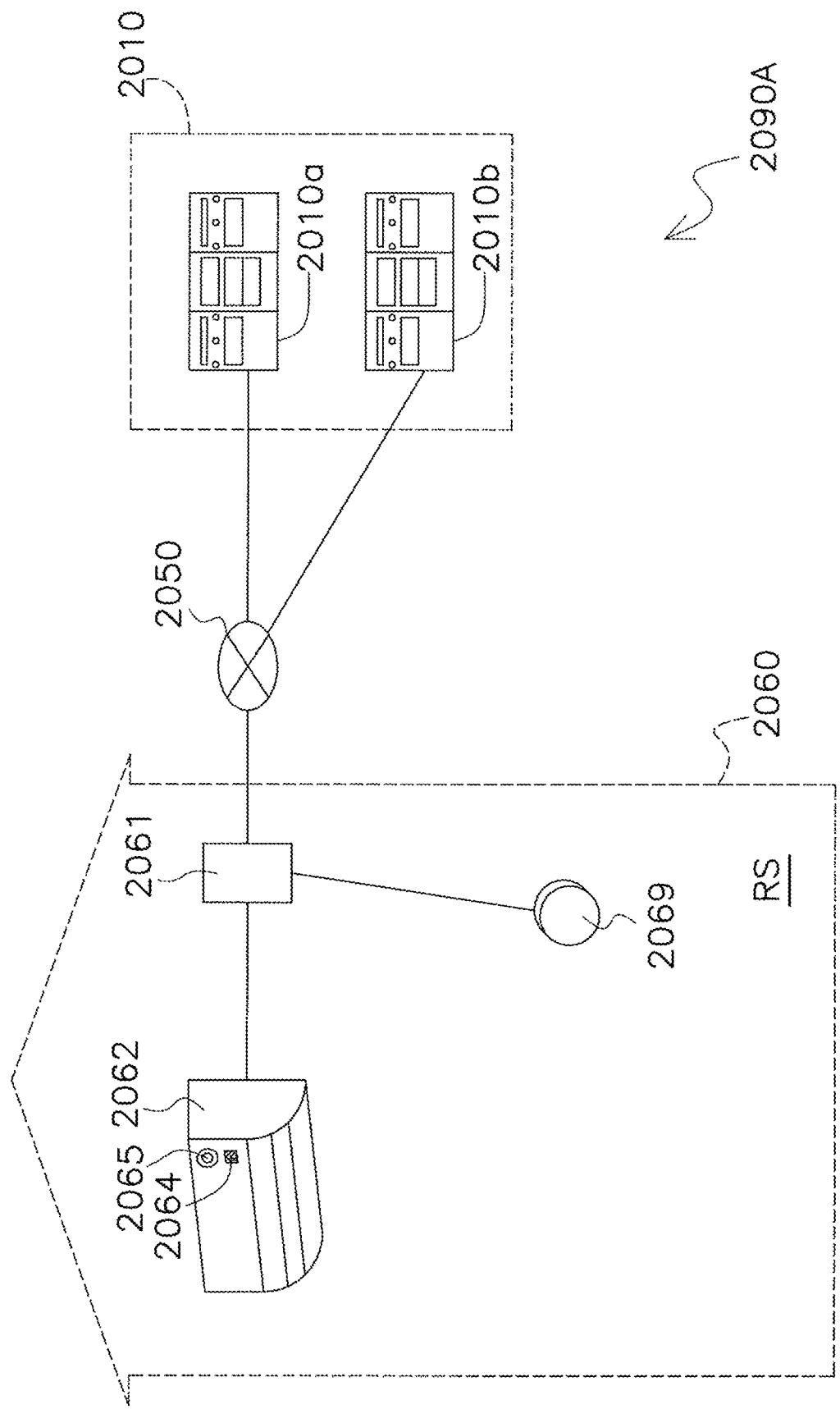

FIG. 23 is a schematic diagram illustrating an environment control system 2090A according to a first modification.

Figure 24:
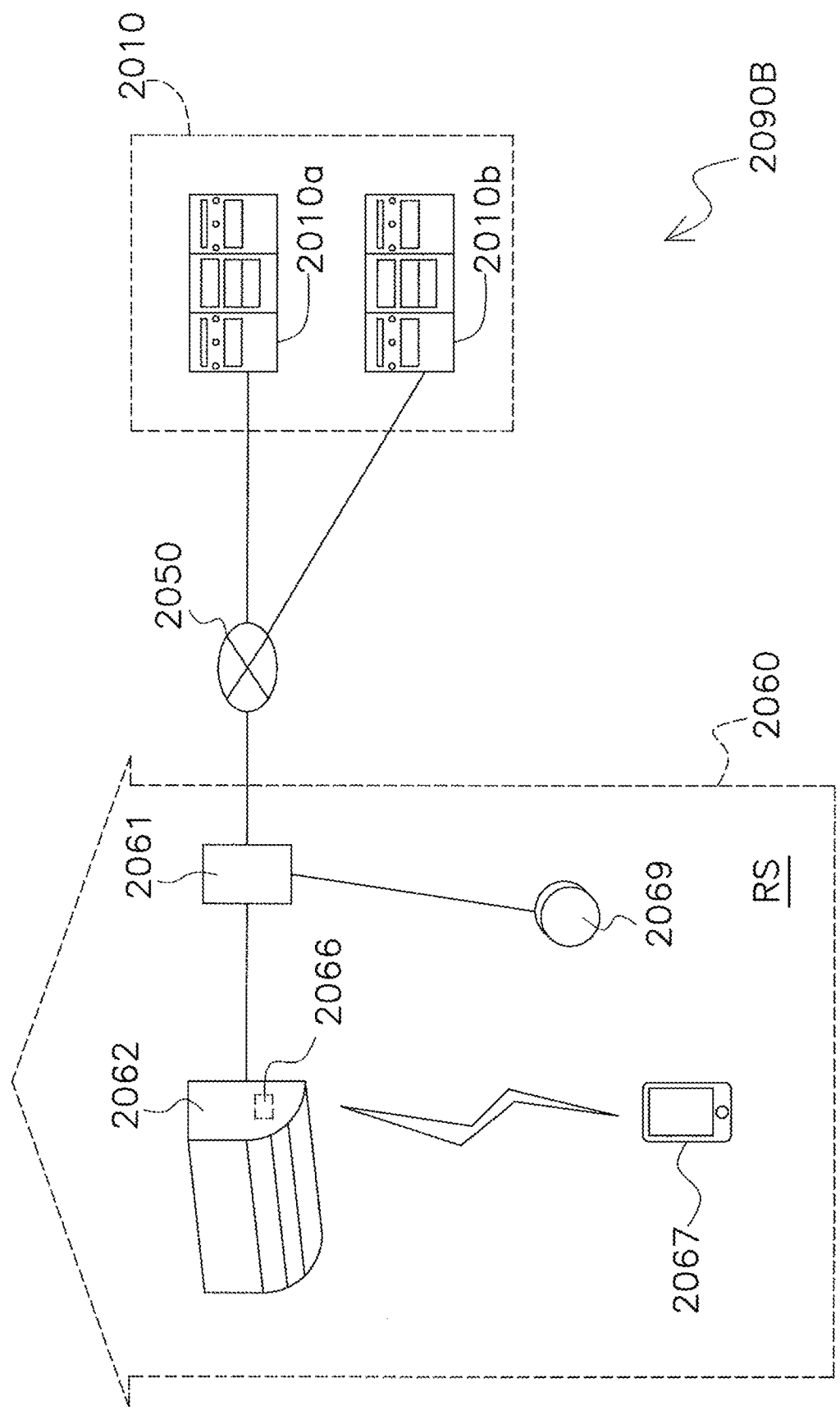

FIG. 24 is a schematic diagram illustrating an environment control system 2090B according to a second modification.

[Third Configuration]

Figure 25:
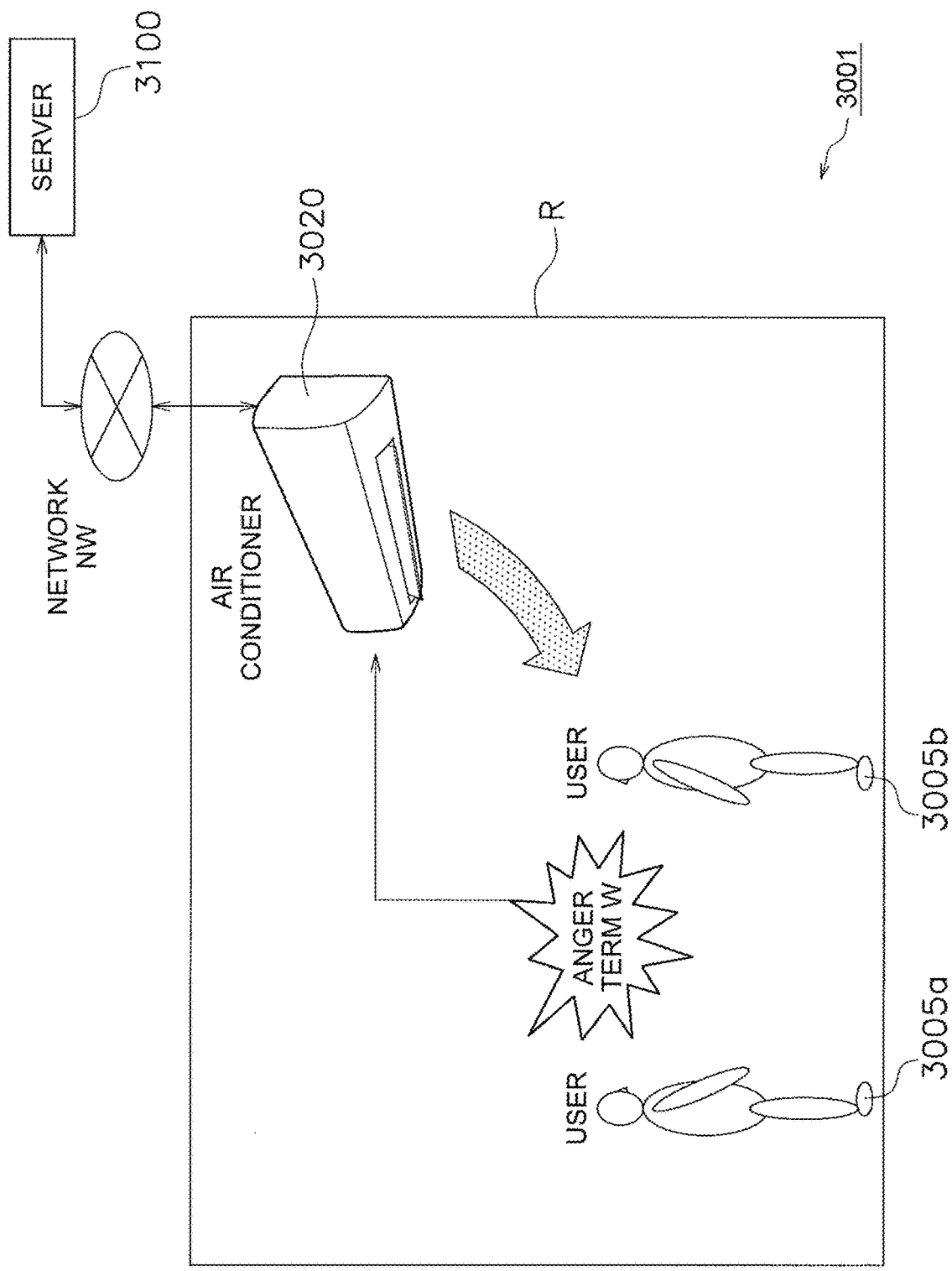

FIG. 25 is a schematic diagram illustrating a concept of an air conditioning system 3001 according to an embodiment of a third configuration.

Figure 26:
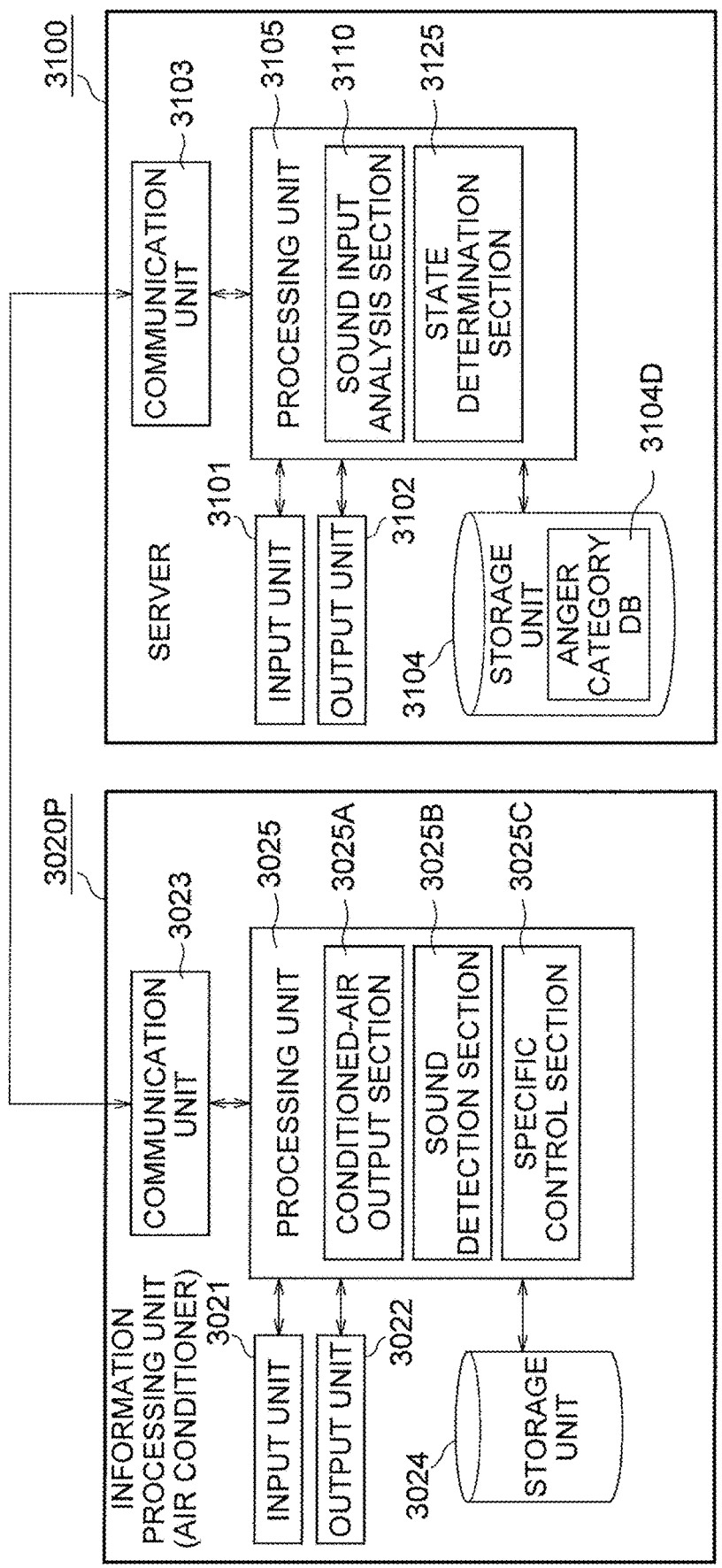

FIG. 26 is a schematic diagram illustrating the configuration of an information processing unit 3020P and a server 100 according to the embodiment.

FIG. 27 is a schematic diagram illustrating the configuration of an anger category DB 3104D according to the embodiment.

Figure 28A:
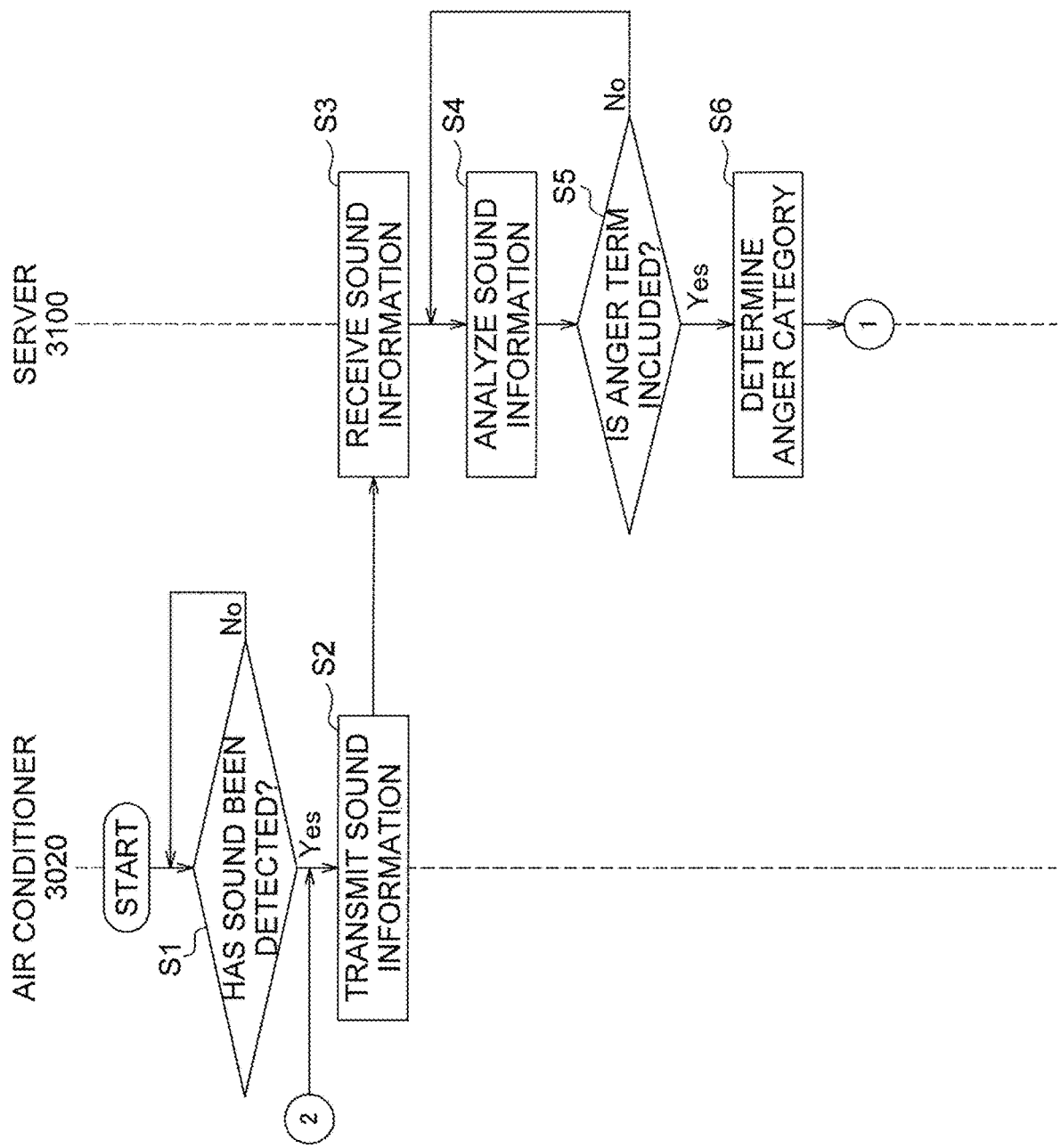

FIG. 28A is a sequence diagram illustrating the operation of an air conditioning system 3001 according to the embodiment.

Figure 28B:
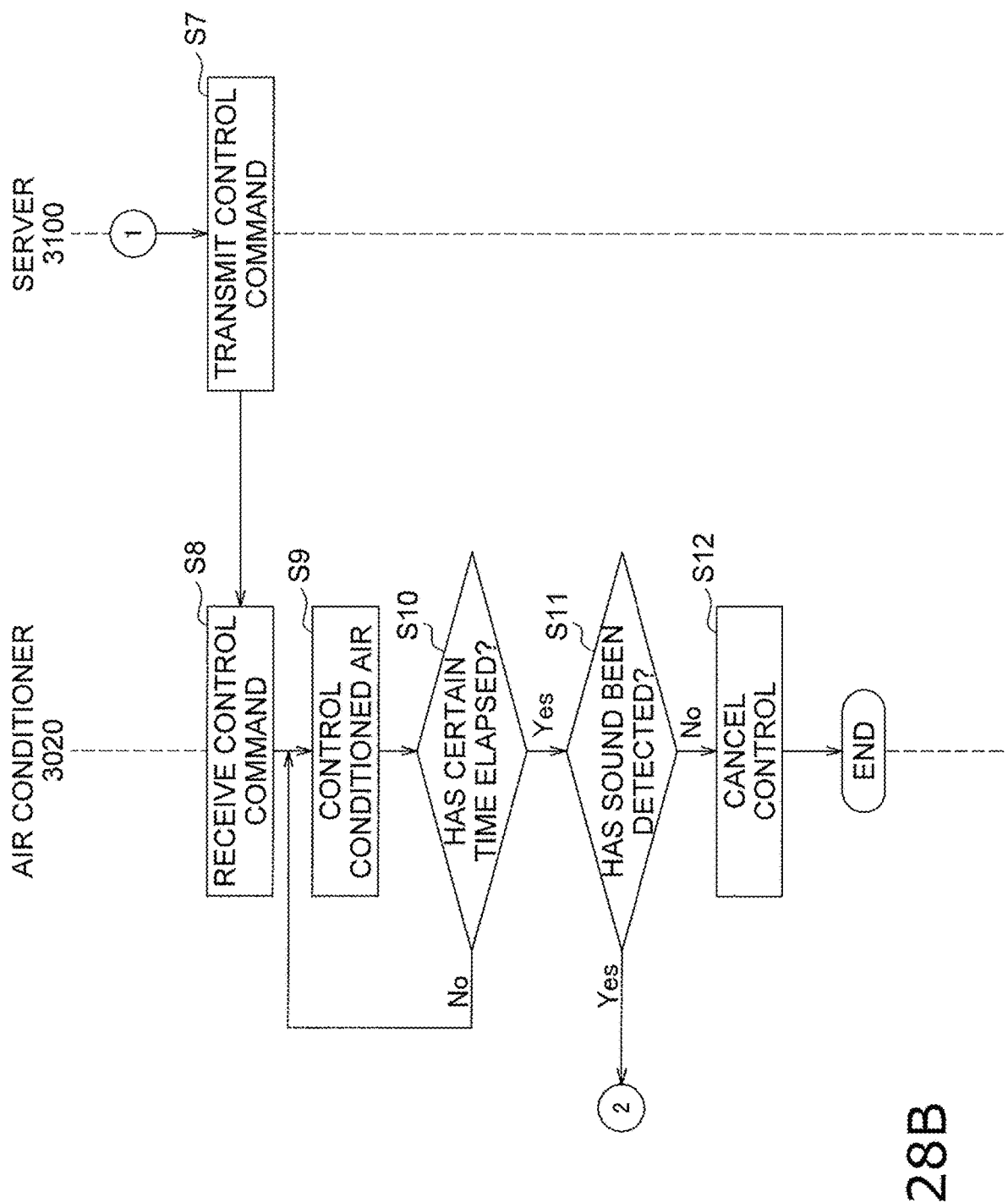

FIG. 28B is a sequence diagram illustrating the operation of the air conditioning system 3001 according to the embodiment.

Figure 29:
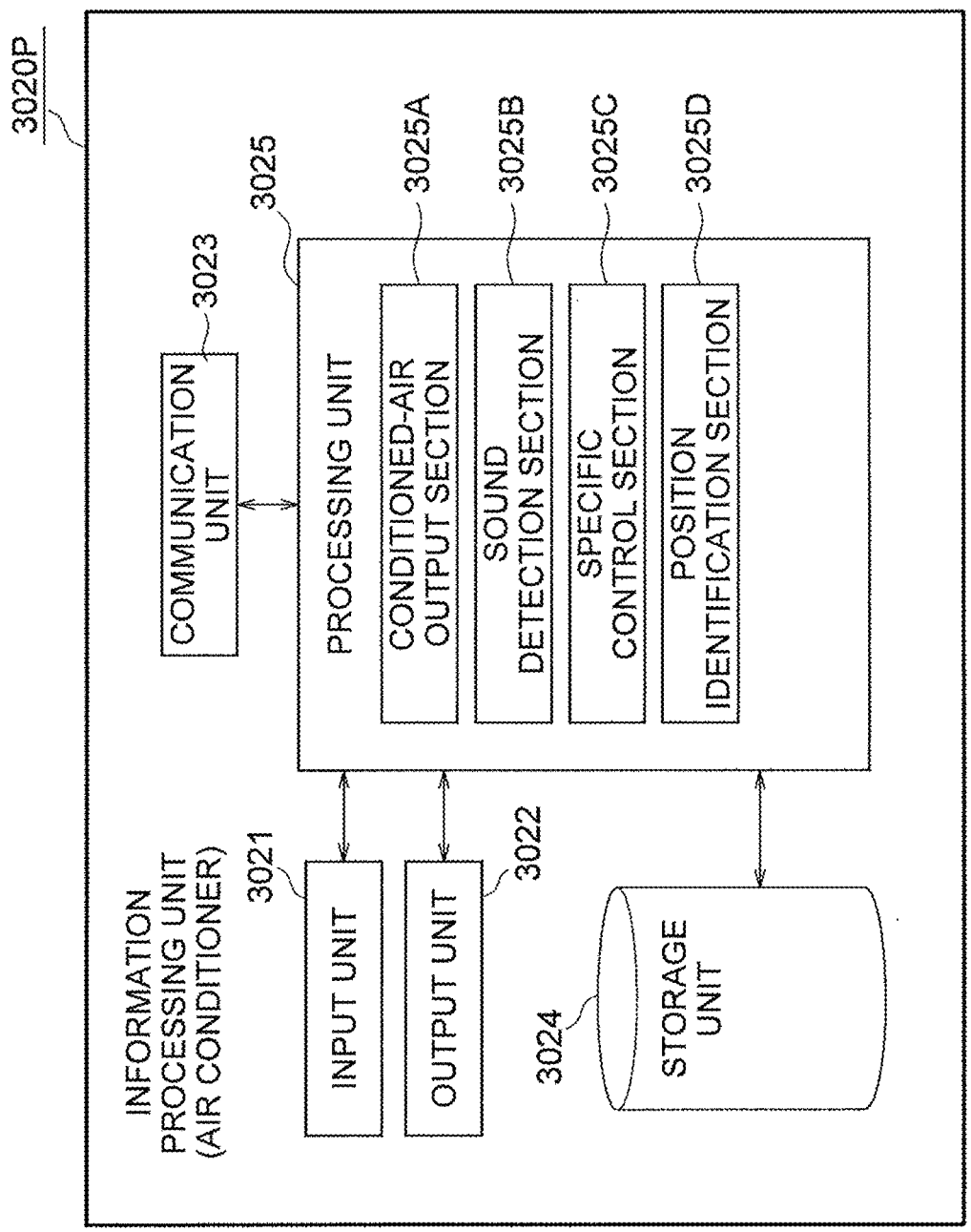

FIG. 29 is a schematic diagram illustrating the configuration of an information processing unit 3020P according to a modification A.

Figure 30:
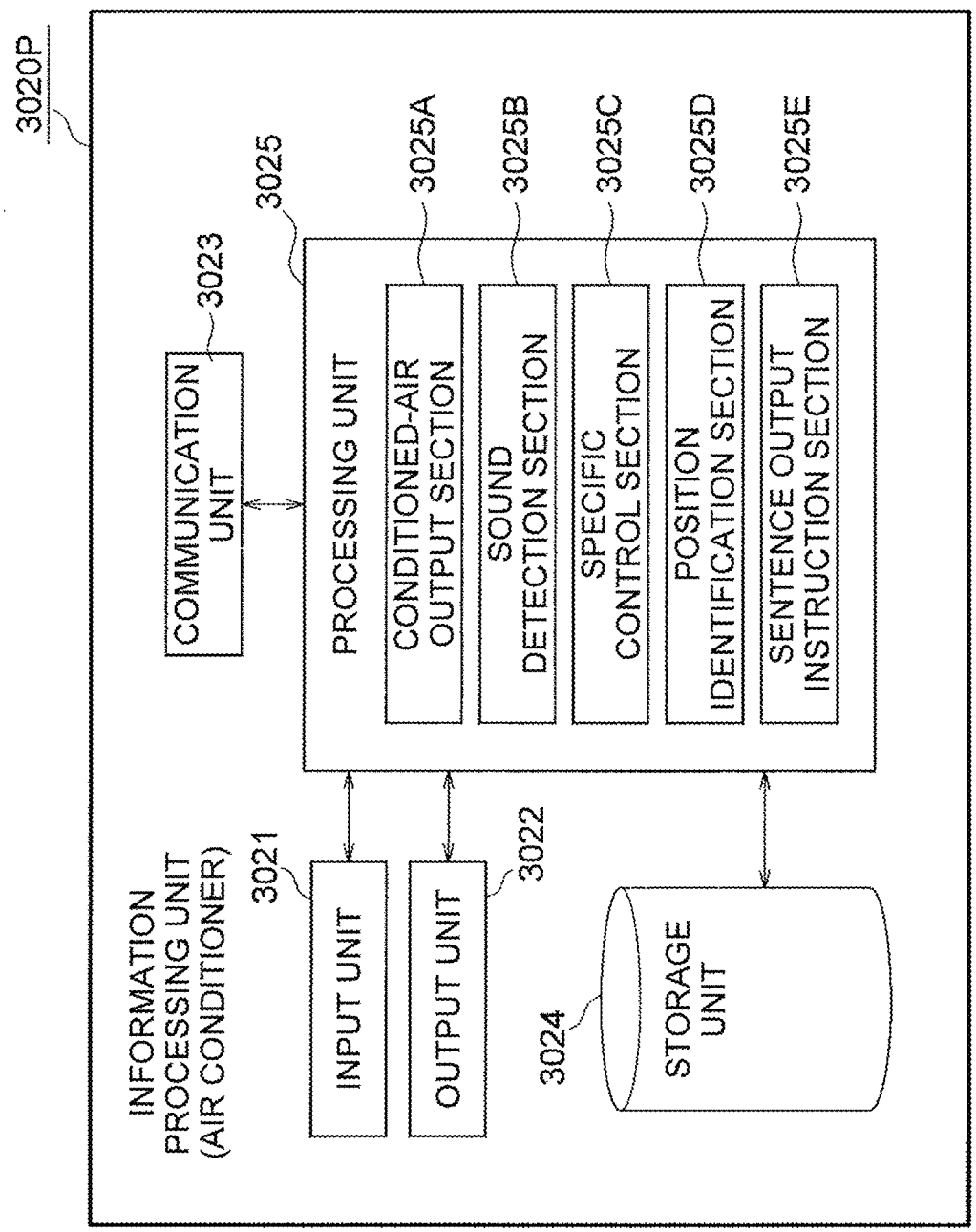

FIG. 30 is a schematic diagram illustrating the configuration of an information processing unit 3020P according to a modification B.

Figure 31:
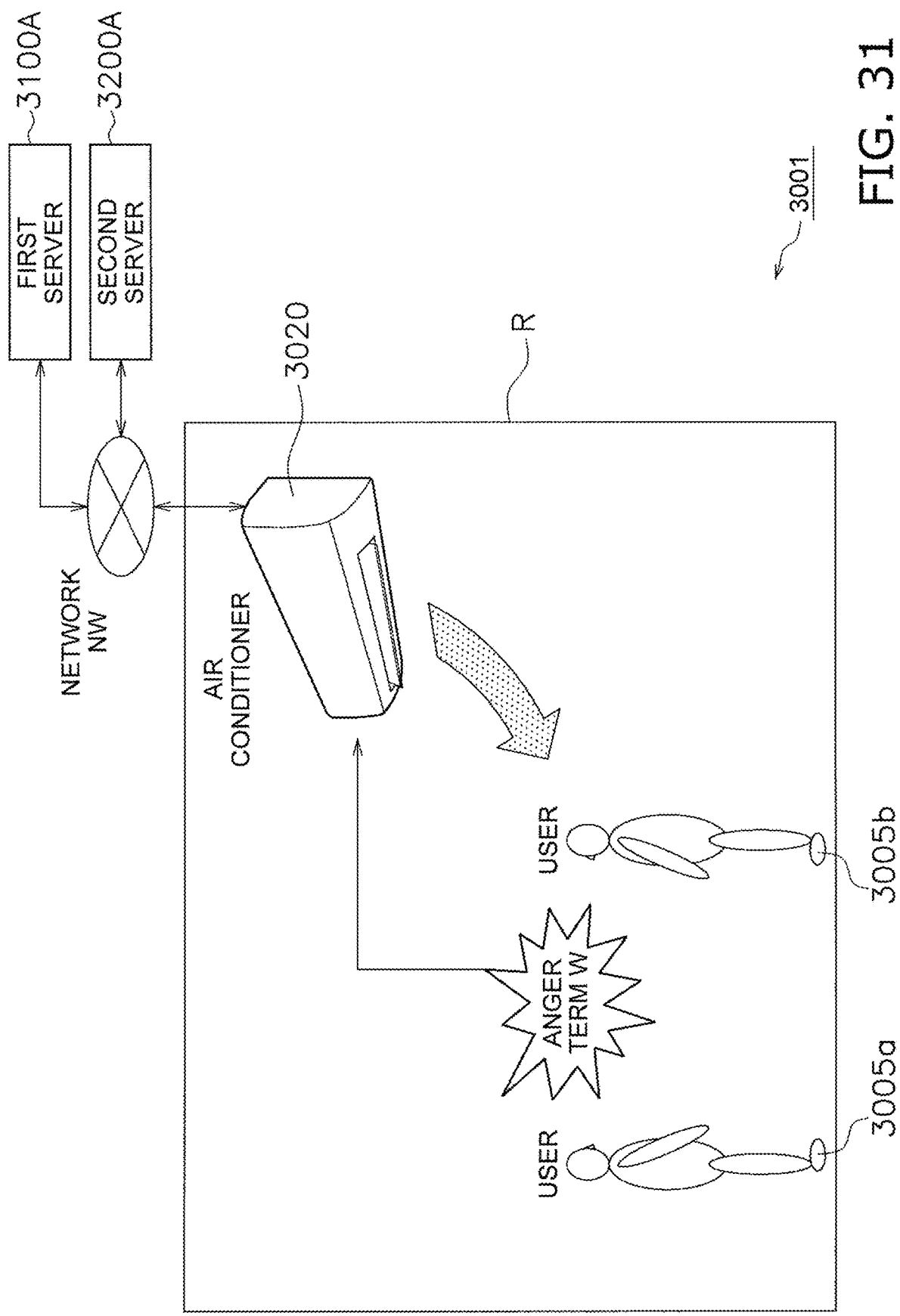

FIG. 31 is a schematic diagram illustrating a concept of an air conditioning system 3001 according to a modification D.

Figure 32:
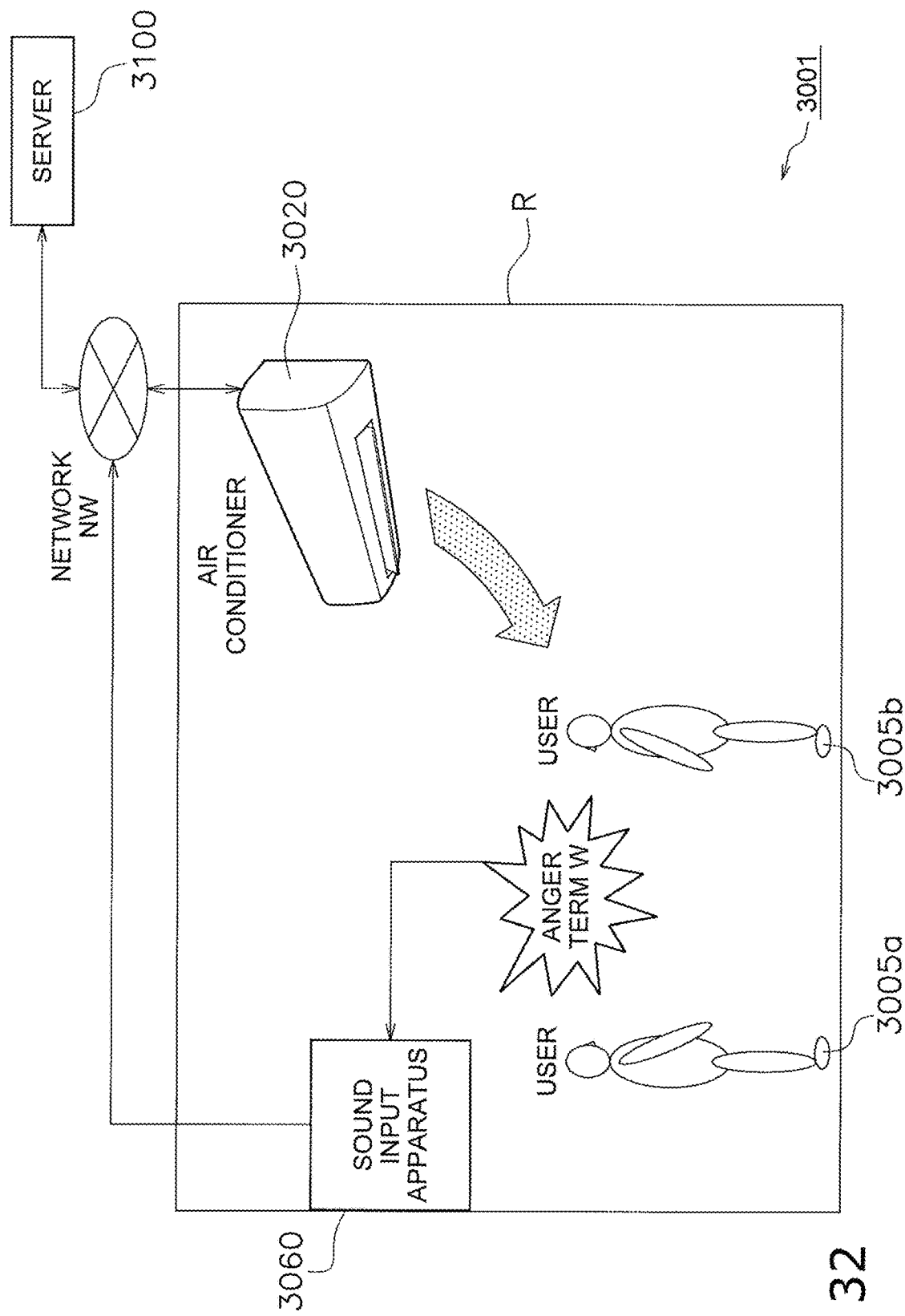

FIG. 32 is a schematic diagram illustrating a concept of an air conditioning system 3001 according to a modification E.

[Fourth Configuration]

Figure 33:
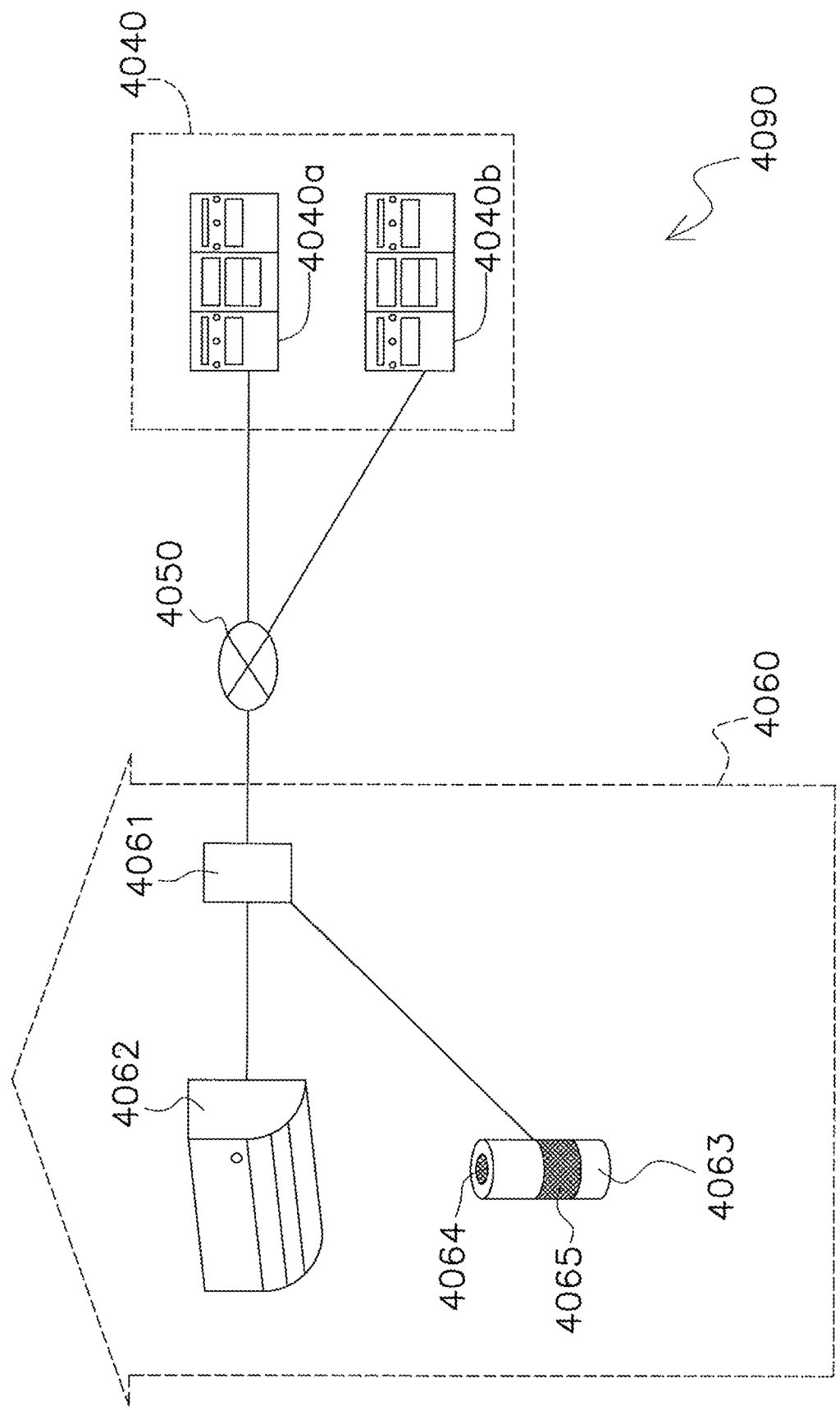

FIG. 33 is a schematic diagram illustrating an indoor environment control system 4090 according to an embodiment of a fourth configuration.

Figure 34:
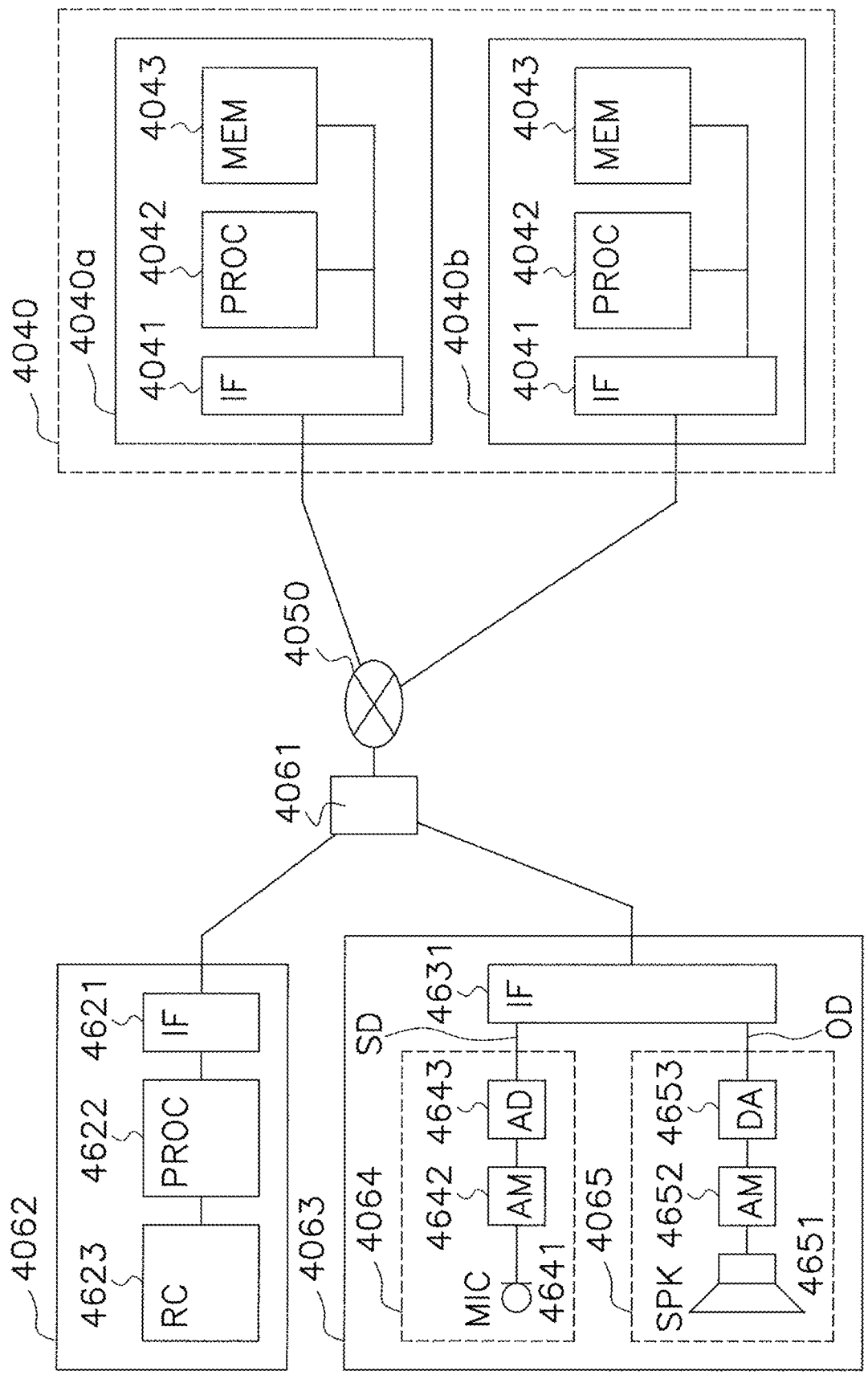

FIG. 34 is a block diagram illustrating the configuration of the indoor environment control system 4090.

Figure 35:
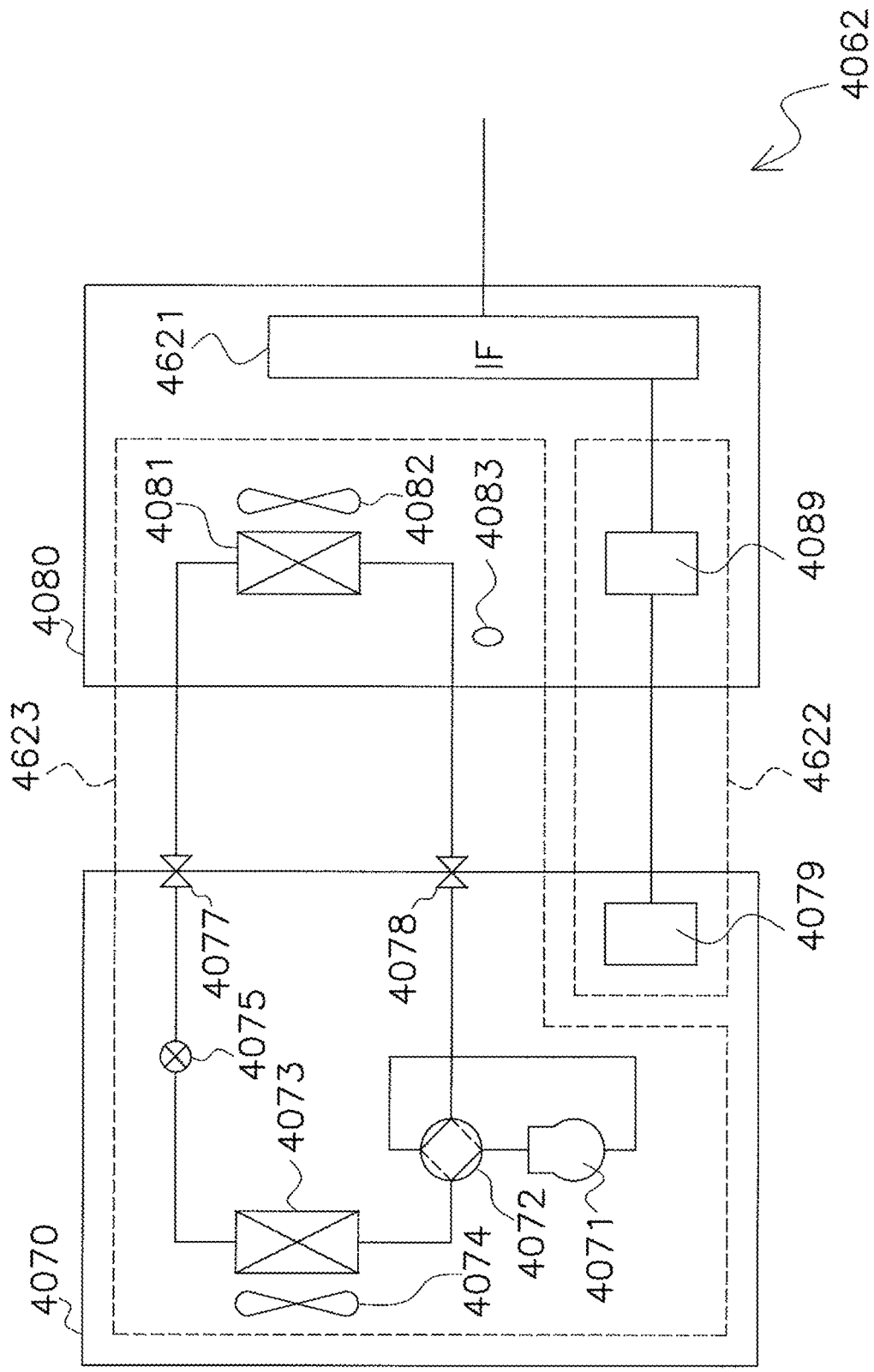

FIG. 35 is a detailed block diagram illustrating an air conditioner 4062.

Figure 36:
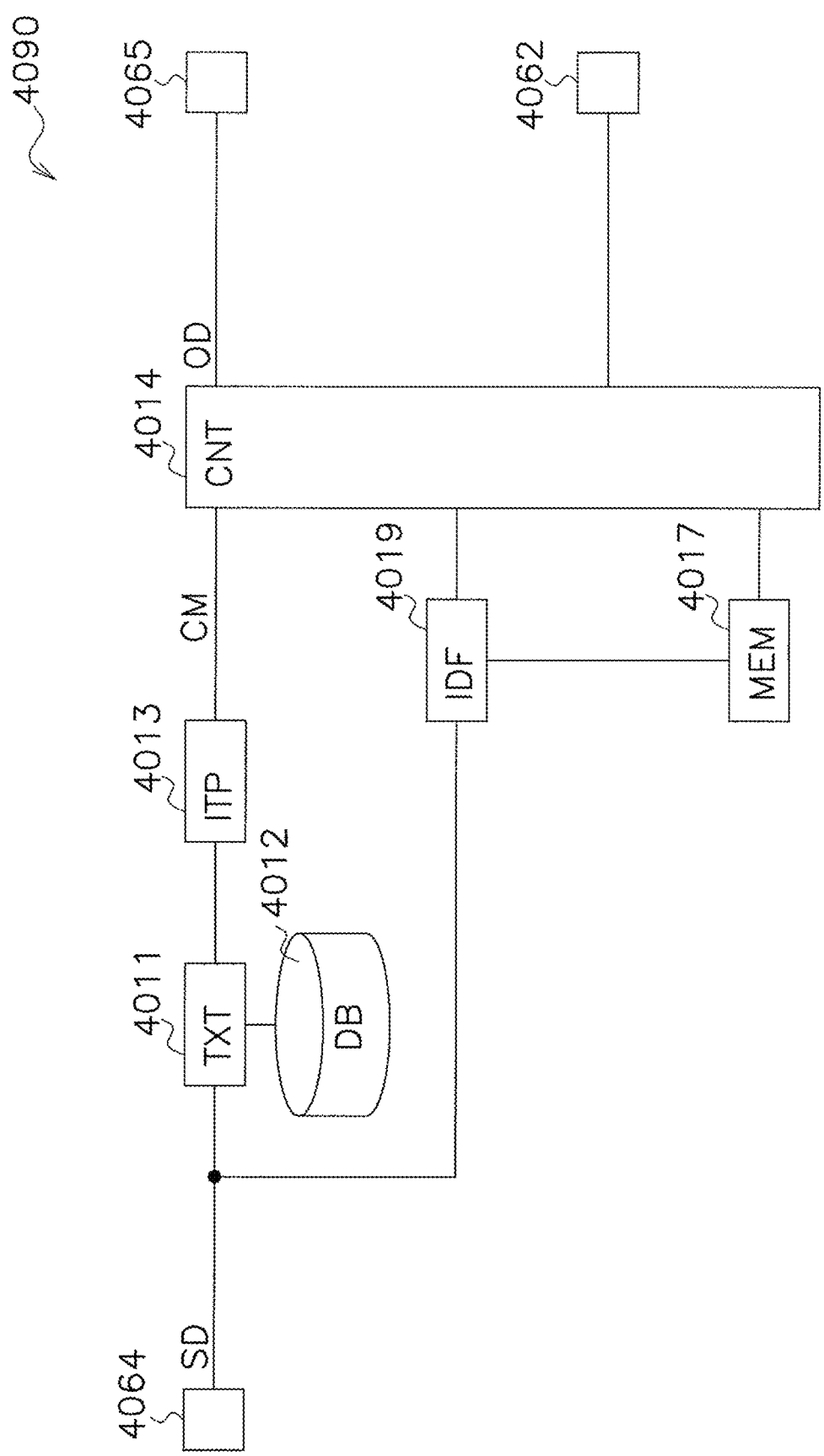

FIG. 36 is a block diagram illustrating functions of the indoor environment control system 4090.

Figure 37:
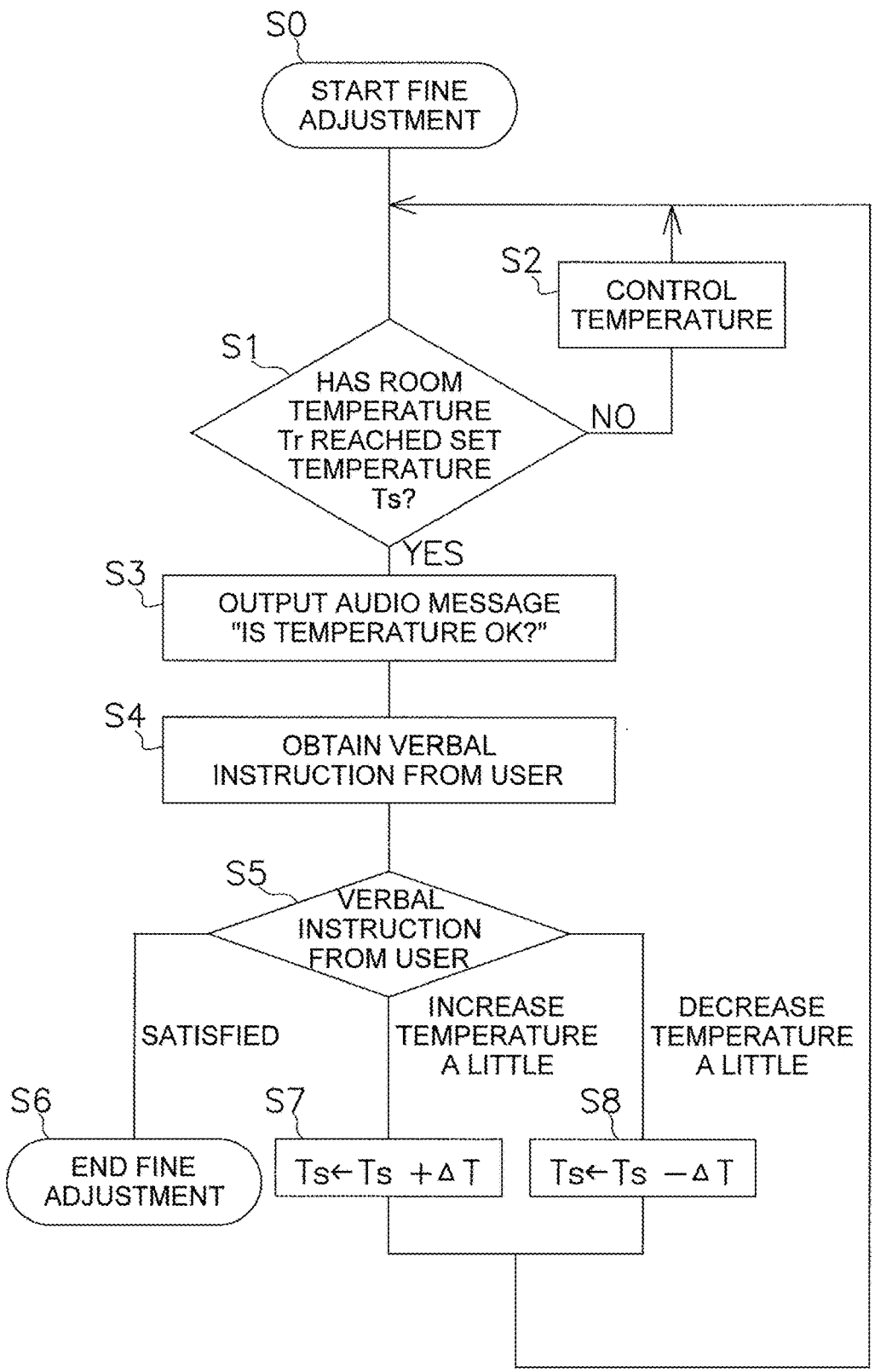

FIG. 37 is a flowchart illustrating a fine control routine.

Figure 38:
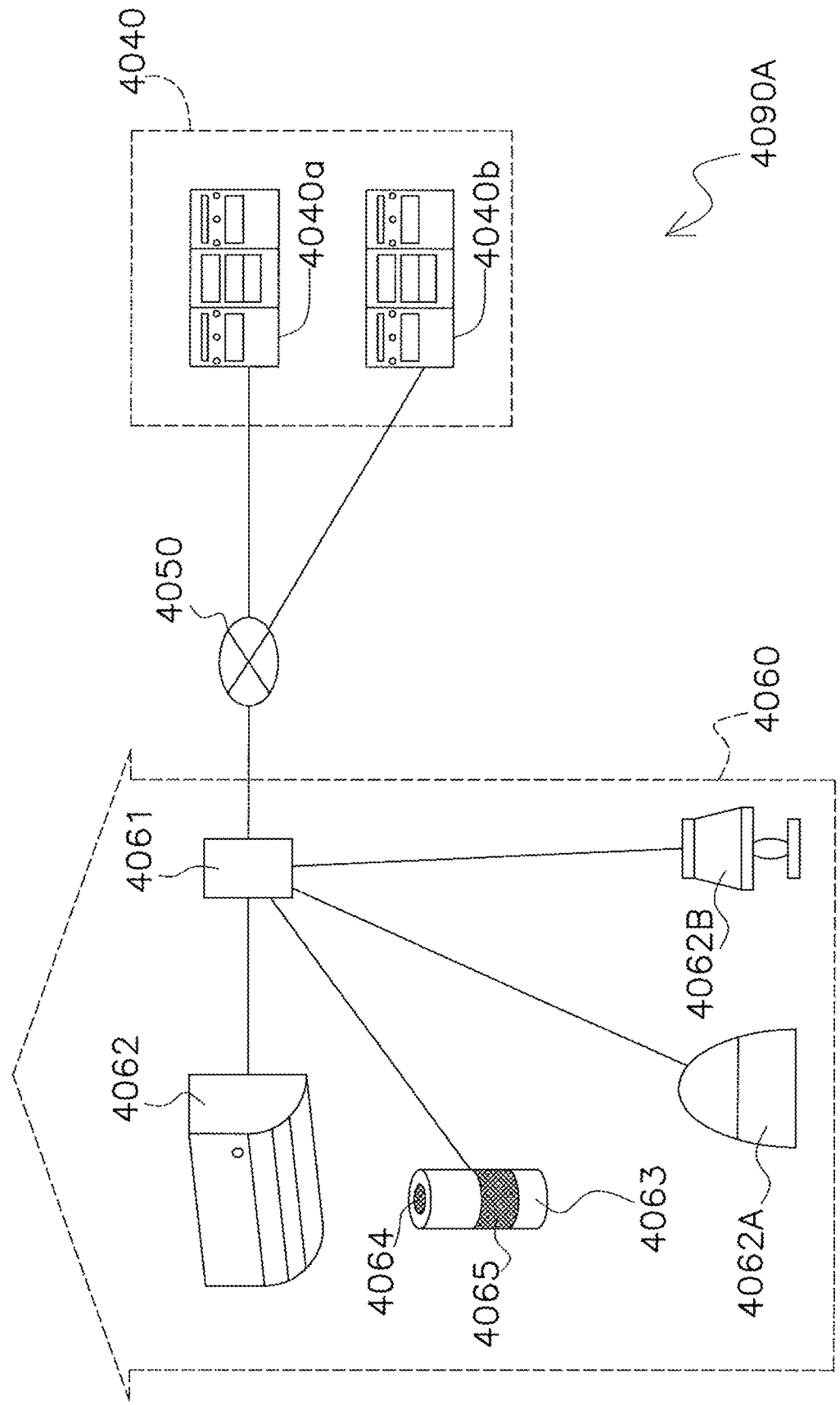

FIG. 38 is a schematic diagram illustrating an indoor environment control system 4090A according to a first modification.

Figure 39:
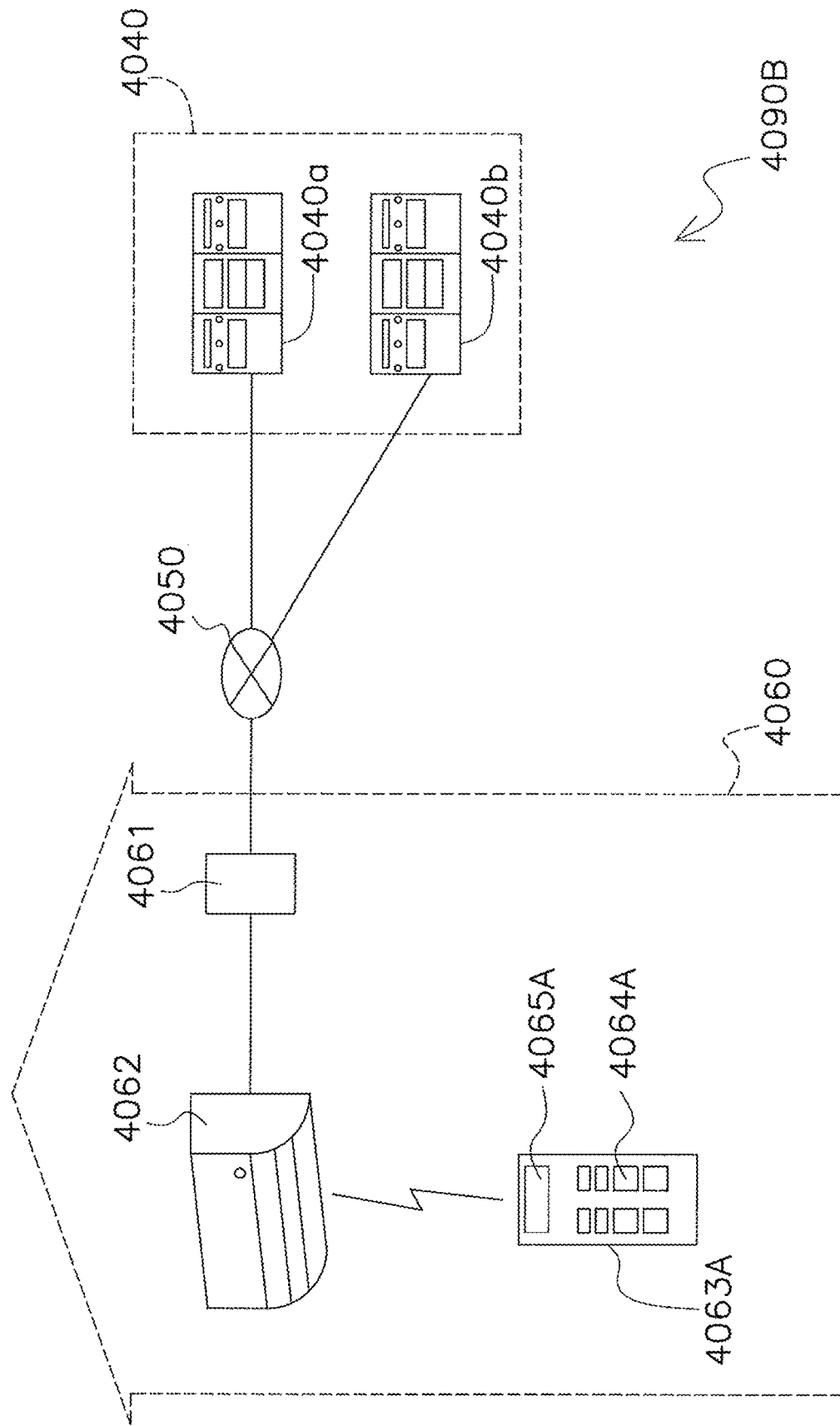

FIG. 39 is a schematic diagram illustrating an indoor environment control system 4090B according to a second modification.

[Fifth Configuration]

Figure 40:
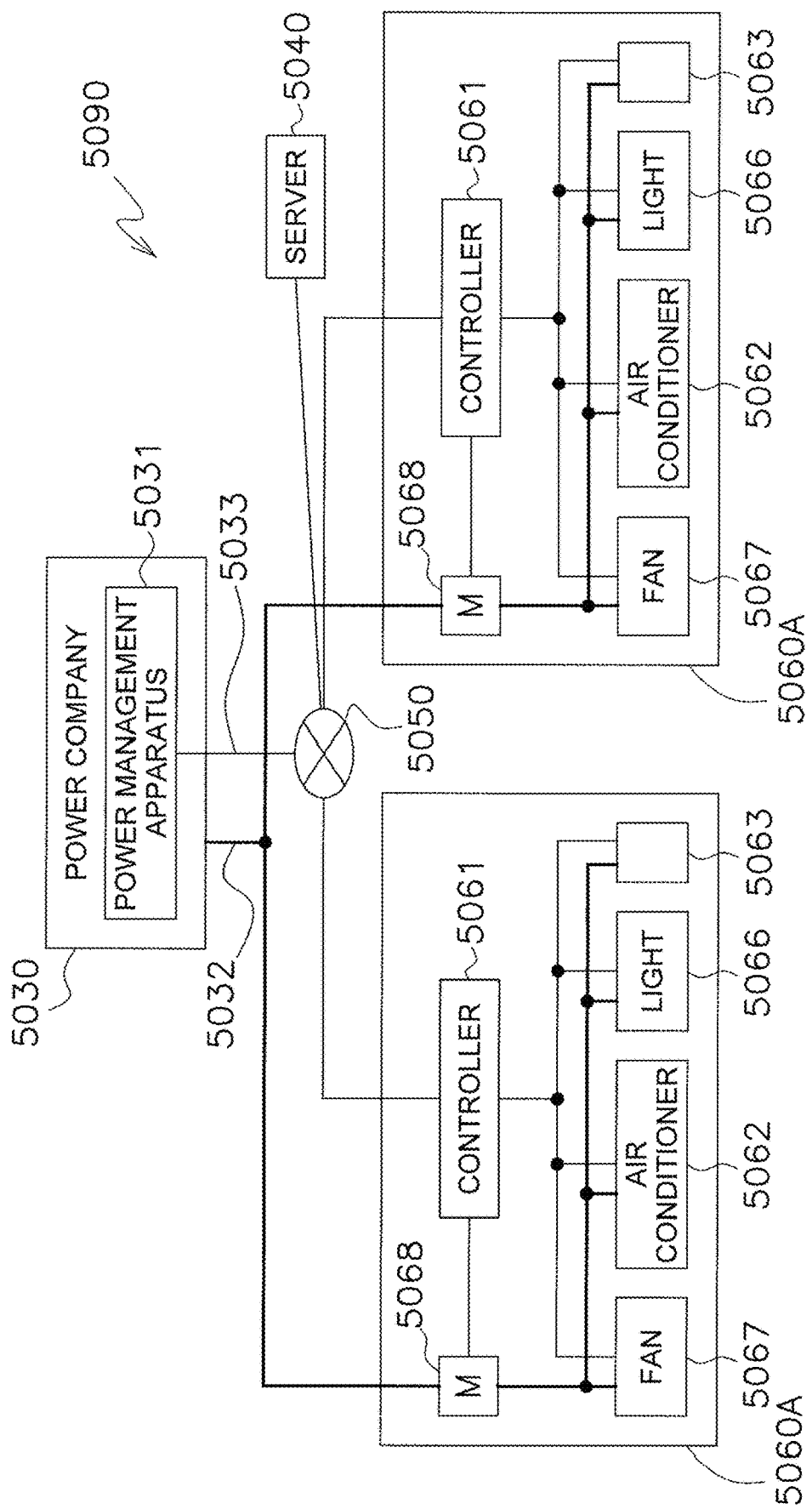

FIG. 40 is a schematic diagram illustrating an air condition management system 5090 according to a fifth configuration.

Figure 41:
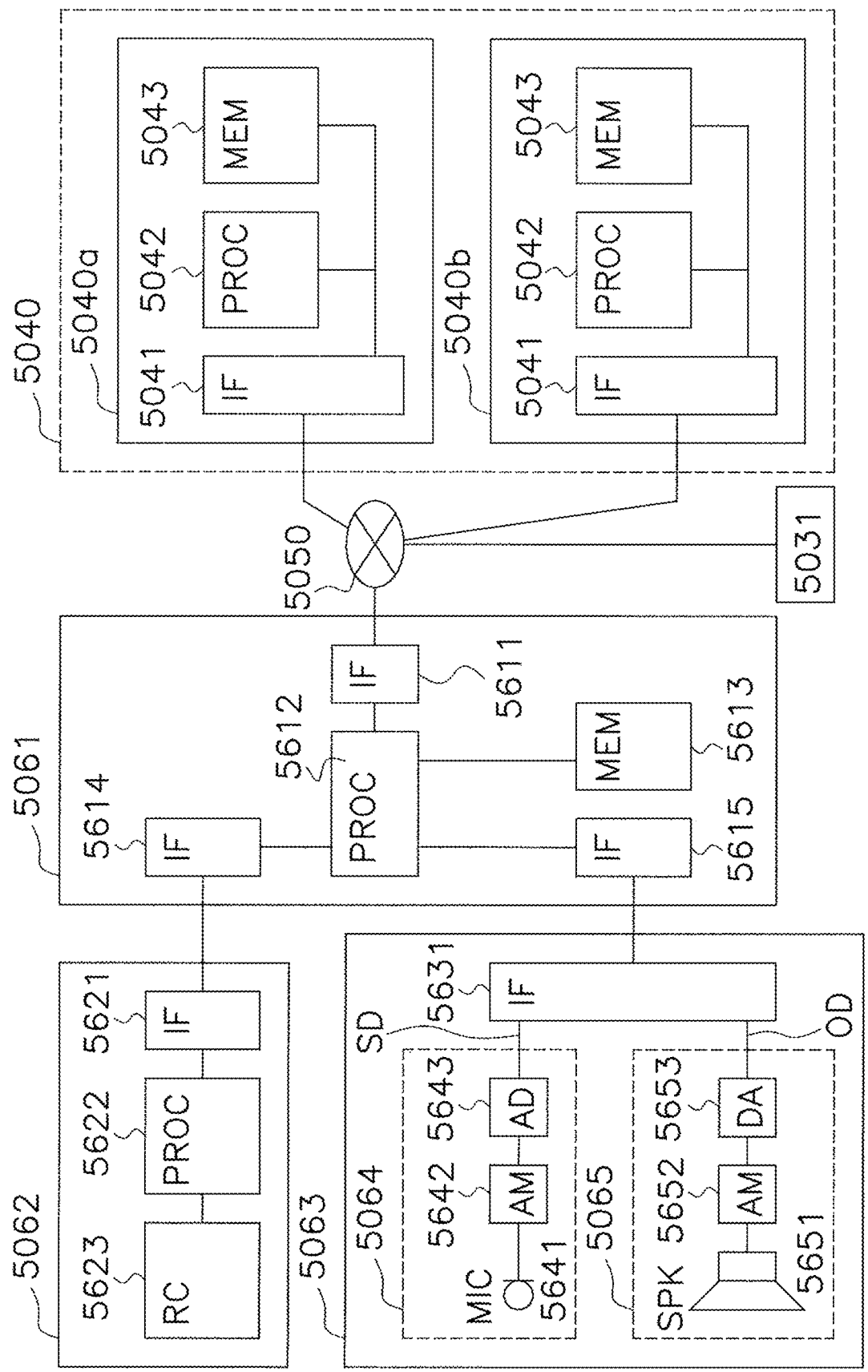

FIG. 41 is a block diagram illustrating the configuration of the air condition management system 5090 according to the fifth configuration.

Figure 42:
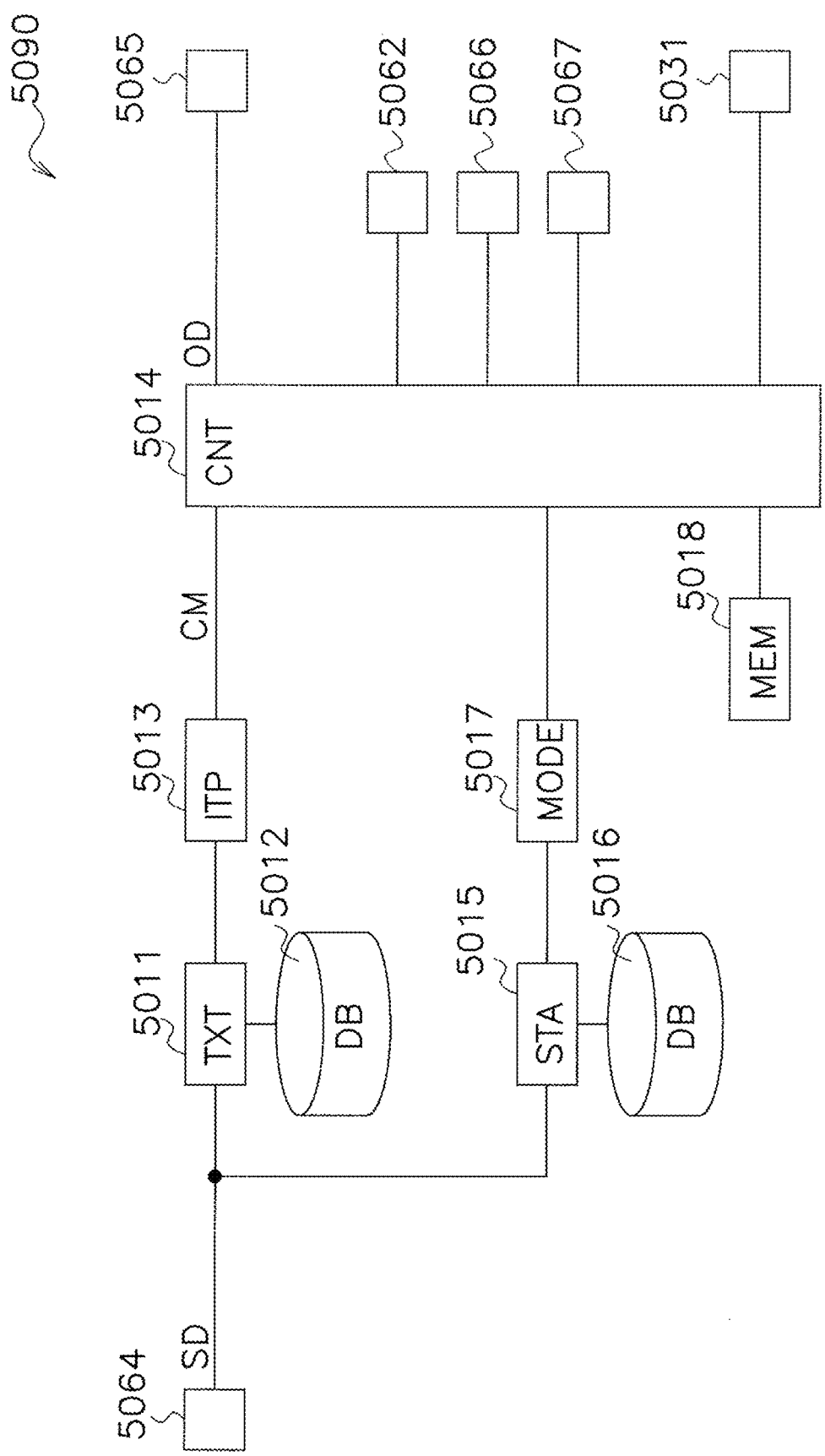

FIG. 42 is a block diagram illustrating functions of the air condition management system 5090 according to the fifth configuration.

[Sixth Configuration]

Figure 43:
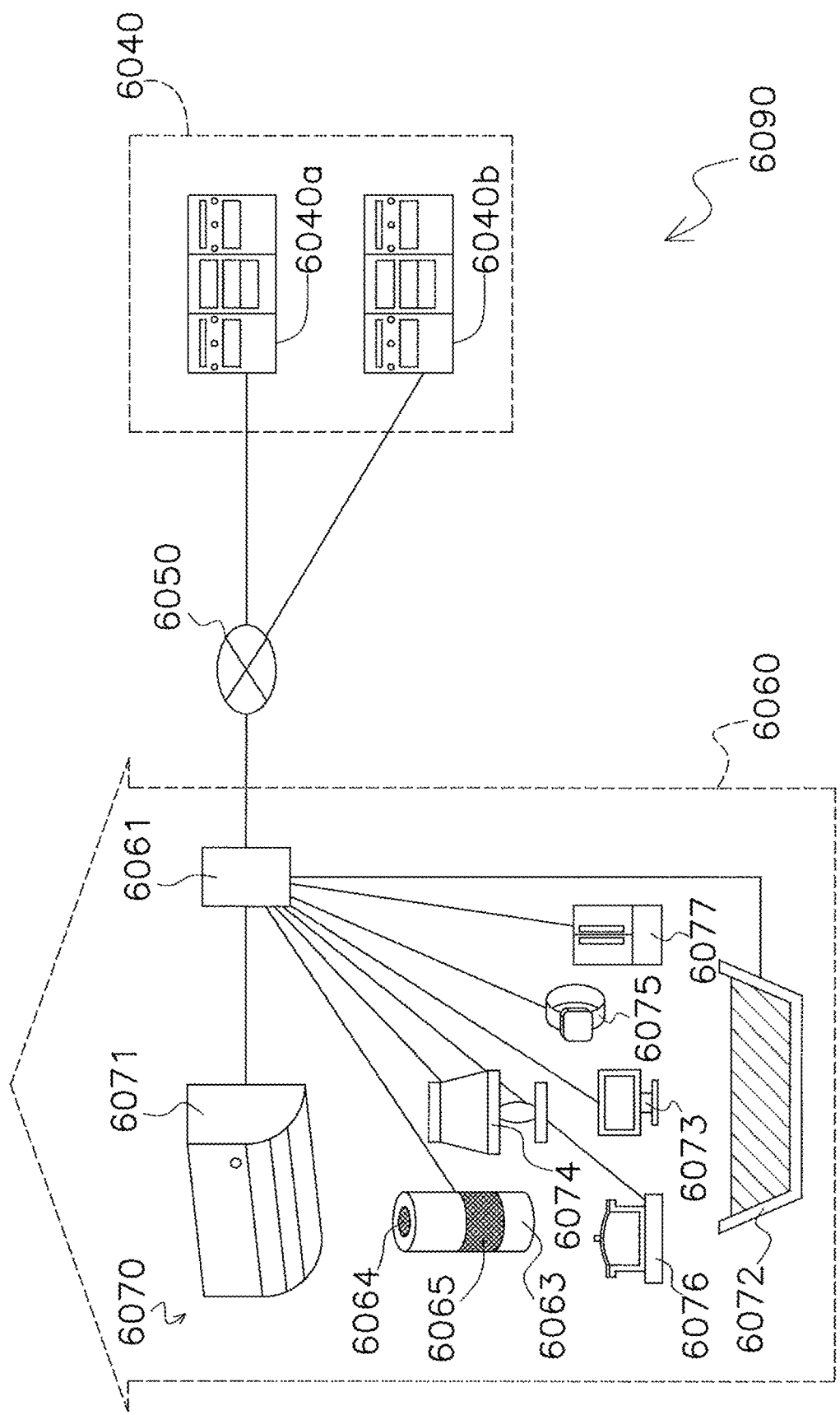

FIG. 43 is a schematic diagram illustrating a home system 6090 according to an embodiment of a sixth configuration.

Figure 44:
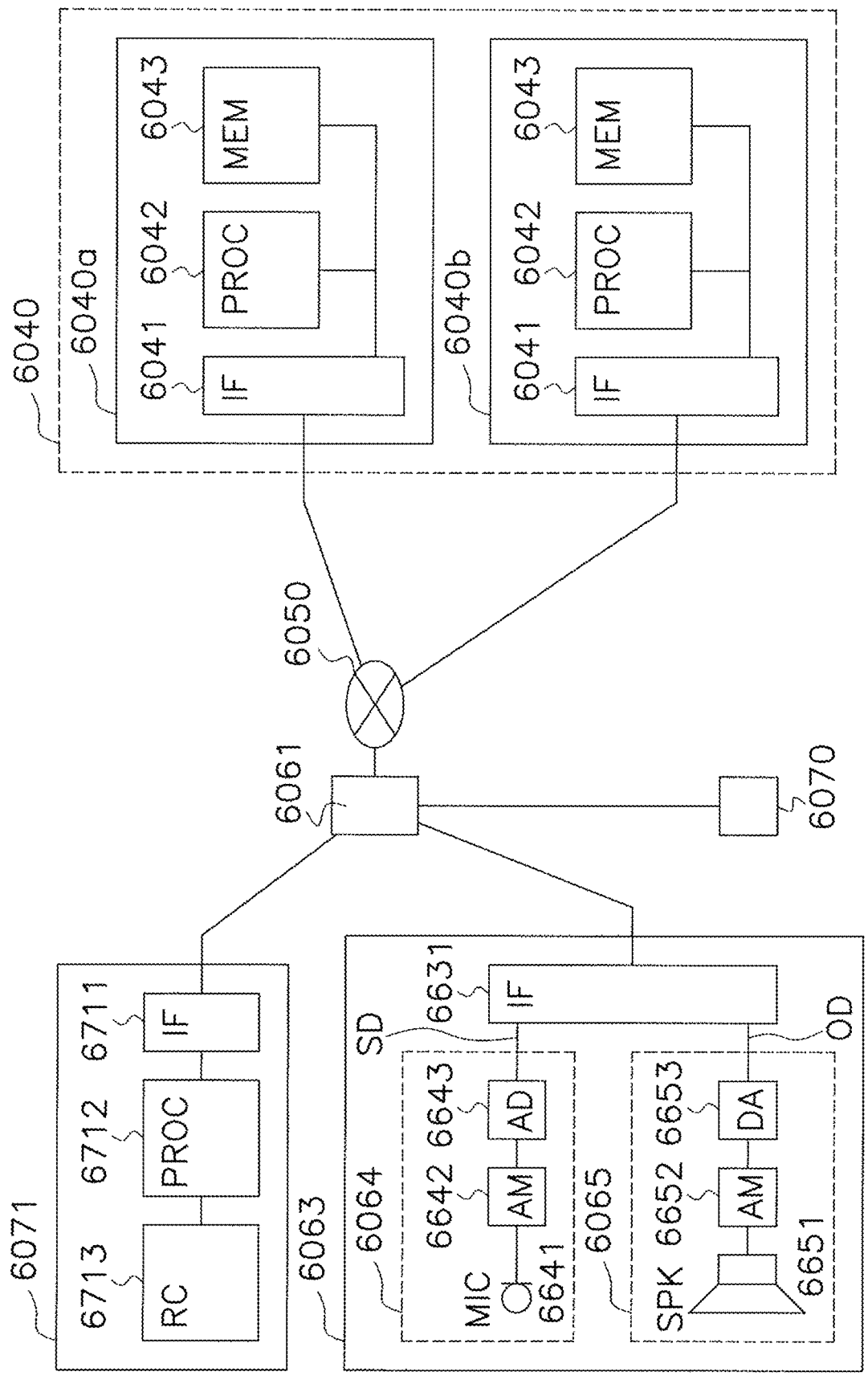

FIG. 44 is a block diagram illustrating the configuration of the home system 6090.

Figure 45:
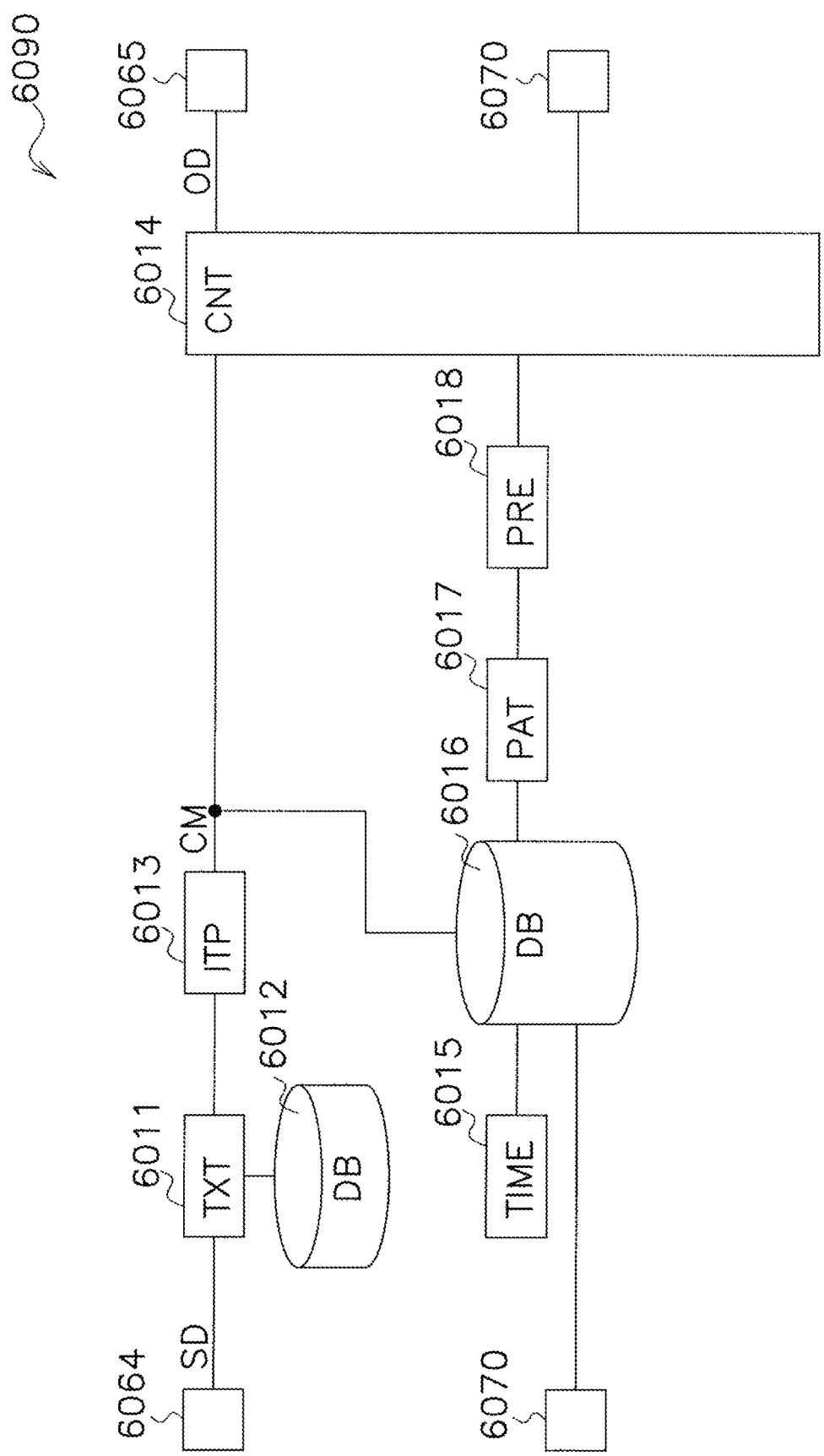

FIG. 45 is a block diagram illustrating functions of the home system 6090.

FIG. 46 is a table indicating an example of a log.

Figure 47:
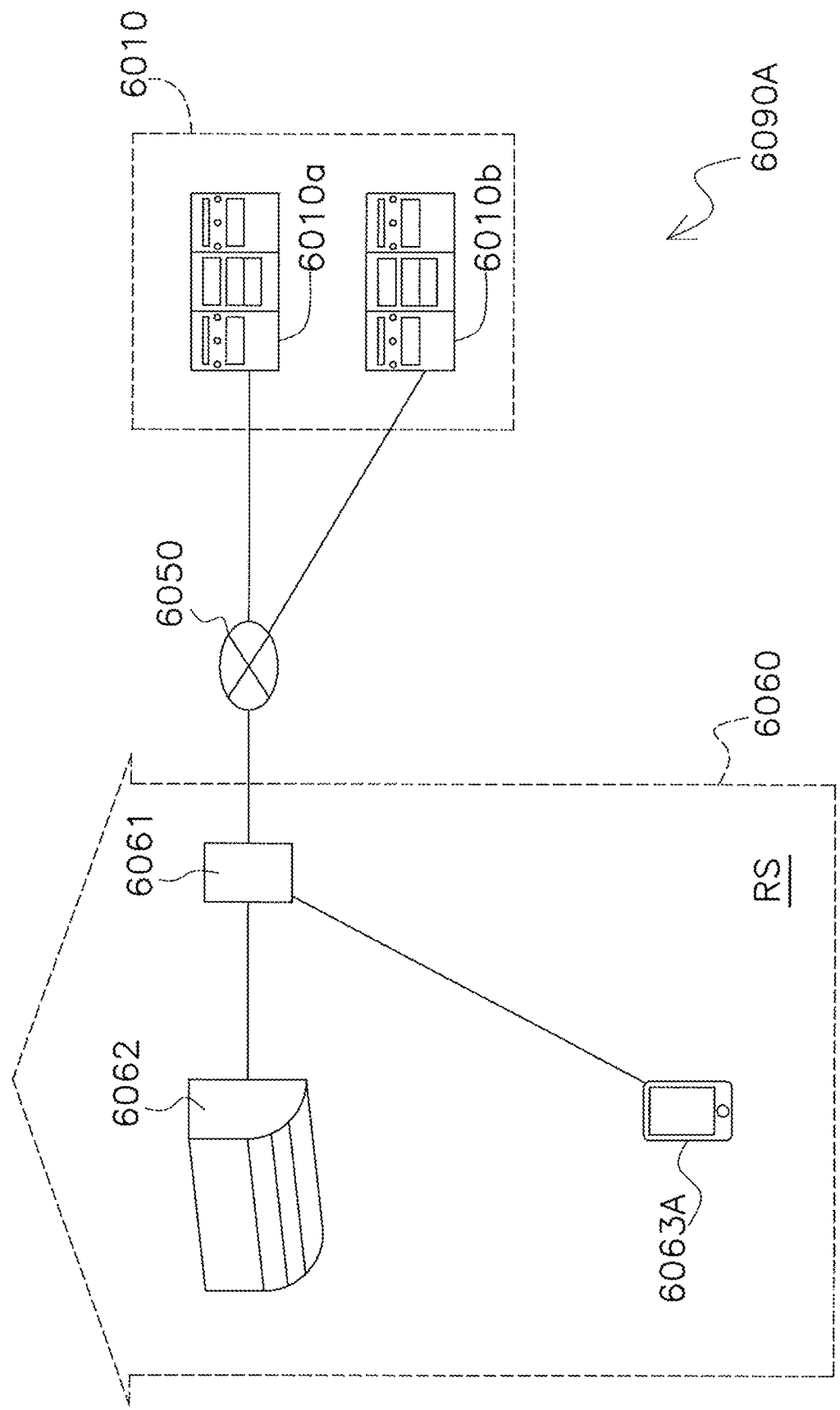

FIG. 47 is a schematic diagram illustrating a home system 6090A according to a first modification of the present invention.

Figure 48:
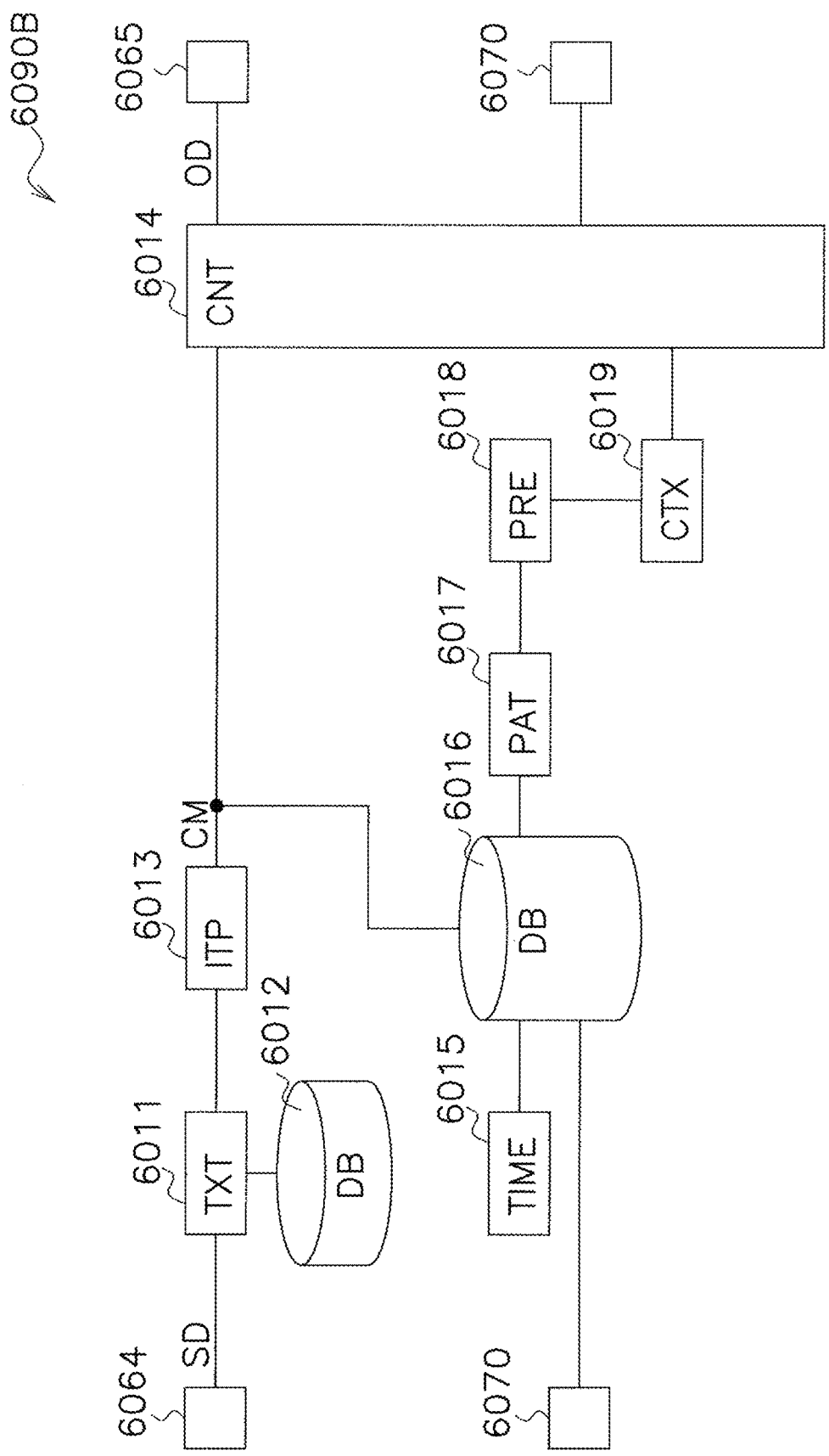

FIG. 48 is a functional block diagram illustrating a home system 6090B according to a second modification of the present invention.

[Seventh Configuration]

Figure 49:
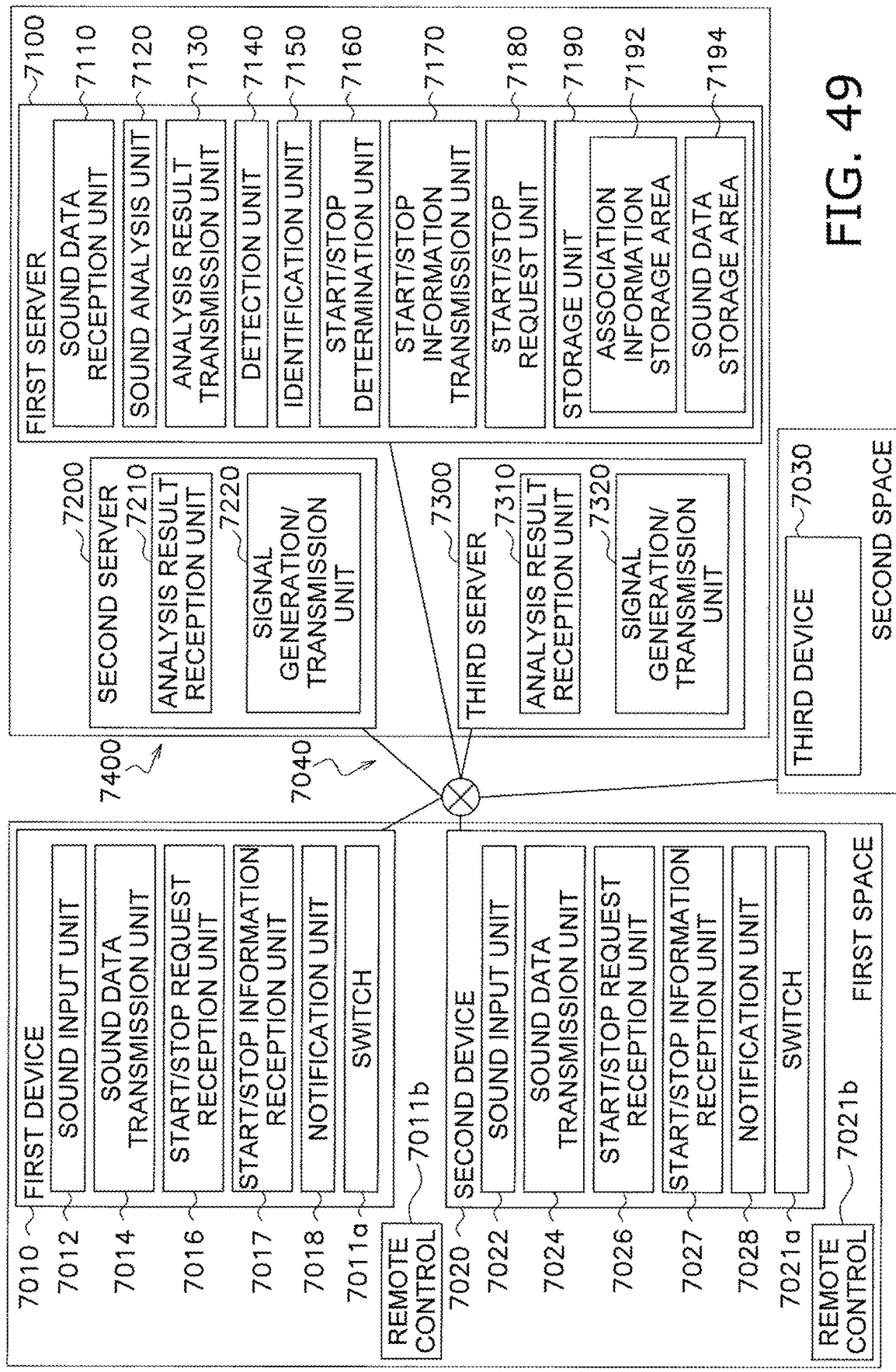

FIG. 49 is a schematic block diagram illustrating a device control system and devices controlled by the device control system according to an embodiment of a seventh configuration.

Figure 50:
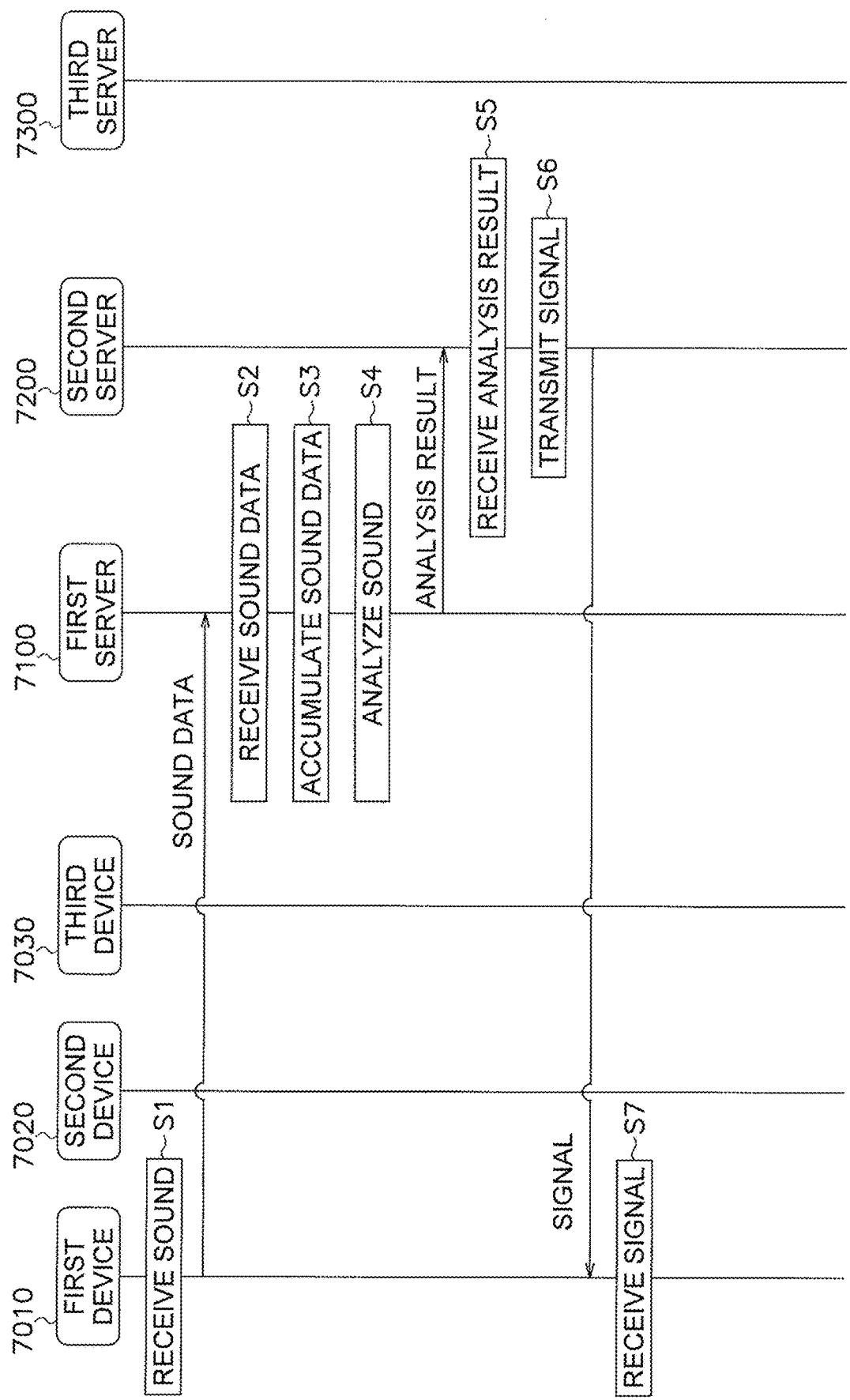

FIG. 50 is a sequence diagram illustrating the operation of a first device and the device control system at a time when a sound has been input to a sound input unit of the first device.

Figure 51:
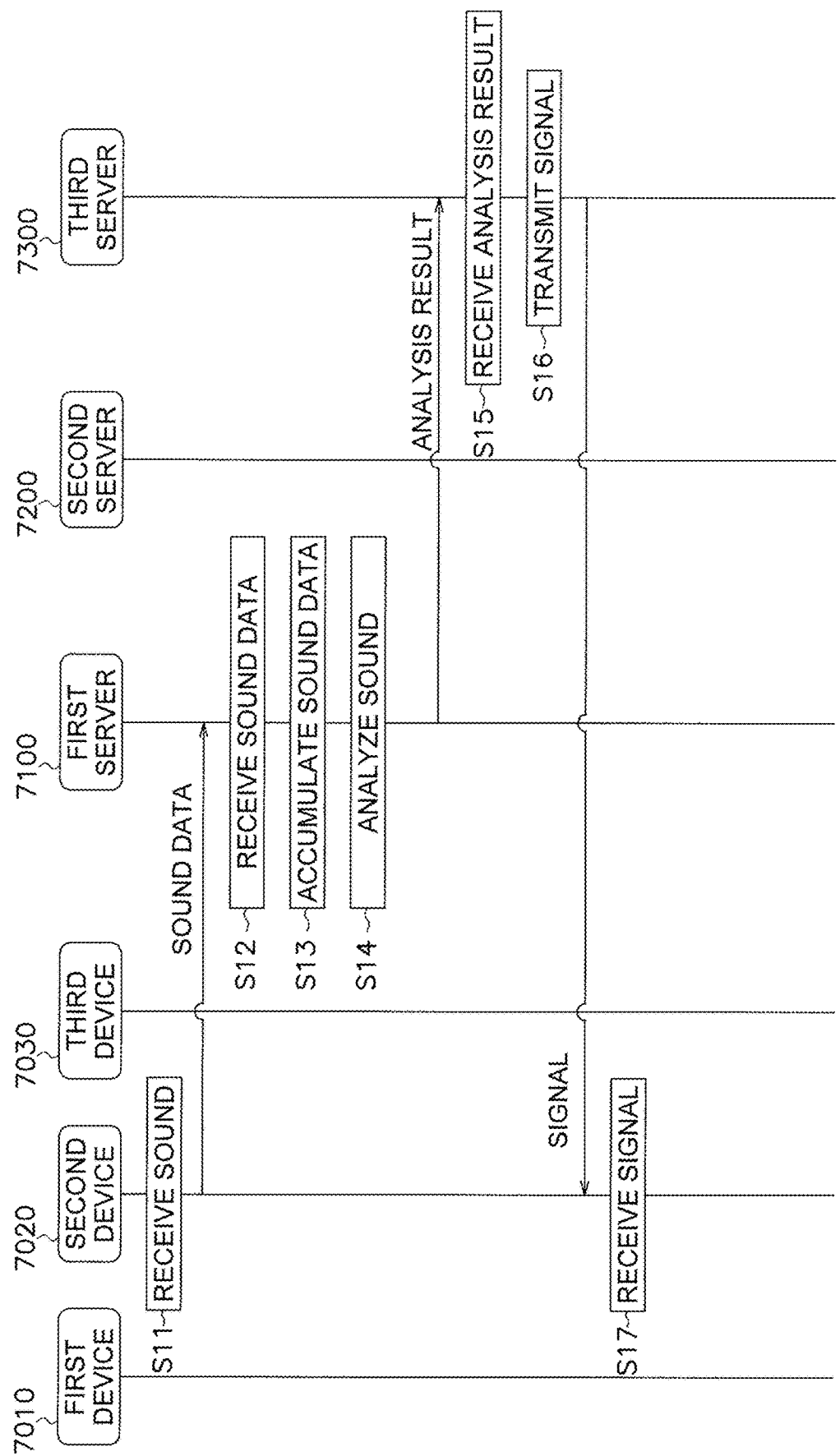

FIG. 51 is a sequence diagram illustrating the operation of a second device and the device control system at a time when a sound has been input to a sound input unit of the second device.

Figure 52:
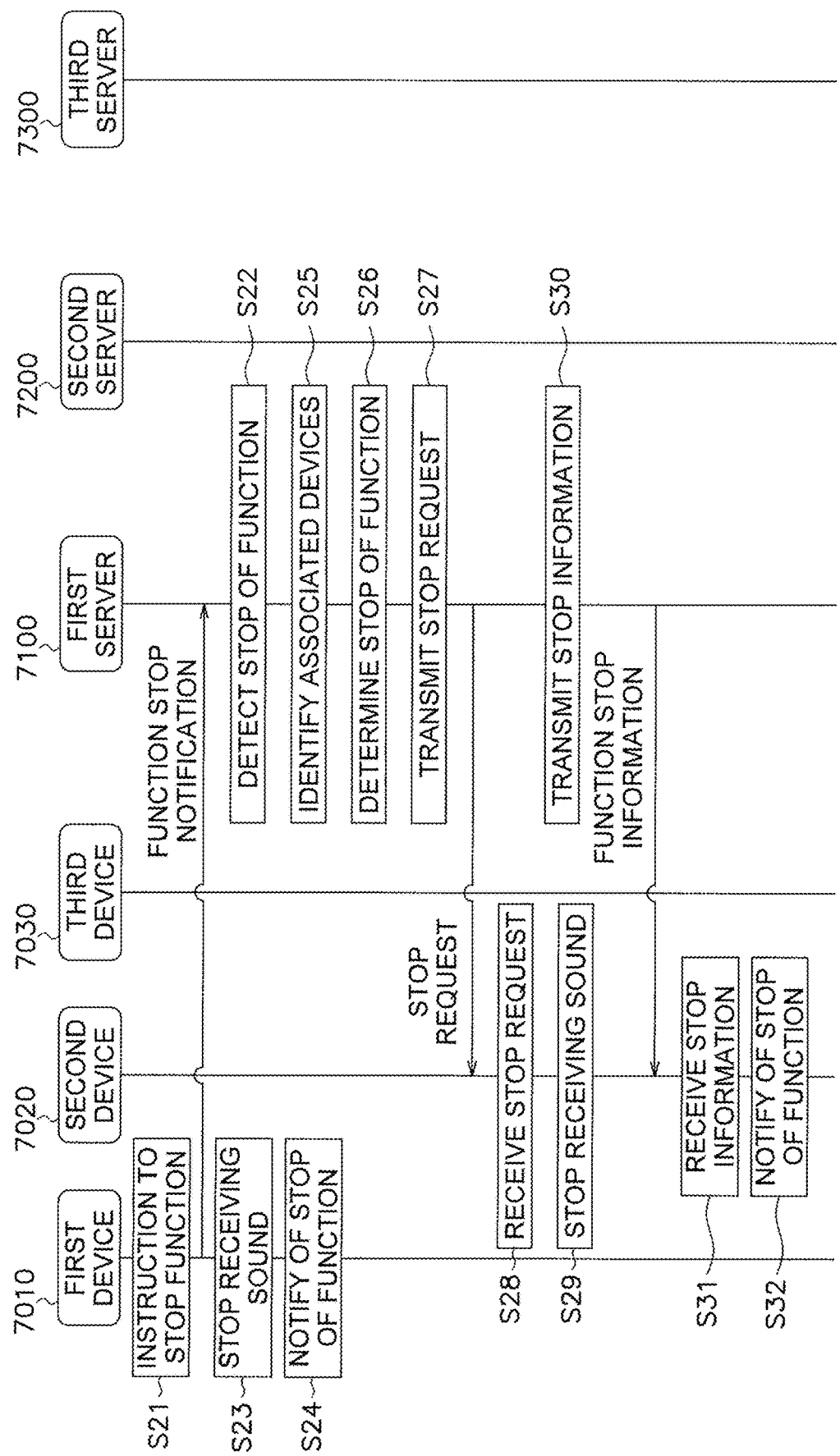

FIG. 52 is a sequence diagram illustrating the operation of the devices and the device control system at a time when the first device has received an instruction to stop a function of receiving a sound, which is an example of a first function relating to sound recognition processing, executed by the sound input unit.

Figure 53:
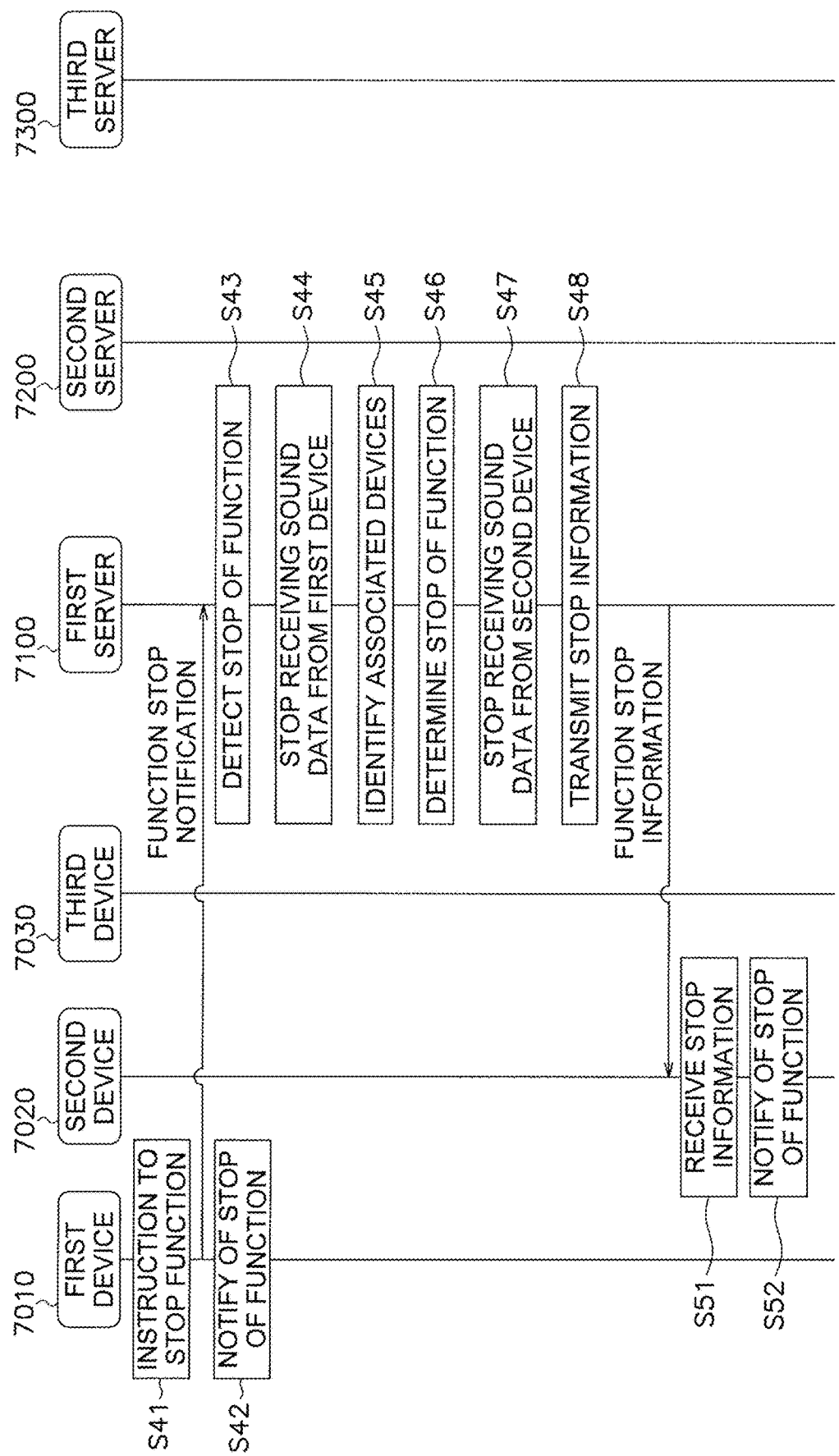

FIG. 53 is a sequence diagram illustrating the operation of the devices and the device control system at a time when the first device has received an instruction to stop a function of receiving, with a sound data reception unit, sound data transmitted from a sound data transmission unit of the first device, which is an example of the first function relating to the sound recognition processing.

Figure 54:
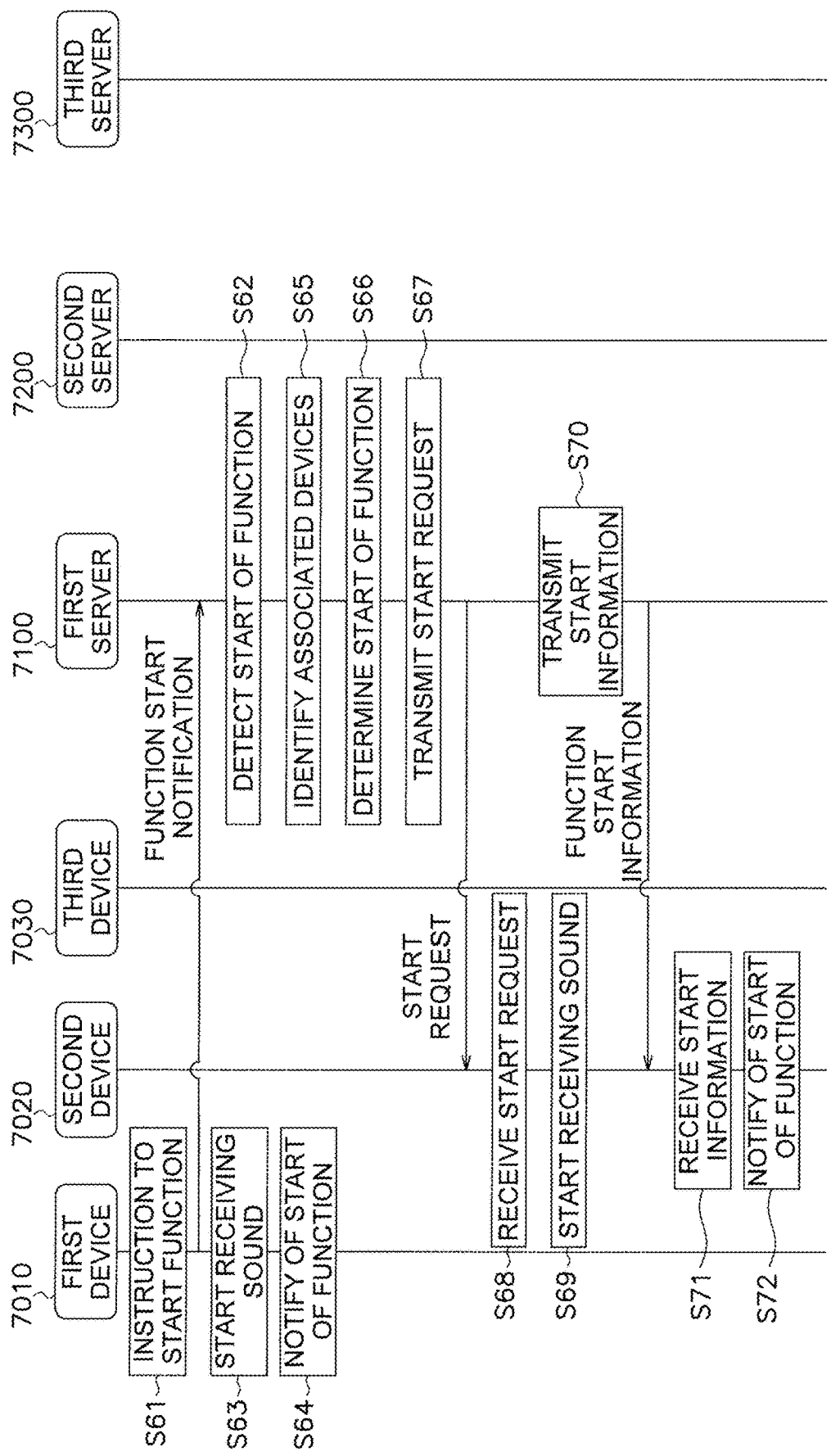

FIG. 54 is a sequence diagram illustrating the operation of the devices and the device control system at a time when the first device has received an instruction to start (resume) the function of receiving a sound, which is an example of the first function relating to the sound recognition processing, executed by the sound input unit.

Figure 55:
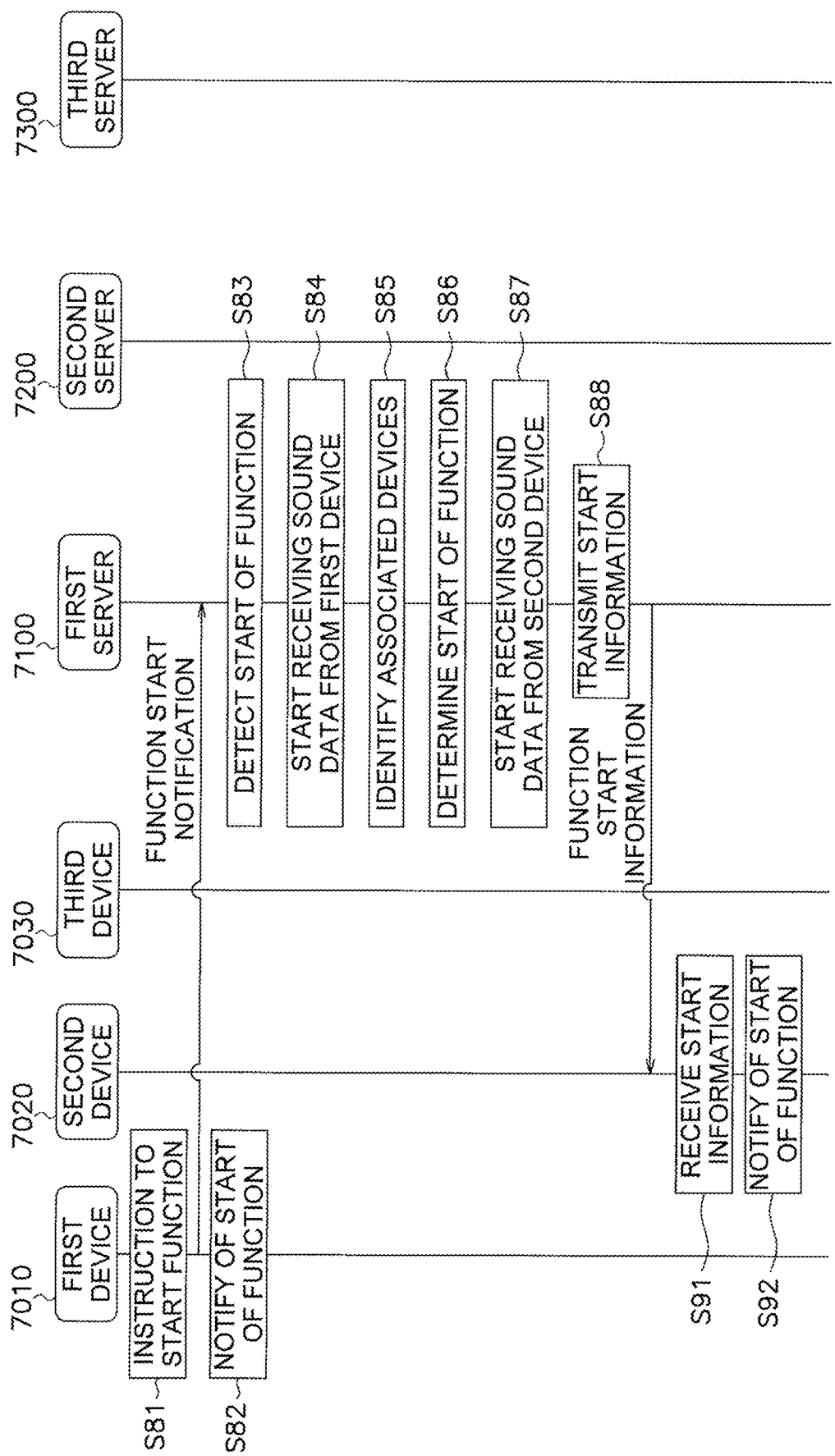

FIG. 55 is a sequence diagram illustrating the operation of the devices and the device control system at a time when the first device has received an instruction to start (resume) the function of receiving, with the sound data reception unit, sound data transmitted from the sound data transmission unit of the first device, which is an example of the first function relating to the sound recognition processing.

DESCRIPTION OF EMBODIMENTS

[First Configuration]

(1) Outline of Device Control System 1001

(1-1) Configuration of Device Control System 1001

Figure 1:
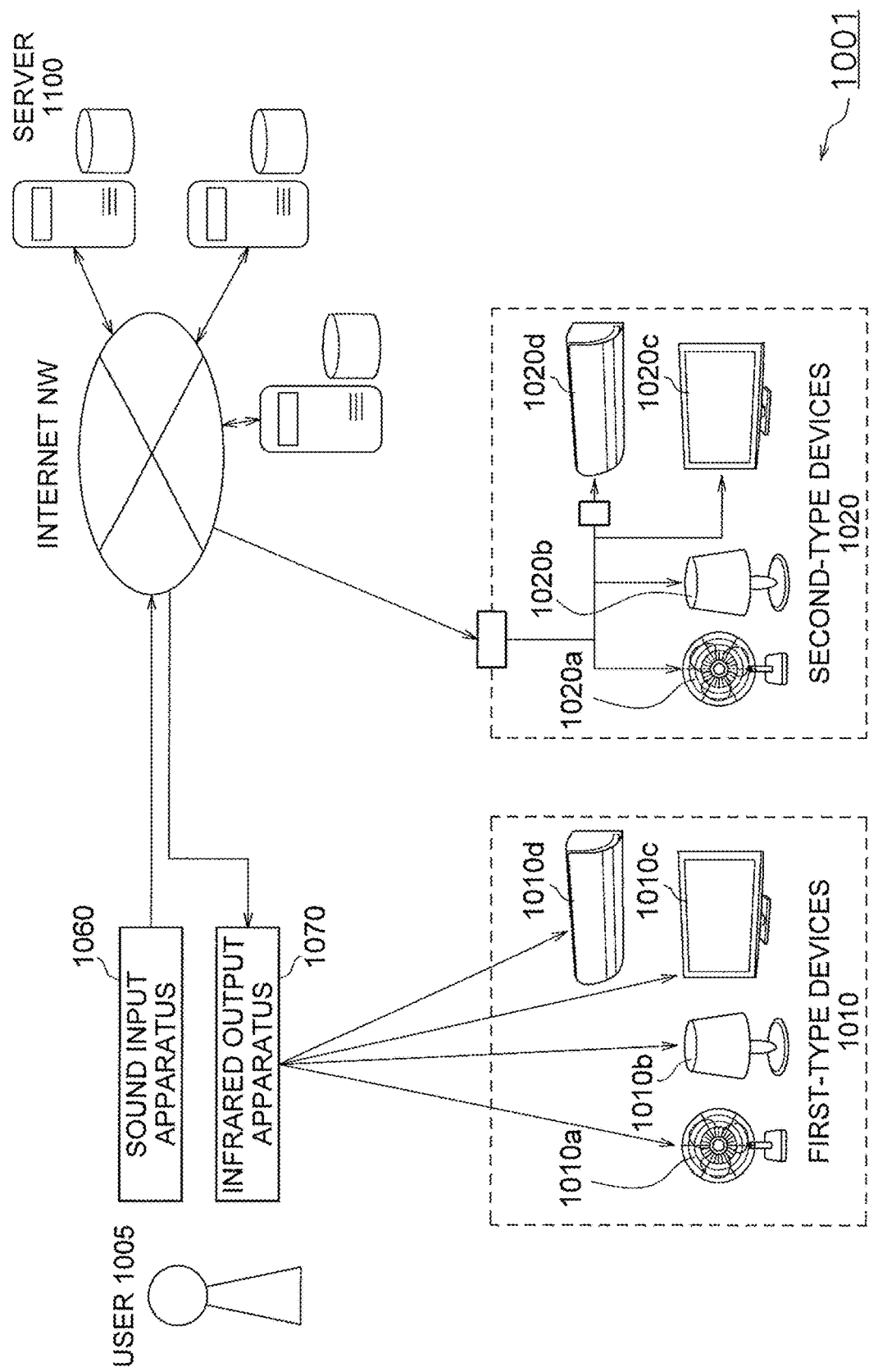
FIG. 1 is a schematic diagram illustrating the configuration of a device control system 1001 according to a first embodiment of a first configuration.
Figure 2:
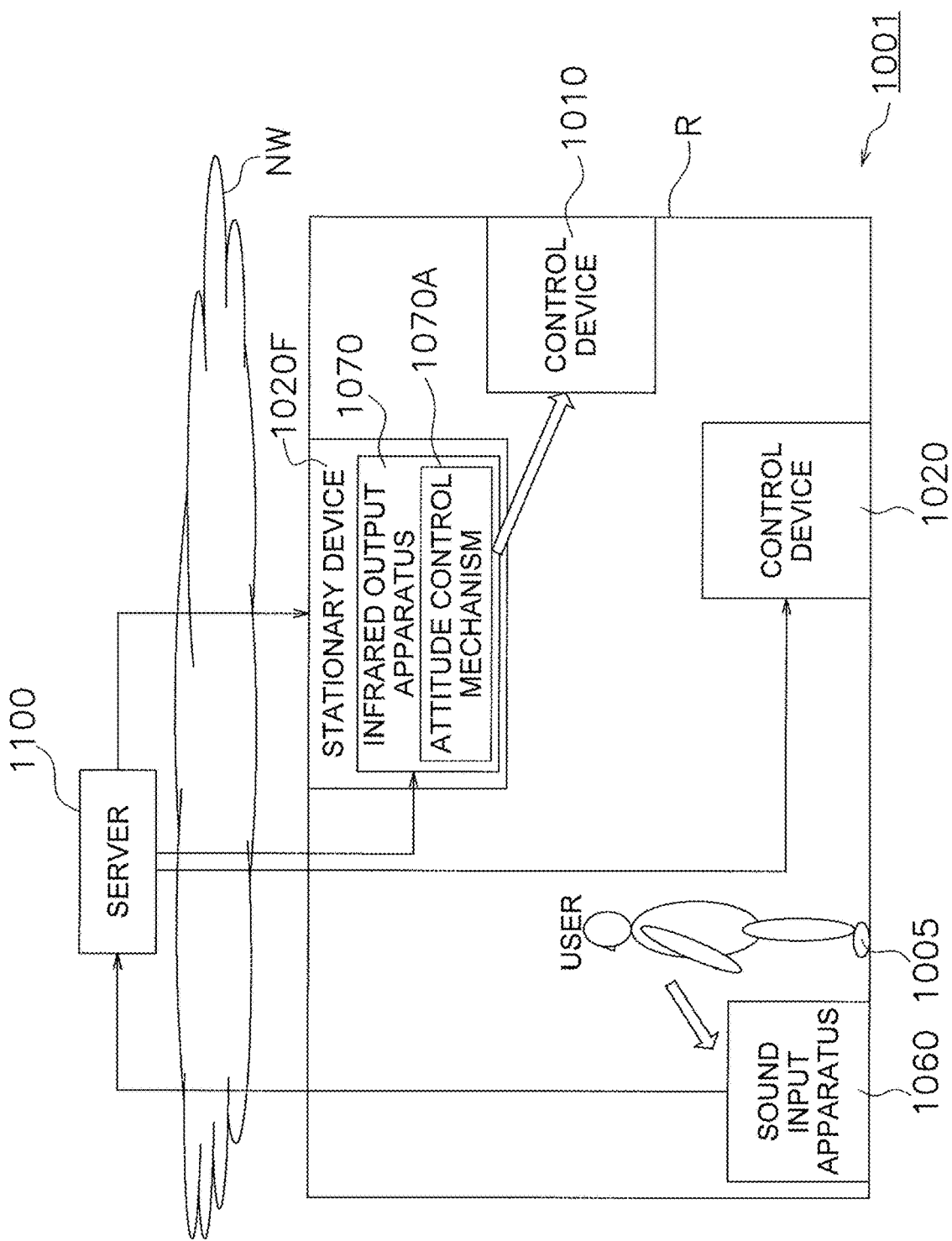
FIG. 2 is a schematic diagram illustrating the configuration of the device control system 1001 according to the embodiment.

FIGS. 1 and 2 are schematic diagrams illustrating the configuration of a device control system 1001 according to an embodiment of the present invention.

The device control system 1001 includes a sound input apparatus 1060, an infrared output apparatus 1070, and a server 1100. In the device control system 1001, a user 1005 can control certain control devices by inputting control instructions to the sound input apparatus 1060. Here, the control devices include "first-type devices 1010" and "second-type devices 1020". It is assumed that these control devices are provided in a room R.

Although FIGS. 1 and 2 illustrate one sound input apparatus 1060, one infrared output apparatus 1070, and one server 1100, the number of apparatuses is not limited to these. The server 1100 is capable of managing any number of apparatuses connected thereto.

The first-type devices 1010 are devices that can be controlled by infrared output signals. For example, the first-type devices 1010 include a fan 1010*a*, a lighting device 1010*b*, a television 1010*c*, and an air conditioner 1010*d*. In addition, a pattern of infrared output signals is set in advance for each control device, and each of the control devices 1010 can be controlled using the pattern. Here, correspondences between patterns of infrared output signals and control content are stored in an infrared pattern DB 1104A, which will be described later. In the following description, a numeral 1010 is used to refer to an arbitrary first-type device, and an English lowercase letter is added when a specific first-type device is referred to.

The second-type devices 1020 are devices that can be directly controlled by the server 1100 through a network NW. As with the first-type devices 1010, the second-type devices 1020 may include a fan 1020*a*, a lighting device 1020*b*, a television 1020*c*, and an air conditioner 1020*d*. In the following description, a numeral 1020 is used to refer to an arbitrary second-type device, and an English lowercase letter is added when a specific second-type device is referred to.

The sound input apparatus 1060 receives input of control instructions to the certain control devices 1010 and 1020. Here, the sound input apparatus 1060 includes a microphone and receives, as a sound input, a control instruction to a control device 1010 or 1020 from the user 1005 through the microphone. The sound input apparatus 1060 then transmits sound information corresponding to the received sound input to the server 1100. When the sound input apparatus 1060 has detected a sound uttered by the user 1005, the sound input apparatus 1060 transmits sound information regarding the sound to the server 1100 as it is.

The infrared output apparatus 1070 outputs infrared rays to the control devices (first-type devices) 1010. The infrared output apparatus 1070 includes an attitude control mechanism 1070A. If the infrared output apparatus 1070 receives relative position information, which will be described later, from the server 1100, the attitude control mechanism 1070A controls an attitude of the infrared output apparatus 1070 in accordance with the relative position information. The infrared output apparatus 1070 can be provided inside a stationary device 1020F fixed in a certain space (room R). The stationary device 1020F is an air conditioner, a lighting device, or a television, for example, and fixed on a ceiling or a wall of the room R. Alternatively, the stationary device 1020F may be embedded in the ceiling or the wall of the room R.

Figure 3:
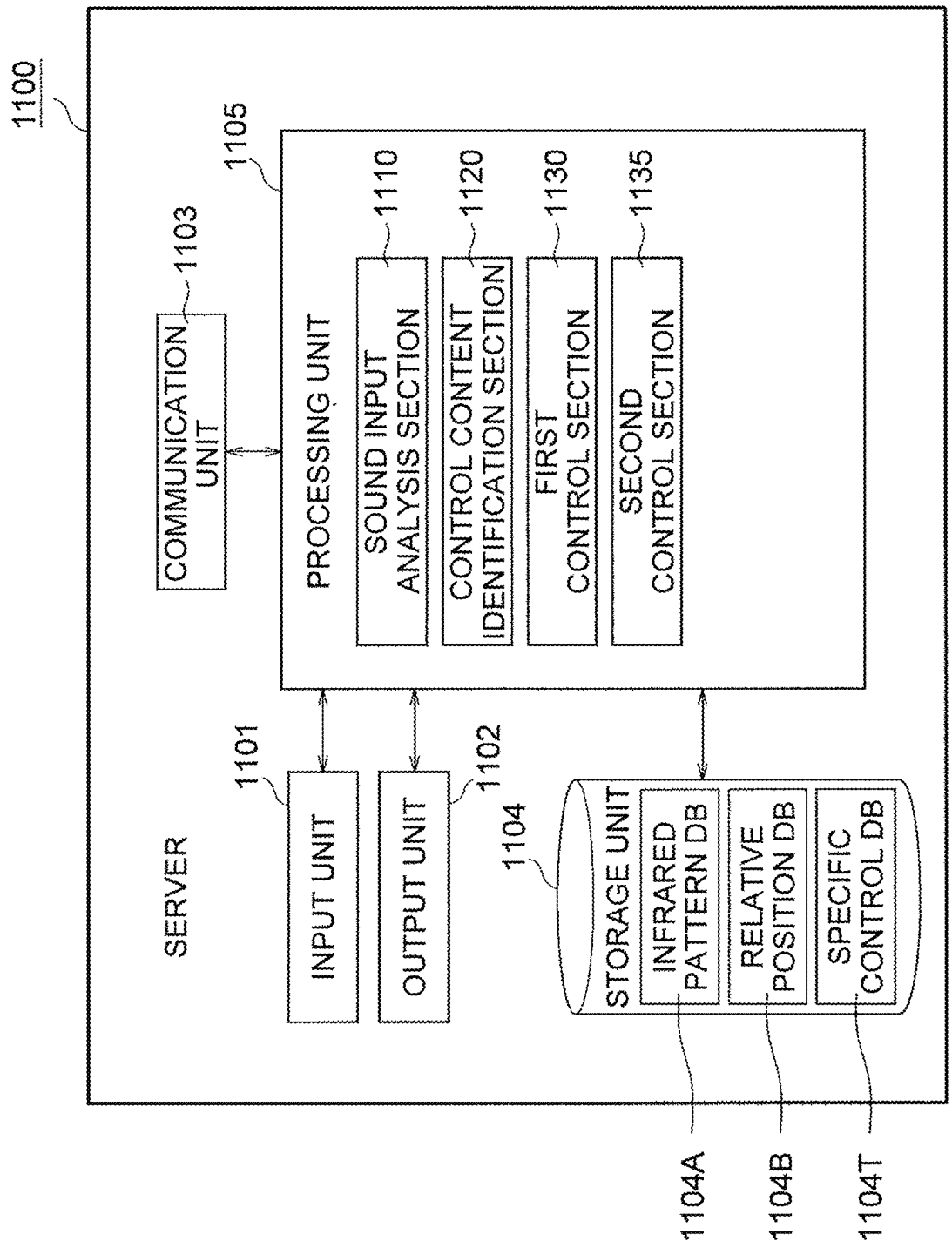
FIG. 3 is a schematic diagram illustrating the configuration of a server 1100 according to the embodiment.

As illustrated in FIG. 3, the server 1100 includes an input unit 1101, an output unit 1102, a communication unit 1103, a storage unit 1104, and a processing unit 1105 and is connected to the sound input apparatus 1060 and the infrared output apparatus 1070 through the network NW such as the Internet.

Here, the input unit 1101 is achieved by any input device and inputs various pieces of information to the server 1100. The output unit 1102 is achieved by any output device and outputs various pieces of information from the server 1100. The communication unit 1103 is connected to the external network NW and achieves information communication.

The storage unit 1104 is achieved by a ROM, a RAM, and the like and stores information input to the server 1100, information calculated by the server 1100, and the like. The storage unit 1104 stores the "infrared pattern database (DB) 1104A", a "relative position database (DB) 1104B", and a "specific control database (DB) 1104T".

The infrared pattern DB 1104A stores correspondences between patterns of infrared output signals and control content for each of the control devices (first-type devices 1010).

The relative position DB 1104B stores "relative position information", which indicates relative positional relationships between the infrared output apparatus 1070 and the control devices (first-type devices 1010) in the certain space (room R). When the infrared output apparatus 1070 is fixed in the stationary device 1020F, information indicating relative positional relationships between a position of the stationary device 1020F and positions of the first-type devices 1010 may be used as the relative position information instead of the information indicating the relative positional relationships between the position of the infrared output apparatus 1070 and the positions of the first-type devices 1010.

The specific control DB 1104T stores "specific control", in which sound inputs corresponding to certain keywords and certain types of control performed on the control devices are associated with each other. The specific control is set by a setting facilitation apparatus 1400, which will be described later.

The processing unit 1105 is achieved by a CPU or the like and processes information in the server 1100. Here, the processing unit 1105 executes a program stored in the storage unit 1104 to function as a "sound input analysis section 1110", a "control content identification section 1120", a "first control section 1130", and a "second control section 1135".

The sound input analysis section 1110 analyzes the content of inputs received from the sound input apparatus 1060. More specifically, the sound input apparatus 1060 analyzes sound information using a neural network or the like to obtain a meaning of a sound and converts the sound information into text information.

The control content identification section 1120 identifies control content indicating a control device and a control instruction from a result of an analysis conducted by the sound input analysis section 1110. When the sound input apparatus 1060 has received a sound input, for example, the control content identification section 1120 determines whether text information obtained as a result of conversion performed by the sound input analysis section 1110 includes verbal information corresponding to a control device and a control instruction and identifies control content.

Here, if the control content identification section 1120 identifies the control device as a first-type device 1010, the control content identification section 1120 transmits control content corresponding to the control device to the first control section 1130. If the control content identification section 1120 identifies the control device as a second-type device 1020, on the other hand, the control content identification section 1120 transmits control content corresponding to the control device to the second control section 1135.

If the control content identification section 1120 identifies control content relating to a first-type device 1010, the first control section 1130 transmits an infrared pattern corresponding to the control content to the infrared output apparatus 1070. More specifically, the first control section 1130 transmits a command to output infrared rays to the infrared output apparatus 1070 on the basis of the control content identified by the control content identification section 1120 and the information stored in the infrared pattern DB 1104A. As a result, the first-type device 1010 is controlled through the infrared output apparatus 1070. The first control section 1130 also transmits relative position information regarding the infrared output apparatus 1070 and the target first-type device 1010 to the infrared output apparatus 1070 as well as the command to output infrared rays. The relative position information is extracted from the relative position DB 1104B.

If the control content identification section 1120 identifies control content relating to a second-type device 1020, the second control section 1135 controls the second-type device 1020 through the network NW on the basis of the control content.

(1-2) Operation of Device Control System 1001

Figure 4A:
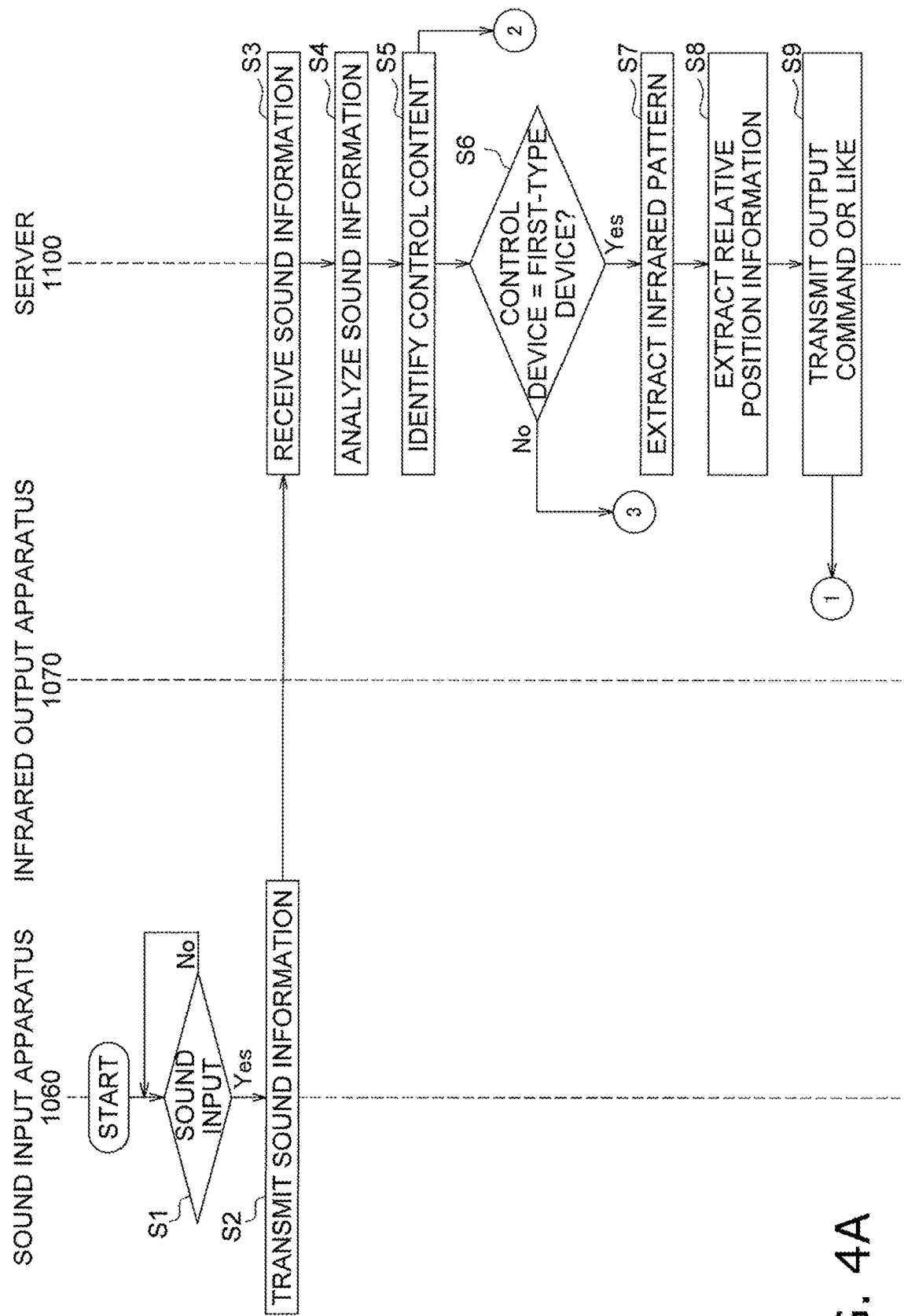
FIG. 4A is a sequence diagram illustrating the operation of the device control system 1001 according to the embodiment.
Figure 4B:
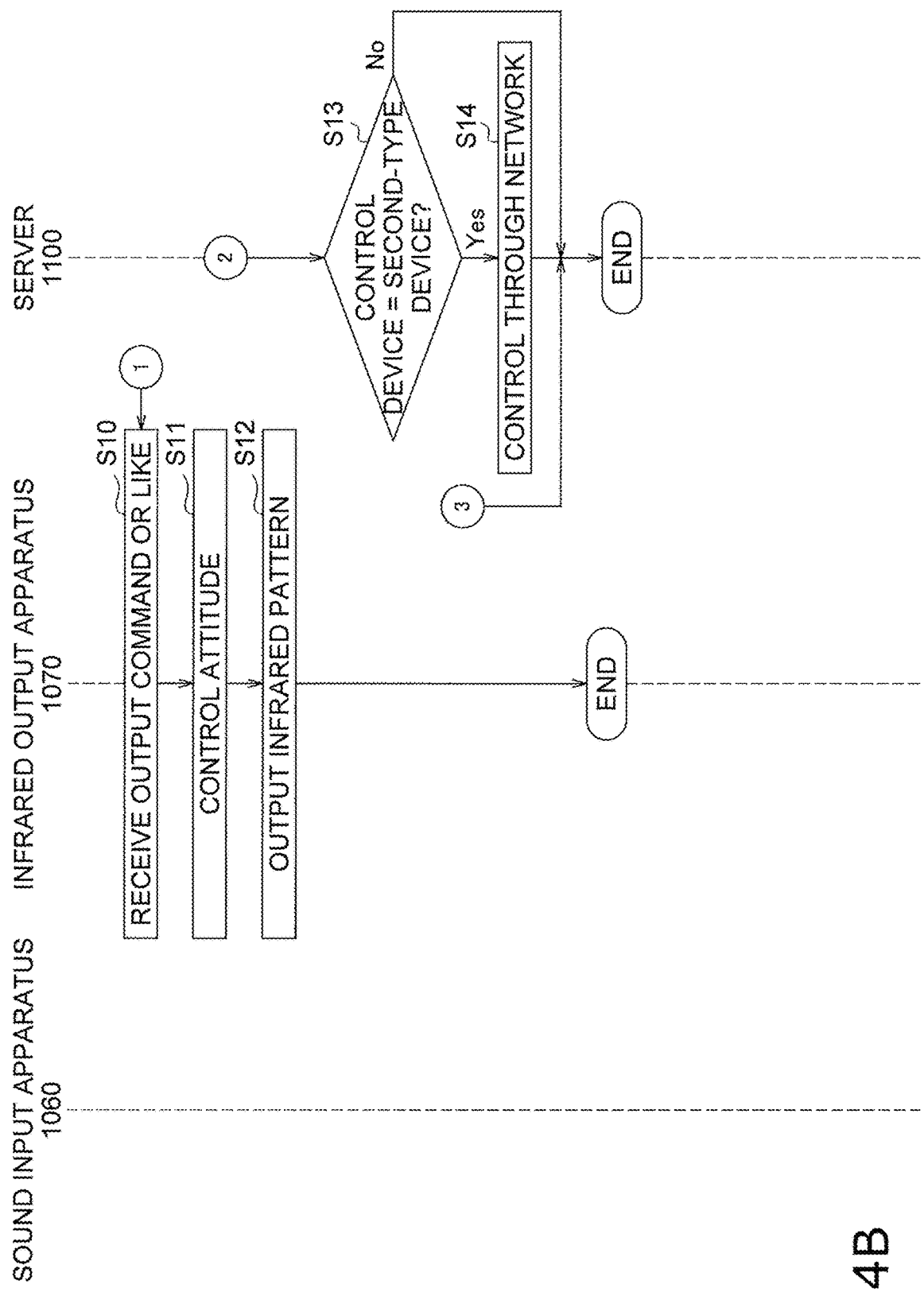
FIG. 4B is a sequence diagram illustrating the operation of the device control system 1001 according to the embodiment.

FIGS. 4A and 4B are sequence diagrams illustrating the operation of the device control system 1001 according to the present embodiment.

First, the user 1005 uses the sound input apparatus 1060 to issue a sound input for a control device 1010, 1020 (S1). The sound input apparatus 1060 then transmits input information corresponding to the received sound input to the server 1100 (S2).

Next, the server 1100 receives input information (S3) and analyzes the content of the sound input (S4). Next, the server 1100 identifies control content indicating the control device 1010 or 1020 and a control instruction to the control device 1010 or 1020 (S5).

Here, if determining that the control content relates to a first-type device 1010 (S6—Yes), the server 1100 extracts information regarding an infrared pattern from the infrared pattern DB 1104A on the basis of the control content (S7). The server 1100 also extracts relative position information regarding the first-type device 1010 and the infrared output apparatus 70 (or the stationary device 1020F) from the relative position DB 1104B (S8). The server 1100 then transmits the information regarding an infrared pattern and the relative position information to the infrared output apparatus 1070 along with a command to output infrared rays (S9).

Next, upon receiving the information regarding an infrared pattern and the relative position information along with the command to output infrared rays (S10), the infrared output apparatus 1070 turns to the control device 1010 on the basis of the relative position information (S11). The infrared output apparatus 1070 then outputs infrared rays to the control device (first-type device) 1010 on the basis of the received information regarding an infrared pattern (S12).

In parallel with step S6, if determining that the control content relates to a second-type device 1020 (S13—Yes), on the other hand, the server 1100 controls the control device (second-type device) 1020 through the network NW (S14) on the basis of the control content.

If the server 1100 cannot determine that the control content relates to a first-type device 1010 or a second-type device 1020 in steps S6 and S13, the process ends (S6—No, S13—No).

Steps S6 to S9 and steps S13 and S14 are performed in no specific order, that is, either series of steps may precede the other.

(1-3) Characteristics

As described above, the device control system 1001 according to the present embodiment includes the sound input apparatus 1060, the infrared output apparatus 1070, and the server 1100. Here, the sound input apparatus 1060 receives control instructions to the control devices 1010, 1020 from the user 1005 as sound inputs. The infrared output apparatus 1070 outputs infrared rays to the control devices 1010, 1020. The server 1100 includes the sound input analysis section 1110, the control content identification section 1120, the first control section 1130, and the second control section 1135. The sound input analysis section 1110 analyzes the content of an input received from the sound input apparatus 1060. The control content identification section 1120 identifies control content indicating a control device and a control instruction from a result of the analysis conducted by the sound input analysis section 1110. If the control content identification section 1120 identifies control content relating to a first-type device 1010, the first control section 1130 transmits an infrared pattern corresponding to the control content to the infrared output apparatus 1070. If the control content identification section 1120 identifies control content relating to a second-type device 1020, the second control section 1135 controls the second-type device 1020 through the network NW on the basis of the control content.

In the device control system 1001 according to the present embodiment, the first-type devices 1010, which can be controlled by outputting infrared patterns, and the second-type devices 1020, which can be controlled through the network NW, can thus be controlled.

Furthermore, in the device control system 1001S according to the present embodiment, the server 1100 in the network NW can transmit a command to output infrared rays to the infrared output apparatus 1070S on the basis of a result of an analysis of a sound input. When a device is to be controlled through a sound input, the amount of information to be processed can be enormous. Even in this case, the device control system 1001S can accurately conduct a sound analysis by using the server 1100 that achieves a neural network or the like constructed in the network NW. As a result, a control device 1010 and a control instruction can be precisely identified even with a sound input. Consequently, a device control system 1001 capable of easily controlling any device can be provided.

In the device control system 1001 according to the present embodiment, the server 1100 in the network NW includes the infrared pattern DB 1104A, which stores correspondences between patterns of infrared output signals and certain control content for each control device. As a result, a change, an update, an addition, and the like to the patterns of infrared output signals can be made through a single process. In the device control system 1001 according to the present embodiment, however, the information stored in the infrared pattern DB 1104A need not be stored in the server 1100 but may be stored in a storage unit of each infrared output apparatus 1070.

Figure 5:
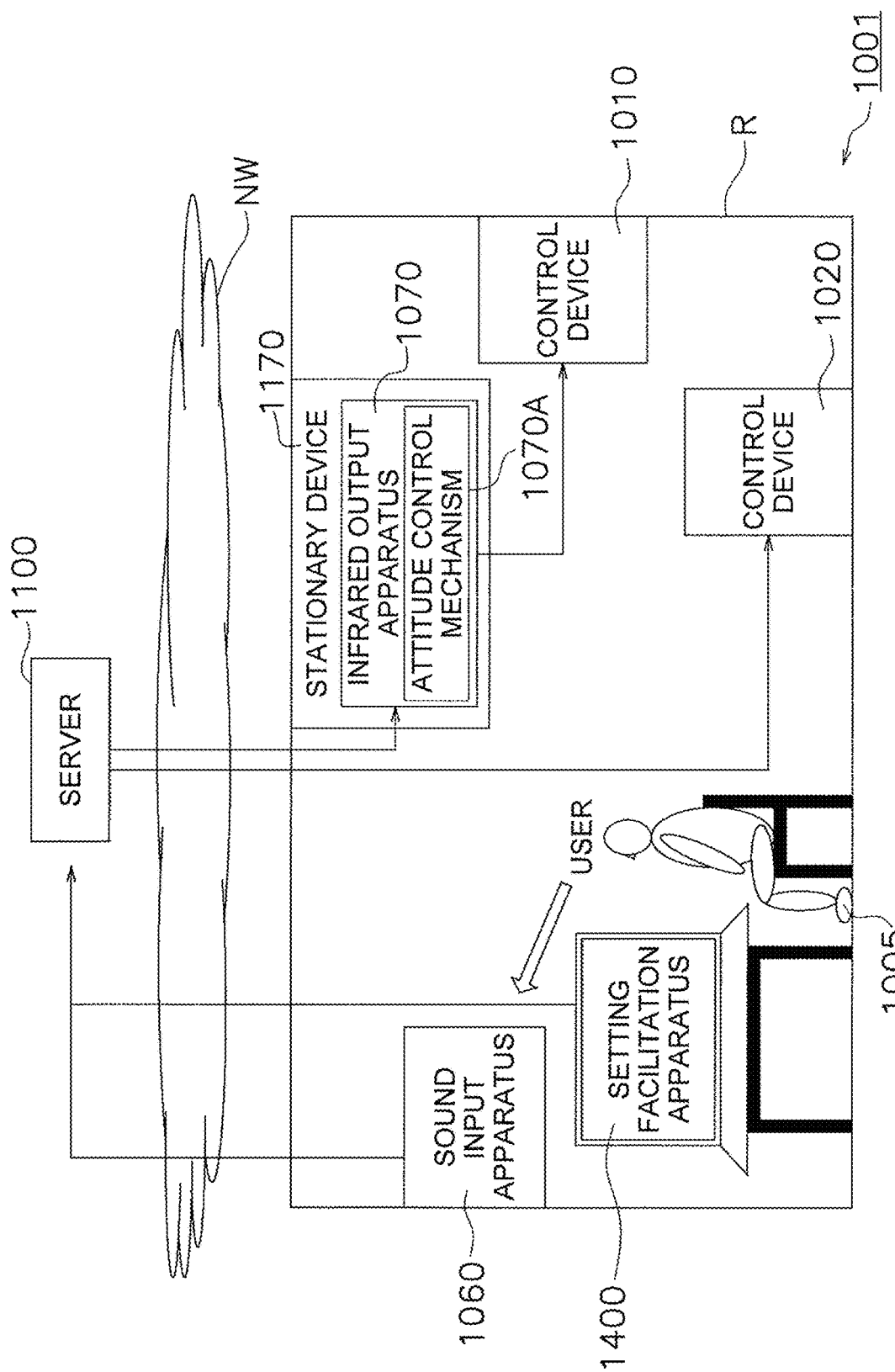
FIG. 5 is a schematic diagram illustrating the configuration of the device control system 1001 according to the embodiment.

(2) Details of Setting Facilitation Apparatus (2-1) Configuration of Setting Facilitation Apparatus As illustrated in FIG. 5, the setting facilitation apparatus 1400 is connected to the above-described device control system 1001 through the network NW and facilitates setting for making it easier to control the control devices 1010 and 1020. More specifically, the setting facilitation apparatus 1400 is an apparatus for facilitating association of a sound input corresponding to a certain keyword K and a certain type of control performed on a control device with each other and setting the sound input and the certain type of control as "specific control". The setting facilitation apparatus 1400 is achieved by installing a "setting facilitation program", which will be described later, on a computer.

Figure 6:
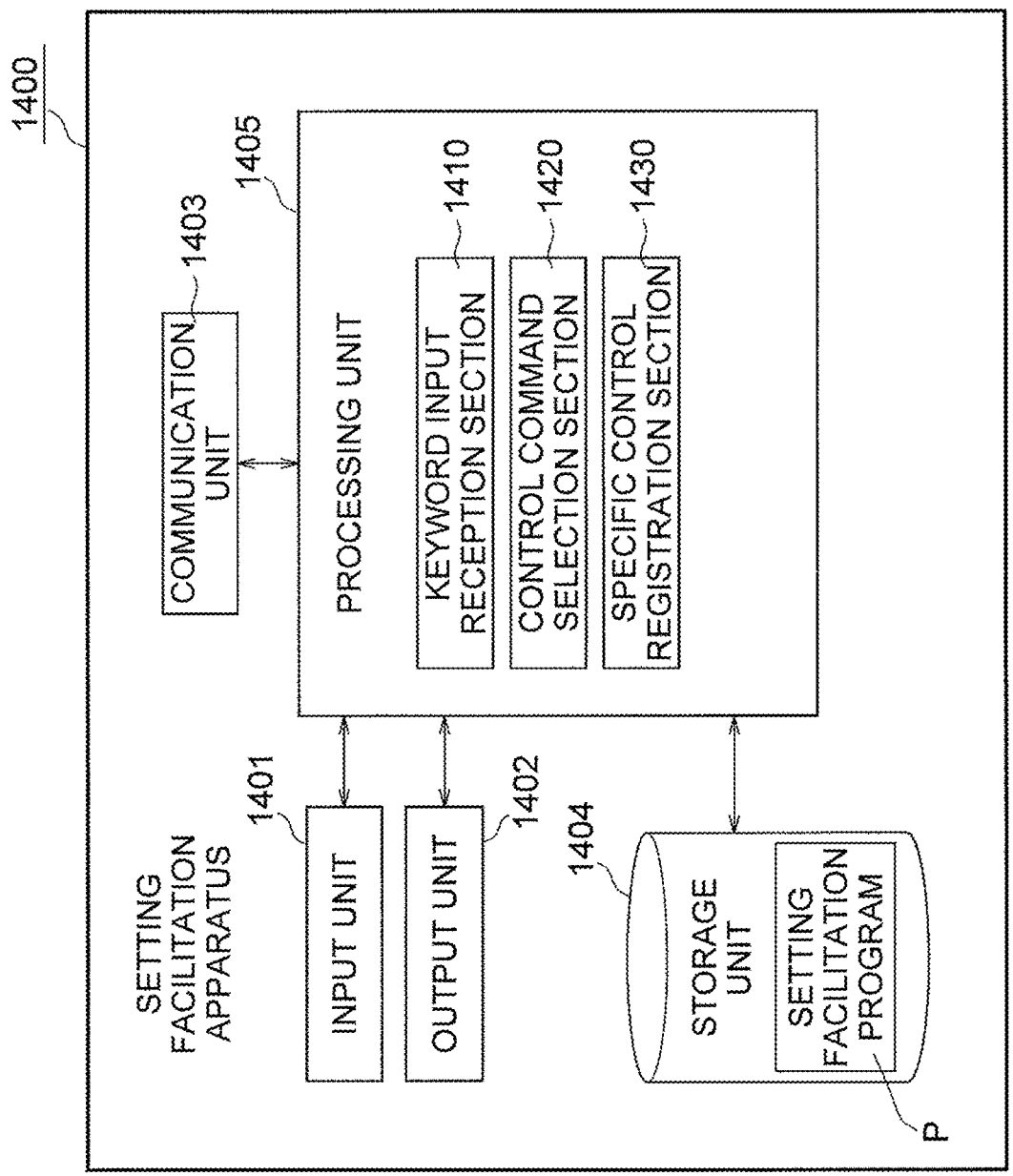
FIG. 6 is a schematic diagram illustrating the configuration of a setting facilitation apparatus 1400 according to the embodiment.

As illustrated in FIG. 6, the setting facilitation apparatus 1400 includes an input unit 1401, an output unit 1402, a communication unit 1403, a storage unit 1404, and a processing unit 1405 and is connected to the server 1100 through the network NW such as the Internet. The input unit 1401 is achieved by a keyboard, a microphone, or the like and inputs various pieces of information to the setting facilitation apparatus 1400. The output unit 1402 is achieved by a display or the like and outputs various pieces of information from the setting facilitation apparatus 1400. The communication unit 1403 is connected to the external network NW and achieves information communication. The storage unit 1404 is achieved by a ROM, a RAM, and the like and stores information input to the setting facilitation apparatus 1400, information calculated by the setting facilitation apparatus 1400, and the like. The processing unit 1405 is achieved by a CPU or the like and processes information in the setting facilitation apparatus 1400. Here, the processing unit 1405 executes a "setting facilitation program P" stored in the storage unit 1404 to function as a "keyword input reception section 1410", a "control command selection section 1420", and a "specific control registration section 1430".

The keyword input reception section 1410 receives a sound input corresponding to a certain keyword K. More specifically, the keyword input reception section 1410 displays, on an edit screen G, a keyword image GK in which a keyword K can be input and receives text information regarding the keyword K through a keyboard or the like (refer to FIG. 8, which will be referred to later, and the like). Alternatively, the keyword input reception section 1410 may receive a sound input corresponding to the keyword K through a microphone or the like.

Figure 10:
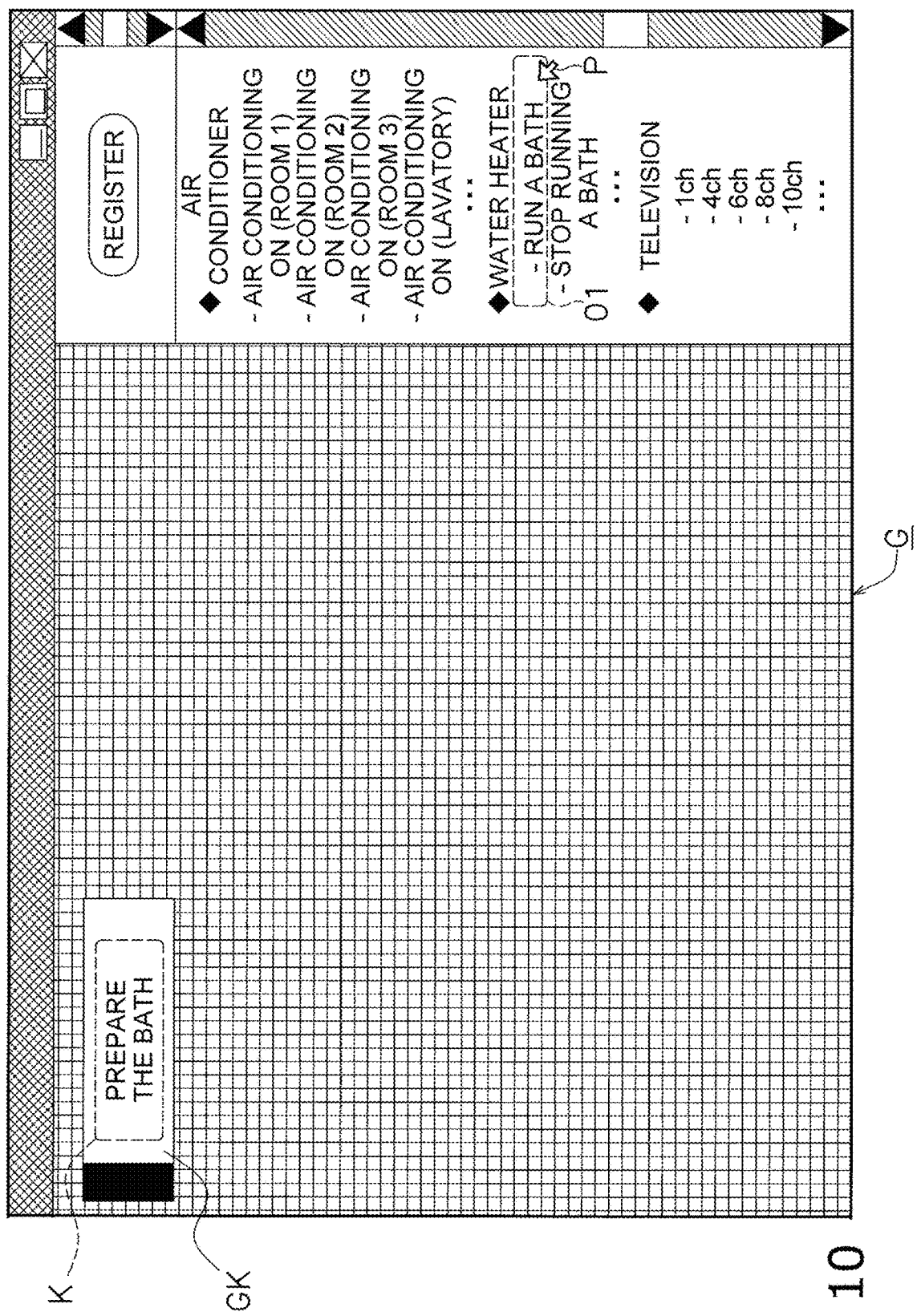
FIG. 10 is a schematic diagram illustrating the concept of screen transition of the setting facilitation apparatus 1400 according to the embodiment.

The control command selection section 1420 displays certain control commands O to the control devices 1010 and 1020 on the edit screen G and receives selection of the control commands O (refer to FIG. 10, which will be referred to later, and the like). More specifically, the control command selection section 1420 displays, on the edit screen G, a control command image GO corresponding to the control commands O. For example, the control command selection section 1420 displays, on the edit screen G, a control command image GO in which a plurality of control commands O1, O2, . . . are displayed in a pulldown format. If one of the plurality of control commands O1, O2, . . . displayed in a pulldown format is selected, the selected control command O is received.

The specific control registration section 1430 associates a keyword K input by the keyword input reception section 1410 and a control command O selected by the control command selection section 1420 with each other as "specific control" and registers the specific control to the specific control DB 1104T of the server 1100. More specifically, the specific control registration section 1430 associates a keyword K and a control command O with each other by selecting and moving the keyword image GK and the control command image GO on the edit screen G. The specific control registration section 1430 can associate a plurality of control commands O1, O2, . . . with a single keyword K, as well as associating a single control command O1 with a single keyword K. The specific control registration section 1430 can register specific control to the specific control DB 1104T while associating the specific control with user information for identifying the user 5. The specific control registration section 1430 can also register specific control to the specific control DB 1104T while associating the specific control with a voiceprint of the user 5 at a time when the user 5 has read a keyword.

(2-2) Operation of Setting Facilitation Apparatus 1400

Figure 7:
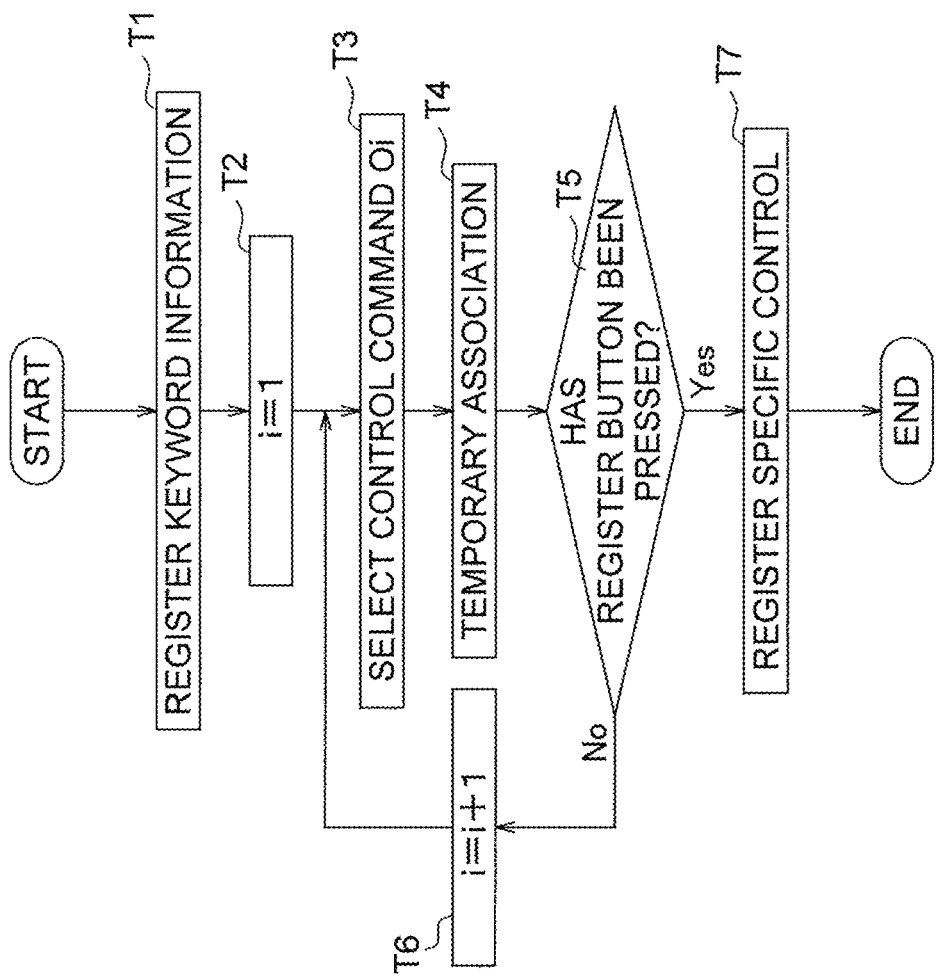
FIG. 7 is a flowchart illustrating the operation of the setting facilitation apparatus 1400 according to the embodiment.

FIG. 7 is a flowchart illustrating the operation of the setting facilitation apparatus 1400 according to the present embodiment. FIGS. 8 to 15 are schematic diagrams illustrating a concept of screen transition of the setting facilitation apparatus 1400 according to the embodiment.

Figure 8:
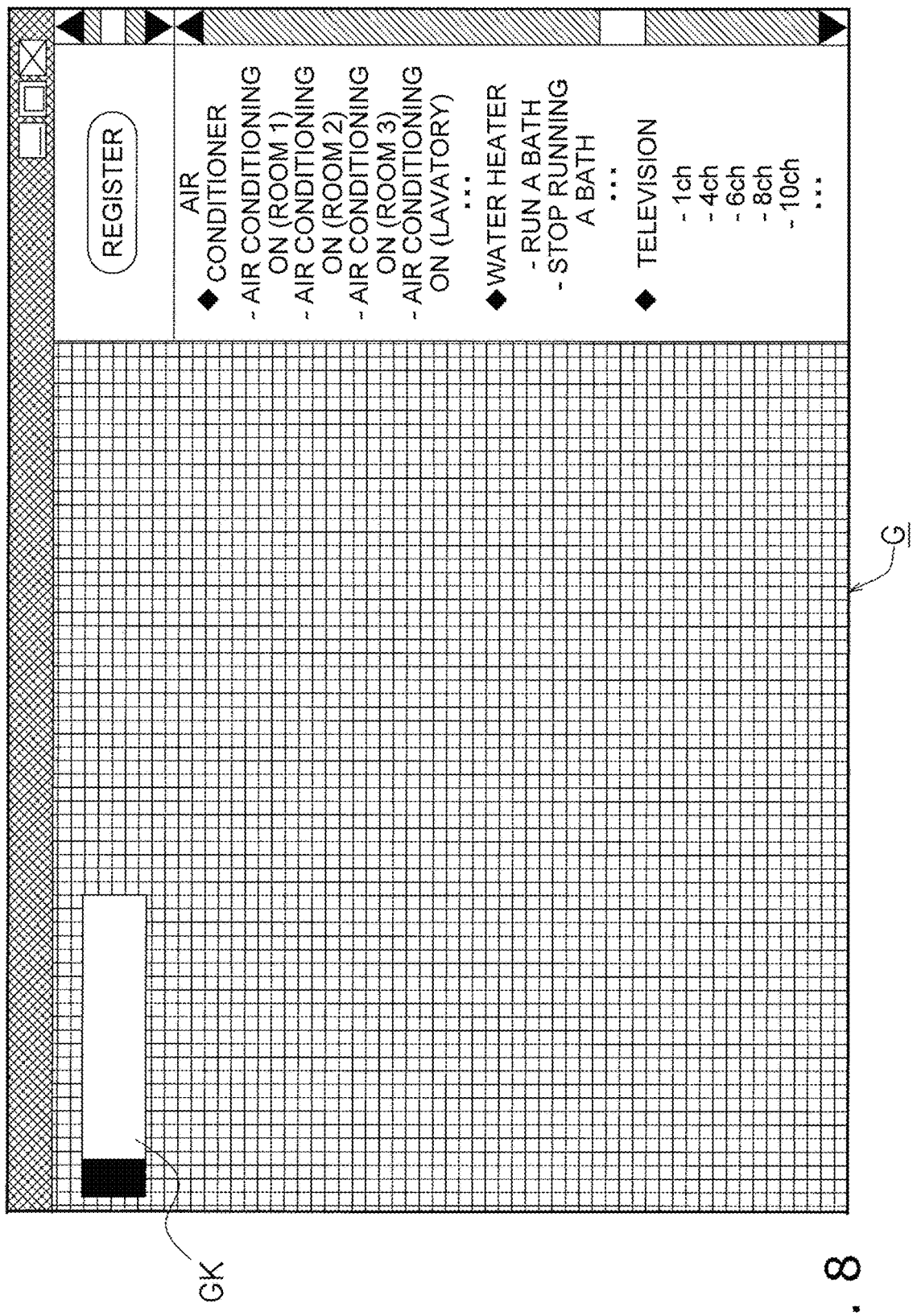
FIG. 8 is a schematic diagram illustrating a concept of screen transition of the setting facilitation apparatus 1400 according to the embodiment.
Figure 9:
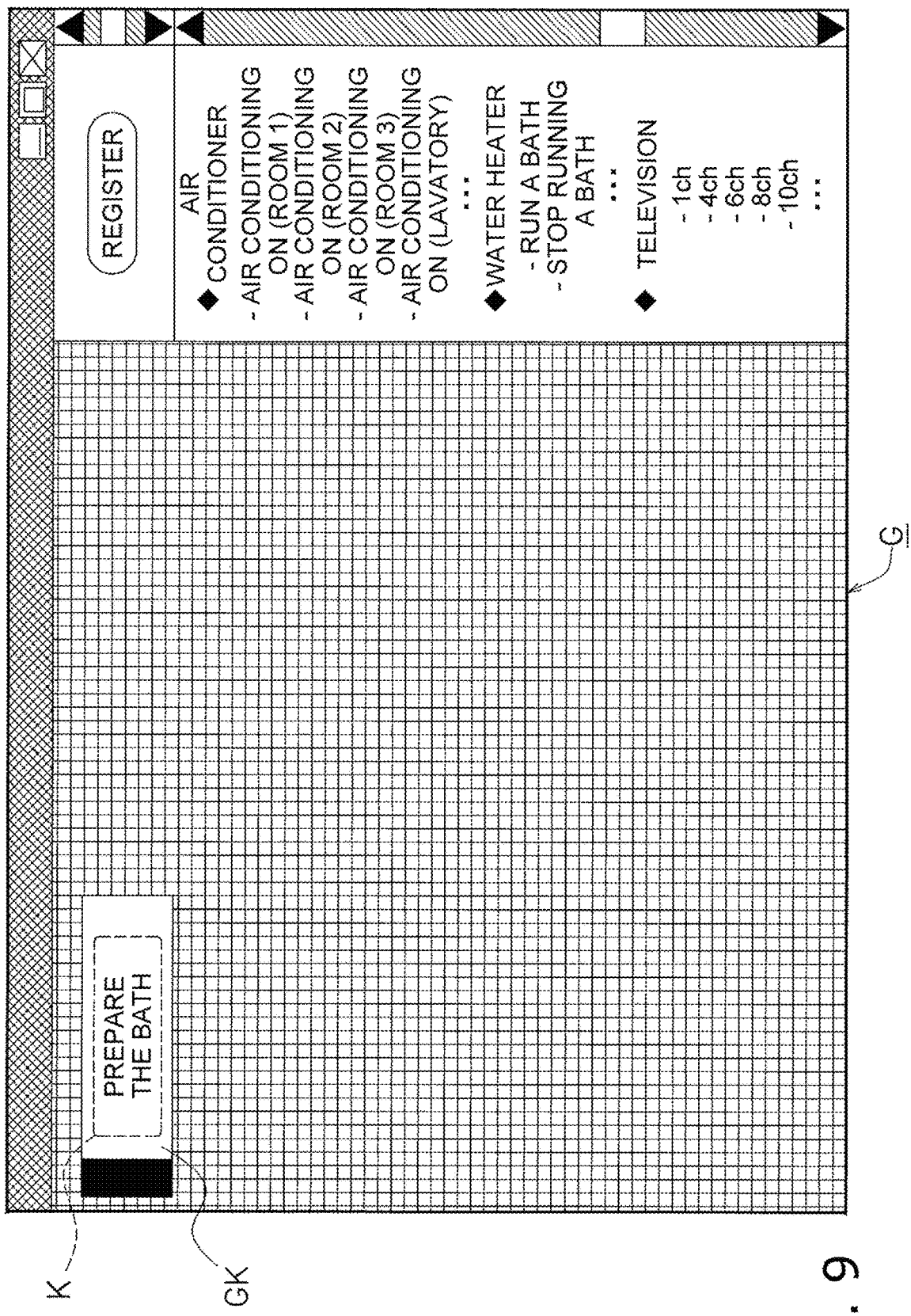
FIG. 9 is a schematic diagram illustrating the concept of screen transition of the setting facilitation apparatus 1400 according to the embodiment.

First, the user 1005 uses the setting facilitation apparatus 1400 to register a keyword K for a control device 1010, 1020 (T1). More specifically, the user 1005 inputs a display command through the input unit 1401, and a keyword image GK illustrated in FIG. 8 is displayed on the edit screen G. A keyword K can be input in a blank part of the keyword image GK. Here, a word "prepare the bath" is input as an example of the keyword K as illustrated in FIG. 9.

Figure 11:
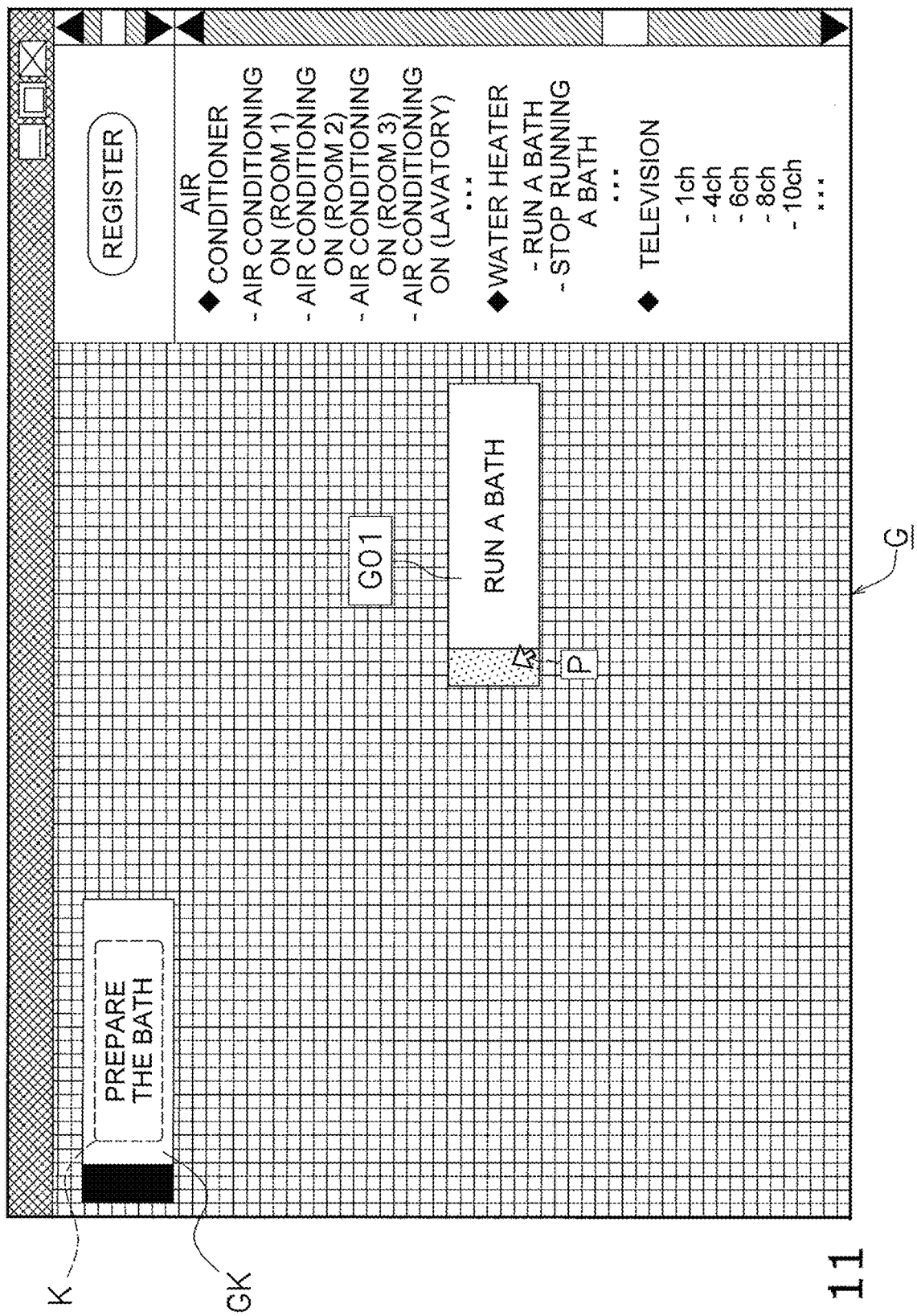
FIG. 11 is a schematic diagram illustrating the concept of screen transition of the setting facilitation apparatus 1400 according to the embodiment.

Next, the user 5 uses the input unit 1401 to select a control command image GO1 displayed on the edit screen G. Here, a plurality of control commands O1, O2, . . . are displayed on the edit screen G in a pulldown format. As illustrated in FIG. 10, the user 1005 selects a control command O from the plurality of control commands O1, O2, . . . by operating a pointer P displayed on the edit screen G (T2). It is assumed in FIG. 10 that O1 (corresponds to "run a bath") is selected. As a result, a control command image GO1 corresponding to the selected control command is displayed as illustrated in FIG. 11.

Figure 12:
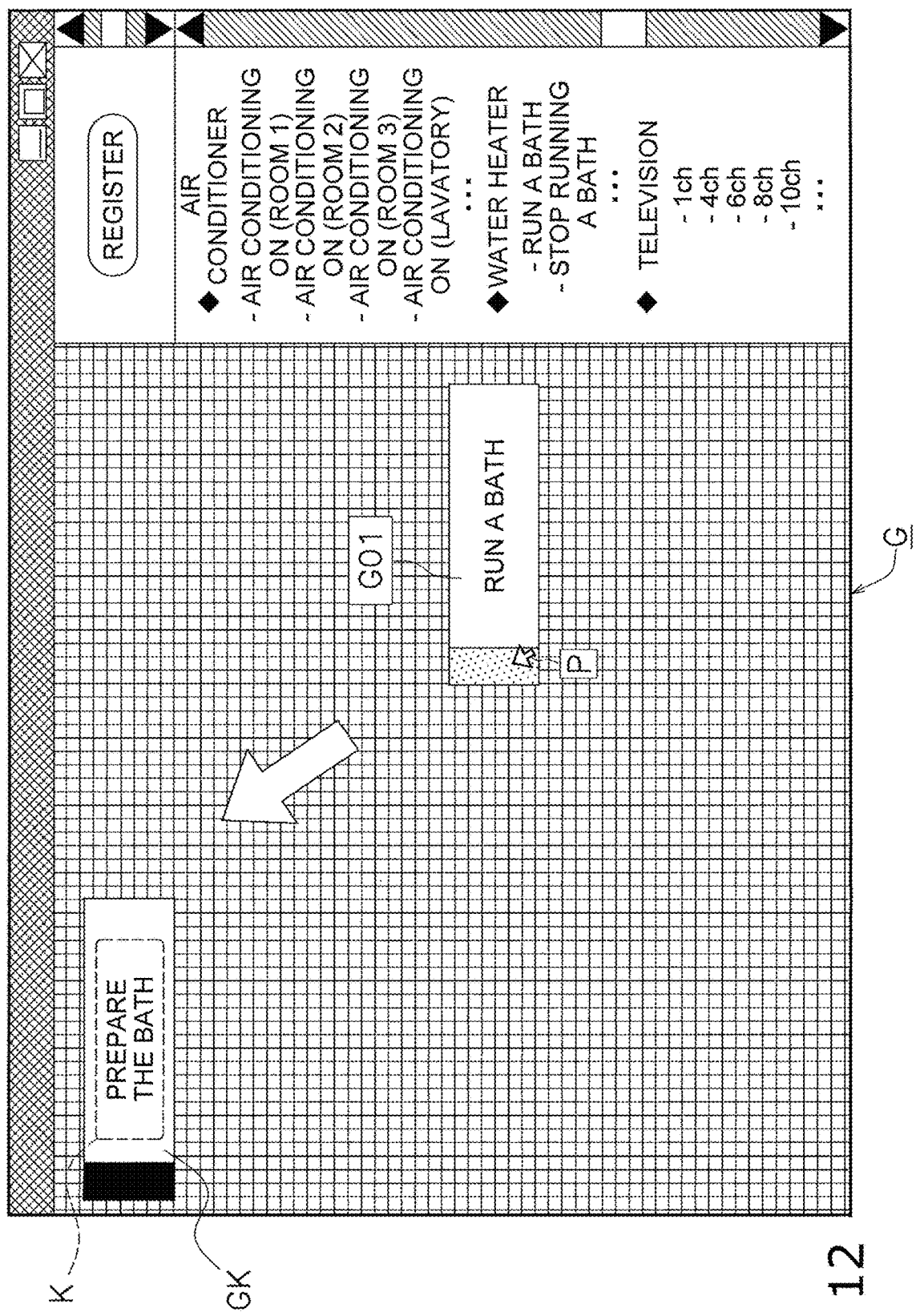
FIG. 12 is a schematic diagram illustrating the concept of screen transition of the setting facilitation apparatus 1400 according to the embodiment.
Figure 13:
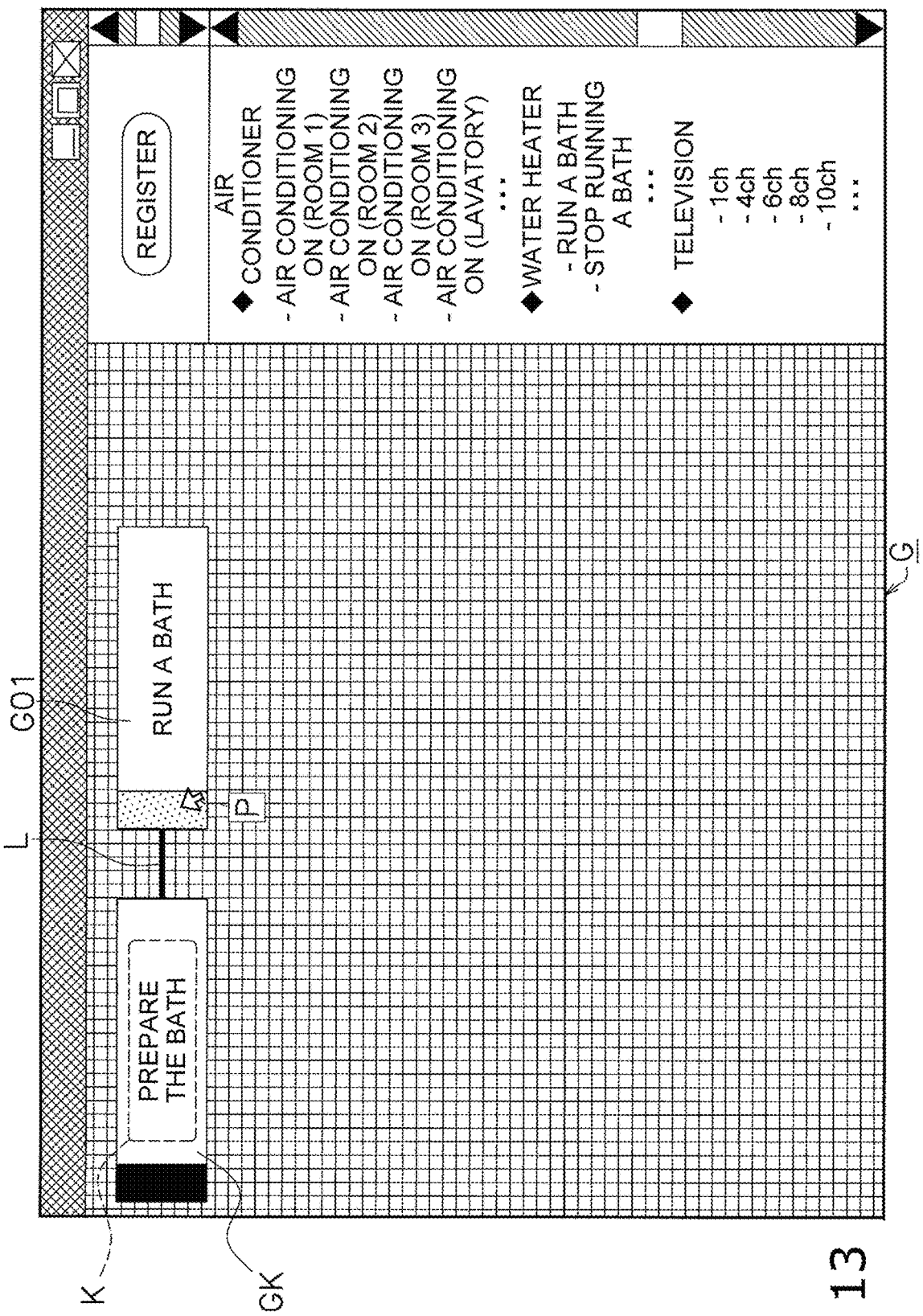
FIG. 13 is a schematic diagram illustrating the concept of screen transition of the setting facilitation apparatus 1400 according to the embodiment.
Figure 14:
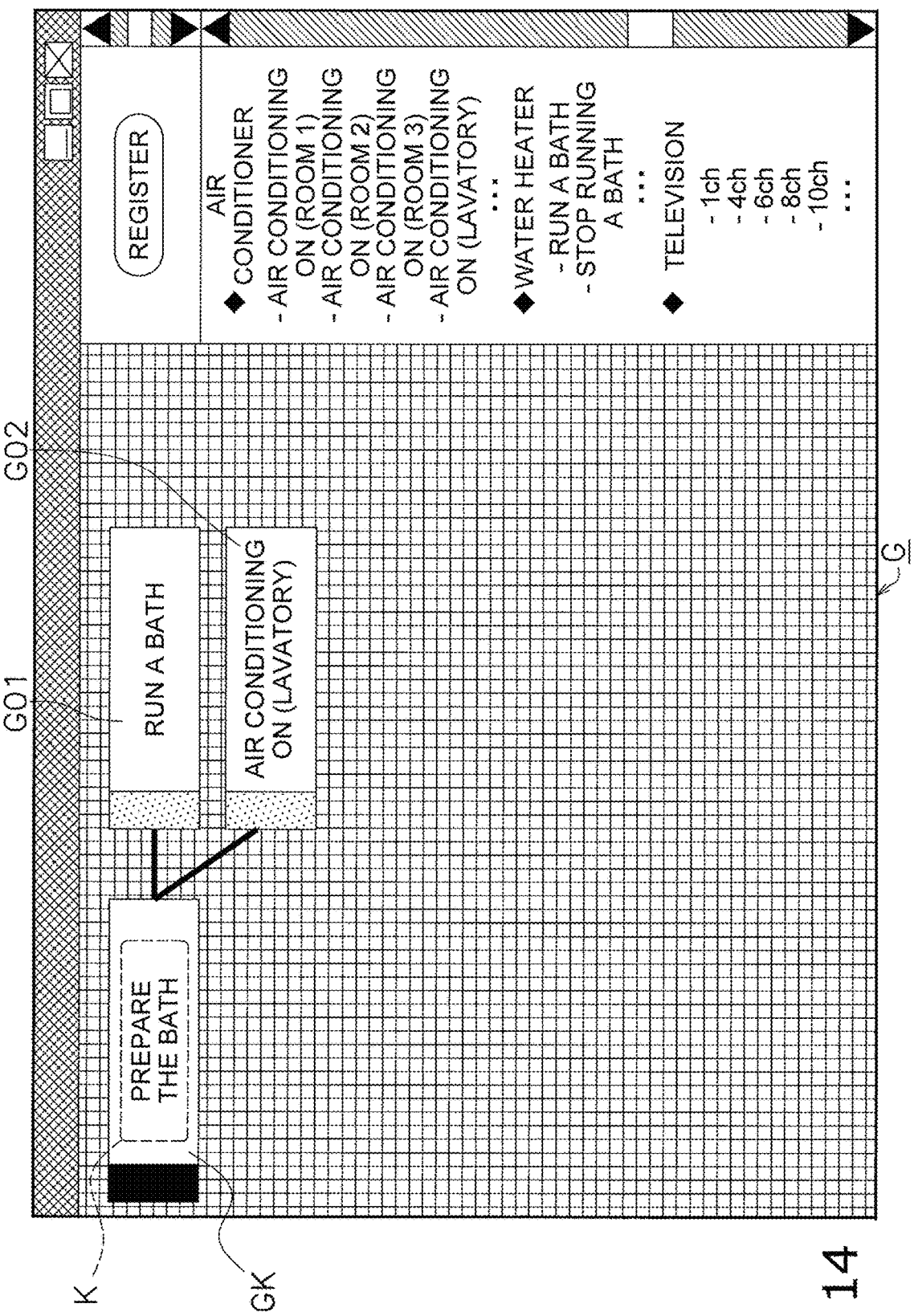
FIG. 14 is a schematic diagram illustrating the concept of screen transition of the setting facilitation apparatus 1400 according to the embodiment.

Next, as illustrated in FIG. 12, the user 1005 moves the control command image GO1 to a position near the keyword image GK by operating the pointer P. As a result, the keyword image GK and the selected control command image GO1 are temporarily associated with each other (T4). More specifically, as illustrated in FIG. 13, as the keyword image GK and the control command image GO1 become close to each other, a line L connecting the two is displayed, which indicates that the keyword image GK and the control command image GO1 have been temporarily associated with each other. The keyword image GK and another control command image GO2 are also temporarily associated with each other in a similar manner (T5—No, T6). As a result, a screen illustrated in FIG. 14 is displayed.

Figure 15:
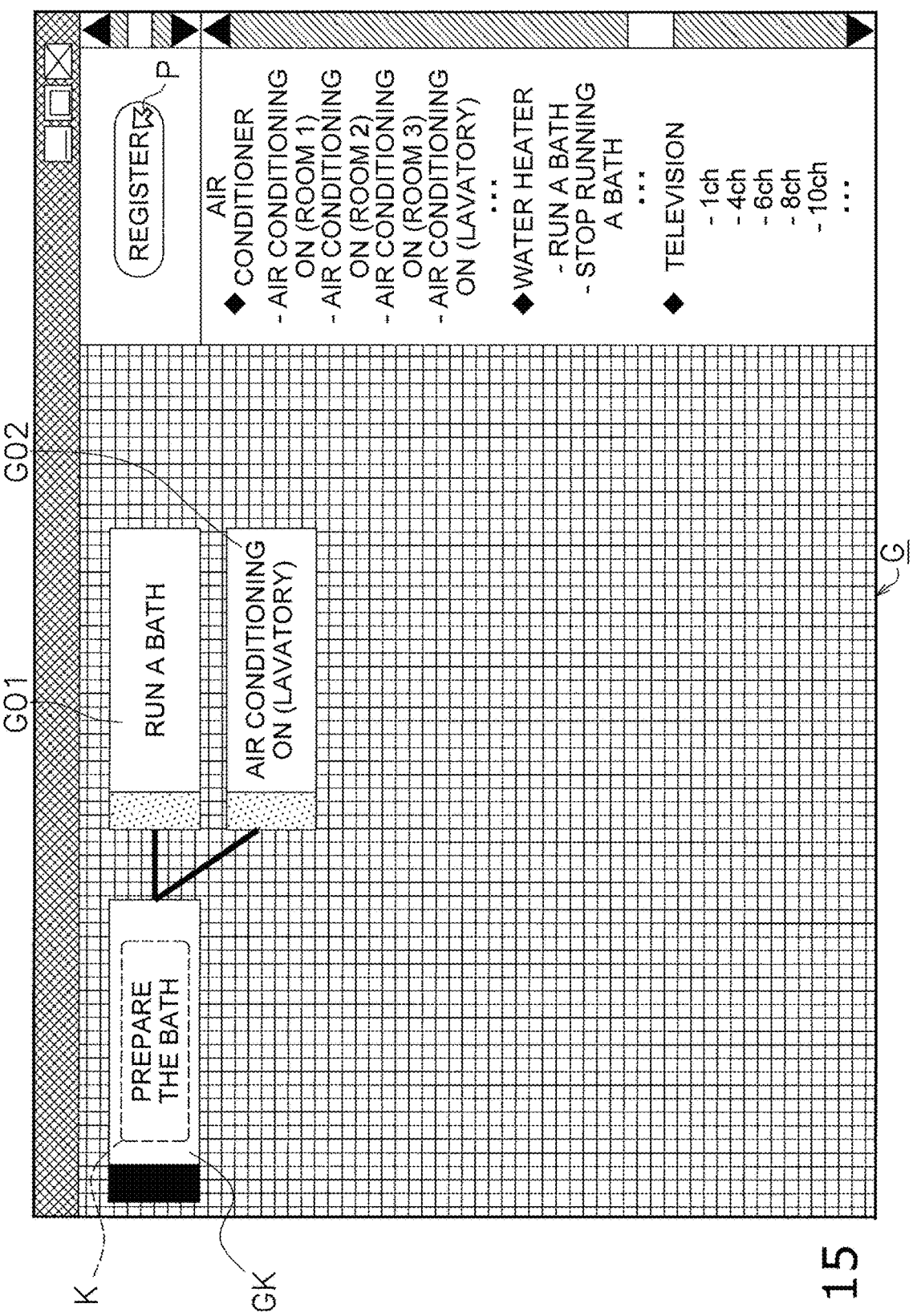
FIG. 15 is a schematic diagram illustrating the concept of screen transition of the setting facilitation apparatus 1400 according to the embodiment.

As illustrated in FIG. 15, the user 5 then presses a register button image GT or the like on the edit screen G, and the keyword K corresponding to the keyword image GK and the plurality of control commands O1, O2, . . . corresponding to the control command images GO1 and GO2 are associated with each other as "specific control" (T5—Yes). Information regarding the specific control is registered to the specific control DB 1104T of the server 1100 (T7).

(2-3) Characteristics (2-3-1)

As described above, the setting facilitation apparatus 1400 according to the present embodiment is an apparatus that facilitates setting of specific control in the device control system 1001 including the sound input apparatus 1060 that receives inputs of sounds uttered by the user, the sound input analysis section 1110 that analyzes the sounds, the control sections 1130 and 1135 that control the control devices 1010 and 1020 on the basis of results of the analyses conducted by the sound input analysis section 1110, and the specific control DB 1104T that stores sound inputs corresponding to certain keywords K and certain types of control performed on the control devices 1010 and 1020 associated with each other as specific control.

Here, the setting facilitation apparatus 1400 includes the keyword input reception section 1410, the control command selection section 1420, and the specific control registration section 1430. The keyword input reception section 1410 receives inputs of information corresponding to keywords. The control command selection section 1420 displays certain control commands to the control devices 1010 and 1020 on the edit screen G and receives selection of a control command. The specific control registration section 1430 registers a keyword K input by the keyword input reception section 1410 and a control command selected by the control command selection section 1420 to the specific control DB 1104T while associating the keyword K and the control command with each other.

Since the setting facilitation apparatus 1400 according to the present embodiment can associate keywords K corresponding to sound inputs and control commands to the control devices 1010 and 1020 on the edit screen G, therefore, the user 1005 can easily set control commands in the device control system 1001, in which the control devices 1010 and 1020 are controlled through sound inputs. Consequently, convenience improves for the user 1005 in the device control system 1001, in which the control devices 1010 and 1020 are controlled through sound inputs.

(2-3-2)

In addition, the specific control registration section 1430 of the setting facilitation apparatus 1400 according to the present embodiment can associate a plurality of control commands O1, O2, . . . with a single keyword K. As a result, a series of control including a plurality of operations can be performed with a sound input corresponding to a single keyword K.

(2-3-3)

In addition, the control command selection section 1420 of the setting facilitation apparatus 1400 according to the present embodiment can display a plurality of control commands on the edit screen G in a pulldown format. As a result, a setting facilitation apparatus 1400 with which the user 5 can intuitively set control commands can be provided.

Furthermore, the keyword input reception section 1410 of the setting facilitation apparatus 1400 according to the present embodiment displays, on the edit screen G, a keyword image GK in which a keyword can be input. In addition, the control command selection section 1420 displays a control command image GO corresponding to a control command on the edit screen G. In addition, the specific control registration section 1430 associates the keyword K and the control command with each other by selecting and moving the keyword image GK and the control command image GO and associating the keyword image GK and the control command image GO with each other on the edit screen G. As a result, a setting facilitation apparatus 1400 with which the user 1005 can intuitively set control commands can be provided.

(2-3-4)

In addition, the specific control registration section 1430 of the setting facilitation apparatus 1400 according to the present embodiment registers specific control while associating the specific control with user information. As a result, a control command that suits each user's taste can be set.

Furthermore, the specific control registration section 1430 of the setting facilitation apparatus 1400 according to the present embodiment registers a keyword K and a voiceprint of the user 1005 at a time when the user 1005 has read the keyword K while associating the keyword K and the voiceprint with each other. As a result, a control command controllable only by the user 1005 whose voiceprint has been registered can be set.

(2-4) Modification (2-4-1)

Figure 16:
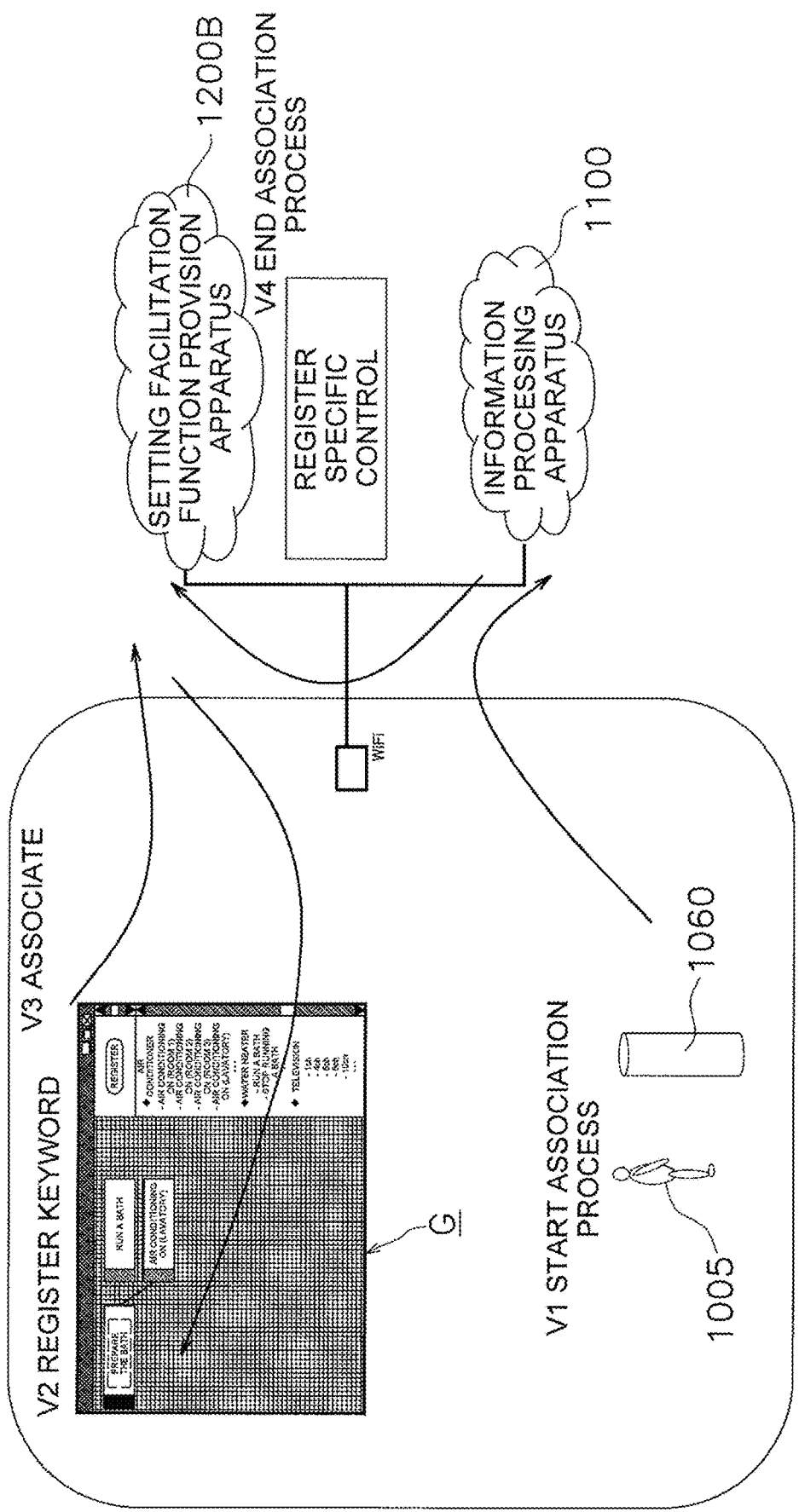
FIG. 16 is a schematic diagram illustrating a modification of the setting facilitation apparatus according to the embodiment.

Although the setting facilitation apparatus 1400 functions as the "keyword input reception section 1410", the "control command selection section 1420", and the "specific control registration section 1430" in the above description, the server 1100 may provide these functions as necessary, instead. That is, the setting facilitation apparatus 1400 may be a so-called thin client, whose concept is illustrated in FIG. 16. In this case, each time the setting facilitation apparatus 1400 has performed a process for registering a certain keyword and a certain type of control as "specific control" while associating the certain keyword and the certain type of control with each other, the setting facilitation apparatus 1400 accesses a server of a setting facilitation function provision apparatus 1200B through a network NW and uses the functions of a "keyword input reception section", a "control command selection section", and a "specific control registration section" provided by the setting facilitation function provision apparatus 1200B. The setting facilitation function provision apparatus 1200B may be achieved by the same apparatus as the server 1100, or may be achieved by a combination of the two apparatuses.

This configuration enables the user 5 to start an association process using the sound input apparatus 1060 (microphone) or the like (V1) and register a keyword on the edit screen G (V2). If the user 1005 makes settings of association on the edit screen G of the setting facilitation apparatus 1400 (V3), the settings are registered and the process ends (V4).

(2-4-2)

The server 1100 according to the present embodiment can register a type of control to be performed on a certain control device 1010 or 1020 at a certain time as "schedule information". In this case, when the certain time has come, the type of control corresponding to the schedule information is performed on the control device 1010 or 1020. When the certain time has come, for example, a sound is output on the basis of the schedule information, and the sound is input to the sound input apparatus 1060. Alternatively, text information or the like corresponding to the sound input is input to the sound input apparatus 1060 instead of the sound input, and the control device 1010 or 1020 is controlled.

<Additional Remarks>

The present invention is not limited to the above embodiments. In practice, the present invention can be implemented while modifying the components without deviating from the scope thereof. In addition, the present invention can produce various inventions by appropriately combining together a plurality of components disclosed in the above embodiments. For example, some of the components may be removed from all of the components described in the embodiments. Furthermore, the components may be combined with different embodiments as necessary.

[Second Configuration]
(1) Overall Configuration

FIG. 17 illustrates a device control system according to an embodiment. The device control system according to the present embodiment is configured as an environment control system 2090. The environment control system 2090 includes a router 2061, a reference environment control device 2062, a sound input/output apparatus 2063, and a reference environment sensor 2069 provided in a building 2060 and a server 2040. The reference environment control device 2062, the sound input/output apparatus 2063, the reference environment sensor 2069, and the server 2040 are connected to one another by a network 2050.

(1-1) Reference Environment Control Device 2062

The reference environment control device 2062 changes human sensory stimuli through an environment. The reference environment control device 2062 may include, for example, an air conditioner, a fan, a humidifier, a power window, a lighting device, a curtain device, an electric aroma diffuser, or the like. The reference environment control device 2062 illustrated in FIG. 17 is configured as an air conditioner. The reference environment control device 2062 is provided in a reference space RS.

The reference environment control device 2062 is connected to the network 2050 through the router 2061 including a switching hub. A link between the router 2061 and the reference environment control device 2062 may be achieved through wired communication or wireless communication.

(1-2) Sound Input/Output Apparatus 63

As with the reference environment control device 2062, the sound input/output apparatus 2063 is provided in the reference space RS. The sound input/output apparatus 2063 is connected to the network 2050 through the router 2061. A sound input unit 2064 and a sound output unit 2065 are provided for the sound input/output apparatus 2063. A link between the router 2061 and the sound input/output apparatus 2063 may be achieved through wired communication or wireless communication.

Alternatively, a wired remote control, an infrared remote control, a wireless remote control, or the like may be used in addition to the sound input/output apparatus 2063 as input means for the reference environment control device 2062.

(1-3) Reference Environment Sensor 2069

The reference environment sensor 2069 measures a physical quantity relating to an environment of the reference space RS. The physical quantity to be measured is, for example, temperature or humidity. The reference environment sensor 2069 is connected to the network 2050 through the router 2061. A link between the router 2061 and the reference environment sensor 2069 may be achieved by wired communication or wireless communication.

The reference environment sensor 2069 is not a mandatory component and need not necessarily be provided in the building 2060.

(1-4) Network 2050

The network 2050 is, for example, the Internet constructed using a PSTN (public switched telephone network) or the like.

(1-5) Server 2040

The server 2040 is provided in a place distant from the building 2060 and connected to the network 2050. The server 2040 controls the reference environment control device 2062 in response to a sound uttered by a user of the reference environment control device 2062. The server 2040 may be achieved by a single computer or a plurality of computers 2040a and 2040b having different functions. For example, one computer 2040a may analyze sounds and extract instructions, and another computer 2040b may control the reference environment control device 2062 and detect abnormalities. In this case, the plurality of computers 2040a and 2040b may be provided at distant places and owned or managed by different companies.

(2) Detailed Configuration

FIG. 18 is a block diagram illustrating the configuration of the environment control system 2090.

(2-1) Reference Environment Control Device 2062

The reference environment control device 2062 configured as an air conditioner includes an input/output interface section 2621, a processor 2622, and a refrigerant circuit 2623. The input/output interface section 2621 is connected to the network 2050 through the router 2061 and exchanges information with other devices. The refrigerant circuit 2623 includes a sensor and an actuator and conditions air in a room. The processor 2622 controls an actuator of the reference environment control device 2062, reads outputs of the sensor, and exchanges information with the input/output interface section 2621.

FIG. 19 is a detailed block diagram illustrating the reference environment control device 2062. The reference environment control device 2062 includes an outdoor unit 2070 and an indoor unit 2080. The input/output interface section 2621 is mounted on the indoor unit 2080. The processor 2622 includes an outdoor unit control section 2079 mounted on the outdoor unit 2070 and an indoor unit control section 2089 mounted on the indoor unit 2080. The refrigerant circuit 2623 includes a compressor 2071, a four-way switching valve 2072, an outdoor heat exchanger 2073, an outdoor expansion valve 2075, a gas shutoff valve 2077, and a liquid shutoff valve 2078 mounted on the outdoor unit 2070 and an indoor heat exchanger 2081 mounted on the indoor unit 2080. The outdoor unit control section 2079 controls the compressor 2071, the four-way switching valve 2072, a fan 2074, and the outdoor expansion valve 2075 and reads detection values of various sensors, which are not illustrated, mounted on the outdoor unit 2070. The indoor unit control section 2089 controls a fan 2082 and reads detection values of various sensors mounted on the indoor unit 2080, such as a room temperature sensor 2083 that detects temperature inside a room.

(2-2) Sound Input/Output Apparatus 2063

Returning to FIG. 18, the sound input/output apparatus 2063 includes an input/output interface unit 2631, a sound input unit 2064, and a sound output unit 2065. The input/output interface section 2621 is connected to the network 2050 through the router 2061 and exchanges information with other devices.

The sound input unit 2064 includes a microphone 2641, an amplifier 2642, and an AD converter 2643. The microphone 2641 obtains an analog sound signal. The amplifier 2642 amplifies the obtained analog sound signal. The AD converter 2643 performs AD conversion on the amplified analog sound signal and transmits resultant sound data SD to the input/output interface unit 2631.

The sound output unit 2065 includes a DA converter 2653, an amplifier 2652, and a speaker 2651. The DA converter 2653 performs DA conversion on output data OD received from the input/output interface unit 2631 and a resultant analog output signal to the amplifier 2652. The amplifier 2652 amplifies the analog output signal. The speaker 2651 outputs a sound according to the amplified analog output signal.

(2-3) Reference Environment Sensor 2069

Although not illustrated in FIG. 18 in detail, the reference environment sensor 2069 performs AD conversion on a measured physical quantity relating to an environment and transmits the physical quantity to the router 2061 as digital data.

(2-4) Server 2040

The server 2040 includes computers 2040a and 2040b. The server 2040 may include any number of computers. Here, only the configuration of the computer 2040a will be described. The computer 2040a includes an input/output interface unit 2041, a processor 2042, and a memory 2043. The input/output interface unit 2041 is connected to the network 2050. The processor 2042 performs various processes. The various processes include transmission and reception of information through the input/output interface unit 2041 and various calculation operations. The memory 2043 stores information through a writing operation performed by the processor 2042 or the like.

(3) Functional Blocks

FIG. 20 is a block diagram illustrating functions of the environment control system 2090. The environment control system 2090 includes not only the sound input unit 2064, the sound output unit 2065, and the like but also a plurality of functional blocks, namely a text conversion unit 2011, a sound recognition dictionary 2012, an interpretation unit 2013, a control unit 2014, a device information obtaining unit 2016, a storage unit 2017, a calculation unit 2018, and an authentication unit 2019.

The functional blocks 2011 to 2019 may be stored in the memories 2043 of the computers 2040a and 2040b of the server 2040 and configured as software to be executed by the processor 2042, such as programs. Alternatively, the functional blocks 2011 to 2019 may be configured as hardware such as integrated circuits and hard drives. Physical positions at which the functional blocks 2011 to 2019 are mounted may be inside the computers 2040a and 2040b, the sound input/output apparatus 2063, the reference environment control device 2062, or another place.

(4) Basic Operation (4-1) Sound Operation

The reference space RS is, for example, the user's house. The user achieves a desired environment through the sound input unit 2064 of the sound input/output apparatus 2063. For example, the user speaks an instruction such as "Decrease temperature", "Increase wind", or "Decrease humidity" to the sound input unit 2064.

A sound uttered by the user is converted by the AD converter 2643 illustrated in FIG. 18 into sound data SD of a digital signal. The sound data SD is transmitted to the server 2040, for example, through the network 2050. The text conversion unit 2011 illustrated in FIG. 20 converts the sound data SD into text while referring to the sound recognition dictionary 2012. The interpretation unit 2013 interprets the text and extracts an instruction CM intended by the user. That is, the text conversion unit 2011 and the interpretation unit 2013 function as an instruction extraction unit that extracts an instruction from a sound.

The control unit 2014 transmits output data OD to the sound output unit 2065 and causes the speaker 2651 to output an audio message such as "Temperature will decrease a little". The control unit 2014 transmits a control signal to the reference environment control device 2062 configured as an air conditioner to cause the reference environment control device 2062 to decrease a current control parameter, that is, a value of set temperature, by a certain value.

A reference environment control device 2062 other than an air conditioner can be controlled similarly. When a reference environment control device 2062 configured as a lighting device corresponding to the environment control system 2090 is provided in the reference space RS, for example, the control unit 2014 increases the illuminance of the lighting device if the user says, "Brighter", to the sound input unit 2064.

(4-2) User Authentication

The environment control system 2090 has a function of authenticating a user so that only authorized users can control the reference environment control device 2062. Various methods may be used to authenticate a user.

For example, the authentication unit 2019 may receive sound data SD generated from a sound for instructing the reference environment control device 2062 to operate and authenticate a user through a voiceprint analysis in order for the control unit 2014 to execute only instructions from specific users.

Alternatively, after the environment control system 2090 is instructed to operate the reference environment control device 2062, the control unit 2014 may cause the sound output unit 2065 to output a message for asking a user to read out a password. If the interpretation unit 2013 detects that a correct password has been read out, the control unit 2014 can achieve a type of control on the reference environment control device 2062 desired by the user.

(5) Operation for Reproducing Environment (5-1) Conservation of Environment in Reference Space When a user who lives in the reference space RS feels comfortable in his/her home environment, the user can save a state of the environment to the environment control system 2090. First, the user says, "Save the current indoor environment as a favorite", to the sound input unit 2064.

In response to the user's instruction, the device information obtaining unit 2016 obtains device information and control parameters of the reference environment control device 2062. The control parameters include ones that are universally understood, such as "set temperature 26° C.", and ones defined by each model, such as "mild wind mode". Furthermore, the device information obtaining unit 2016 obtains a detection value of the reference environment sensor 2069.

Next, the calculation unit 18 calculates the state of the environment from the obtained control parameters. FIG. 21 illustrates an example of the state of the environment. Items of the state of the environment are basically represented by universal physical units. The calculation unit 2018 converts the control parameters unique to a model into quantities represented in the physical units while referring to the device information.

The state of the environment is saved to the storage unit 2017 while being associated with the authenticated user.

(5-2) Reproduction of Environment in Target Space TS

FIG. 22 illustrates a target space TS. The target space TS is a place other than the reference space RS and is the place where a plurality of target environment control devices 2091 to 2097 are provided, such as a hotel room. The target environment control devices 2091 to 2097 are connected to the server 2040 through the network 2050 as with the reference environment control device 2062 provided in the reference space RS. An authenticated user can give instructions relating to the operation of the target environment control devices 2091 to 2097 through the sound input/output apparatus 2063. The target environment control devices 2091 to 2097 are, for example, an air conditioner 2091, a fan 2092, a humidifier 2093, a power window 2094, a lighting device 2095, a curtain device 2096, and an electric aroma diffuser 2097. Another type of fragrance generation device may be used instead of the electric aroma diffuser 2097. As input means for the plurality of target environment control devices 2091 to 2097, wired remote controls, infrared remote controls, wireless remote controls, and the like may be used in addition to the sound input/output apparatus 2063.

Furthermore, a target environment sensor 2099 may be provided in the target space TS. The target environment sensor 2099 measures a physical quantity relating to an environment of the target space TS. The physical quantity to be measured is, for example, temperature or humidity. The target environment sensor 2099, too, is connected to the server 2040 through the network 2050.

The user can instruct the environment control system 2090 to reproduce, in the target space TS, an environment close to the environment of the reference space RS. First, the user says, "Reproduce my favorite environment", to a sound input unit. In response to the user's instruction, the device information obtaining unit 2016 obtains device information regarding the target environment control devices 2091 to 2097 provided in the target space TS. Next, the control unit 2014 retrieves a saved state of an environment. Next, the control unit 2014 requests the calculation unit 2018 to calculate control parameters for achieving the retrieved state of the environment as perfectly as possible using the target environment control devices 2091 to 2097 in the target space TS.

The air conditioner 2091 and the fan 2092, for example, can be used to achieve a wind volume included in the state of the environment. The calculation unit 2018 therefore calculates an appropriate balance of wind using the air conditioner 2091 and the fan 2092 and opening or closing of the power window 2094. If the air conditioner 2091 provided in the target space TS does not have a function of controlling humidity even through the state of the environment includes an item of humidity, the calculation unit 2018 attempts to achieve the item of humidity included in the state of the environment by appropriately determining a control parameter of the humidifier 2093. The calculation unit 2018 attempts to achieve an item of illuminance through control parameters of the lighting device 2095 and the curtain device 2096. As for in item of fragrance, the calculation unit 2018 checks whether the electric aroma diffuser 2097 is available.

Lastly, the control unit 2014 controls the target environment control devices 2091 to 2097 on the basis of the control parameters calculated by the calculation unit 2018. During this process, the control unit 2014 may perform feedback control using a detection value of the target environment sensor 2099. As a result, an environment close to the environment of the reference space RS is reproduced in the target space TS.

(5-3) Conservation of Environment in Target Space TS

If the user feels comfortable in an environment of the target space TS, the user can save a state of the environment to the storage unit 2017 of the environment control system 2090. A method used is the same as when the environment of the reference space RS is saved.

(6) Characteristics (6-1)

A state of an environment stored in the storage unit 2017 is reproduced as an environment of the target space TS through control based on control parameters. An environment that suits a user's taste can therefore be reproduced.

(6-2)

A state of an environment is created on the basis of the environment of the reference space RS and reproduced in the target space TS. The environment of the reference space RS can therefore be reproduced in the target space TS.

(6-3)

If an instruction to reproduce a state of an environment is received, the control unit 2014 controls the target environment control devices 2091 to 2097 in accordance with the state of the environment. An environment that suits the user's taste is therefore reproduced as a result of the instruction given by the user.

(6-4)

If the user is authenticated as an authorized person, the user can control the target environment control devices. Since unauthorized users cannot control the target environment control devices security can be easily secured.

(6-5)

The target environment control devices in the reference space RS and the target space TS both include an air conditioner. Air conditioning, which affects the user's comfort, can therefore be reproduced in the target space TS.

(6-6)

A state of an environment stored in the storage unit 17 can be updated using the environment of the target space TS. Therefore, if the user likes the environment of the target space TS the user can save settings relating to the environment.

(6-7)

With this configuration, a state of an environment can include temperature, wind volume, humidity, illuminance, and fragrance. These environments that suit the user's taste can therefore be reproduced in the target space TS.

(7) Modifications (7-1) First Modification

FIG. 23 illustrates an environment control system 2090A according to a first modification of the embodiment. The first modification is different from the embodiment in that the environment control system 2090A does not include the sound input/output apparatus 2063 and the sound input unit 2064 and the sound output unit 2065 are mounted on the reference environment control device 2062.

Since the sound input/output apparatus 2063 does not exist in this configuration, installation space required by the environment control system 2090 is smaller.

(7-2) Second Modification

FIG. 24 illustrates an environment control system 2090B according to a second modification of the embodiment. In the environment control system 2090B, a mobile terminal 2067 is used to receive instructions from the user and output messages to the user instead of the sound input/output apparatus 2063. The mobile terminal 2067 is, for example, a smartphone on which a dedicated application is installed. The reference environment control device 2062 is provided with an antenna 2066 for communicating with the mobile terminal 2067. The antenna 2066 may be incorporated into the reference environment control device 2062. Alternatively, the antenna 2066 may be configured as an external adapter and connected to the reference environment control device 2062 by wire.

Since a user interface terminal such as the sound input/output apparatus 2063 need not be provided for each place such as the reference space RS or the target space TS in this configuration, a cost of the environment control system 2090B can be reduced.

(7-3) Third Modification

Input means for the reference environment control device 62 and the target environment control devices 2091 to 2097 is not limited to the sound input/output apparatus 2063 or the mobile terminal 2067, and any mode may be employed. For example, a wired remote control, an infrared remote control, a wireless remote control, a camera capable of performing image recognition, a portable BLE beacon tag, a portable RFID tag, and various sensors such as a capacitive sensor may be used.

[Third Configuration]

(1) Configuration of Air Conditioning System 3001

FIG. 25 is a schematic diagram illustrating a concept of a device control system according to an embodiment. The device control system according to the present embodiment is configured as an air conditioning system 3001.

The air conditioning system 3001 includes an air conditioner 3020 (air conditioning apparatus) and a server 3100 communicable with the air conditioner 3020 through a network NW. Although one air conditioner 3020 is connected to the server 3100 in FIG. 25 for the sake of convenience of description, the server 3100 may be connected to any number of air conditioners 3020. In the following description, a numeral 3005 is used to refer to an arbitrary user, and an English lowercase letter is added when a specific user is referred to.

(1-1) Air Conditioner 3020

The air conditioner 3020 generates conditioned air in a certain state and blows the air into a target space using an internal mechanism including a compressor, a heat exchanger, an expansion valve, a fan, a louver, and the like. The internal mechanism of the air conditioner 3020 is controlled by a built-in information processing unit 3020P.

A "state of conditioned air" refers to the temperature, wind volume, or wind direction of conditioned air or any combination of these. It is assumed that the air conditioner 3020 is provided in a room R.

As illustrated in FIG. 26, the information processing unit 3020P includes an input unit 3021, an output unit 3022, a communication unit 3023, a storage unit 3024, and a processing unit 3025 and is connected to an external server 3100 through the network NW such as the Internet.

The input unit 3021 inputs various pieces of information to the information processing unit 3020P. For example, the input unit 3021 may be achieved by a general remote control, and a user 3005 can input various commands to the air conditioner 3020 through the remote control. The input unit 3021 may include various sensors, and detection values of the various sensors are transmitted to the processing unit 3025 as input information. Here, the input unit 3021 includes a microphone, and a sound uttered by the user 3005 is input to the air conditioner 3020 through the microphone. The input sound is analyzed by the processing unit 3025, which will be described later, and sound information including the frequency and volume of the sound is obtained.

The output unit 3022 is achieved by a speaker or the like and outputs various pieces of information from the information processing unit 3020P. The communication unit 3023 is connected to the external network NW and achieves information communication. The storage unit 3024 is achieved by a ROM, a RAM, and the like and stores information input to the information processing unit 3020P, information calculated by the information processing unit 3020P, and the like.

The processing unit 3025 is achieved by a CPU or the like and processes information in the information processing unit 3020P. Here, the processing unit 3025 executes a program stored in the storage unit 3024 to function as a "conditioned-air blowout section 3025A", a "sound detection section 3025B", and a "specific control section 3025C".

The conditioned-air blowout section 3025A controls the internal mechanism of the air conditioner 3020 in order to generate conditioned air in a certain state and blow the conditioned air in a certain direction. More specifically, the conditioned-air blowout section 3025A controls the internal mechanism of the air conditioner 3010 in accordance with a command from the user 3005 input through the input unit 3021 (a remote control or the like).

The sound detection section 3025B detects, through the input unit 3021 (microphone), a sound uttered by the user 3005 in a space (room R) in which the air conditioner 3020 is provided. The sound detection section 3025B obtains sound information including the frequency and volume of the sound uttered by the user 3005. Upon obtaining the sound information, the sound detection section 3025B transmits the sound information to the server 3100 through the communication unit 3023.

When the air conditioner 3020 has entered a specific state, the specific control section 3025C controls the internal mechanism of the air conditioner 20 under control conditions corresponding to the specific state. As a result, the state of conditioned air is changed or maintained. Here, control conditions in an "anger mode" are preset for a specific state where "there is an angry person" in a surrounding environment of the air conditioner 3020. If the specific control section 3025C receives a control command corresponding to the "anger mode" from a server 100, which will be described later, the specific control section 3025C controls the internal mechanism of the air conditioner 3020 under the control conditions in the "anger mode".

(1-2) Server 3100

As illustrated in FIG. 26, the server 3100 includes an input unit 3101, an output unit 3102, a communication unit 3103, a storage unit 3104, and a processing unit 3105 and is connected to the information processing unit 3020P incorporated into the air conditioner 3020 through the network NW such as the Internet.

Here, the input unit 3101 inputs various pieces of information to the server 3100. The output unit 3102 outputs various pieces of information from the server 3100. The communication unit 3103 is connected to the external network NW and achieves information communication.

The storage unit 3104 is achieved by a ROM, a RAM, and the like and stores information input to the server 3100, information calculated by the server 3100, and the like. Here, the storage unit 3104 stores an "anger category DB 104D".

As illustrated in FIG. 27, the anger category DB 3104D associates anger terms W and sound volumes with anger categories, and stores them. For example, the anger category DB 3104D associates an anger term W "don't be silly" with an anger category "intense quarrel" (anger category 1) if the sound volume is "large" and stores them. The anger category DB 3104D also stores a control command regarding certain control content corresponding to the anger category "intense quarrel" (anger category 1). More specifically, the anger category DB 3104D stores control commands to perform a control operation a, which is "decrease temperature", a control operation b, "decrease humidity", and a control operation c, "increase wind volume", for the anger category "intense quarrel". In addition, the anger category DB 3104D associates an anger term W "stupid" for example, with an anger category "minor quarrel" (anger category 3) if the sound volume is "small" and stores them. The anger category DB 3104D also stores a control command to perform the control operation c, which is "increase wind volume", for the anger category "minor quarrel" (anger category 3).

The processing unit 3105 is achieved by a CPU or the like and processes information in the server 3100. Here, the processing unit 3105 executes a program stored in the storage unit 3104 to function as a "sound input analysis section 3110" and a "state determination section (determination section) 3125".

The sound input analysis section 3110 analyzes a sound input and converts the sound input into text information (verbal information). Here, if the sound input analysis section 3110 receives sound information corresponding to a sound input from the air conditioner 3030, the sound input analysis section 3110 analyzes the sound information to obtain a meaning of a sound and converts the sound information into text information. The obtained text information is transmitted to the state determination section 3125. The sound input analysis section 3110 is achieved by a neural network or the like.

The state determination section 3125 determines whether the air conditioner 3020 is in a specific state. Here, the state determination section 3125 determines whether there is an "angry person" in a surrounding environment of the air conditioner 3020 as a specific state. More specifically, the state determination section 3125 compares the information stored in the anger category DB 3104D with text information analyzed by the sound input analysis section 3110 and determines whether the text information includes a certain "anger term W". If determining that an anger term W is included, the state determination section 3125 determines that there is an "angry person" in the surrounding environment of the air conditioner 3020, and sets the air conditioner 3020 to the "anger mode". The state determination section 3125 then extracts a control command corresponding to the anger mode from the anger category DB 3104D and transmits the extracted control command to the information processing unit 3020P of the air conditioner 3020.

(2) Operation of Air Conditioning System 3001

FIGS. 28A and 4B are sequence diagrams illustrating the operation of the air conditioning system 3001 according to the present embodiment.

If a plurality of users 3005a and 3005b begin a conversation in the room R in which the air conditioner 3020 is provided, the air conditioner 3020 detects sound of the conversation between the users 3005a and 3005b through a microphone or the like (S1). The air conditioner 3020 transmits sound information regarding the conversation between the users 3005a and 3005b to the server 3100 at appropriate timings (S2).

When the server 3100 receives the sound information from the air conditioner 3020, the server 3100 converts the sound information into text information (S3, S4). If the users 3005a and 3005b have a quarrel, the conversation might include an anger term W. The server 3100 compares the analyzed text information with the information stored in the anger category DB 3104D and determines whether the text information includes an anger term W as necessary (S5).

If determining that the conversation between the users 3005a and 3005b includes an anger term W, the server 3100 sets the air conditioner 3020 to the "anger mode". More specifically, the server 3100 determines an anger category on the basis of the anger term W included in the conversation and a sound volume of the conversation at a time when the conversation was performed (S5—Yes, S6). The server 3100 then transmits a control command based on the determined anger category to the air conditioner 3020 (S7).

Next, the air conditioner 3020 receives the control command from the server 3100 and changes a control state of conditioned air to the anger mode (S8, S9). The air conditioner 3020 then controls conditioned air in the anger mode until a certain period of time elapses (S10).

The processing in steps S2 to S10 continues until the sound of the conversation between the users 3005a and 3005b is no longer detected (S11—Yes, S2). If the sound of the conversation between the users 3005a and 3005b is no longer detected, on the other hand, the server 3100 cancels the control operation based on the anger mode and resets the control state of conditioned air to a state before the sound was detected (S11-No, S12).

(3) Characteristics (3-1)

As described above, the air conditioning system 3001 according to the present embodiment includes the conditioned-air blowout section 3025A, the sound detection section 3025B, the sound input analysis section 3110, the state determination section (determination section) 3125, and the specific control section (control section) 3025C. The conditioned-air blowout section 3025A blows out conditioned air into a target space (room R). The sound detection section 3025B obtains sound information corresponding to sounds uttered by the users (speakers) 3005a and 3005b in the target space (room R). The sound input analysis section 3110 analyzes a sound input and converts the sound information into verbal information. The state determination section 3125 determines whether the verbal information analyzed by the sound input analysis section 3110 includes a certain anger term W. If the state determination section 3125 determines that a certain anger term W is included, the specific control section 3025C controls a state of conditioned air.

Since the state of conditioned air is controlled in the air conditioning system 3001 according to the present embodiment if the verbal information analyzed by the sound input analysis section 3110 includes a certain anger term W, the users 3005a and 3005b can be calmed down.

In addition, since anger is determined after the verbal information is analyzed on the basis of sounds, anger of the users 3005a and 3005b can be accurately determined. The state of conditioned air is then changed, and the users (e.g., a husband and a wife having a quarrel) who have used harsh language can be distracted. Consequently, an air conditioning system capable of calming speakers down can be provided.

(3-2)

In addition, the air conditioning system 3001 according to the present embodiment includes the air conditioner 3020 and the server 3100 communicable with the air conditioner 3020 through the network NW. The air conditioner 3020 includes the conditioned-air output section 3025A, the sound detection section 3025B, and the specific control section 3025C. The server 3100 includes the sound input analysis section 3110 and the state determination section 3125.

In short, the air conditioning system 3001 according to the present embodiment is constructed using the server 3100 in the network NW. The air conditioning system 3001 is constructed such that information can be processed in the network NW as in this case, and a neural network or the like thereby can be easily constructed. Consequently, the accuracy of analyzing sound inputs improves, and the reliability of the system improves.

(3-3)

In addition, in the air conditioning system 3001 according to the present embodiment, if the state determination section 3125 determines that an anger term W is included, the specific control section 3025C controls the state of conditioned air on the basis of the anger term W and a volume of a sound uttered by the user 3005a or 3005b (speaker). In addition, in the air conditioning system 3001 according to the present embodiment, if determining that sound information includes an anger term W, the determination section 3125 sets the air conditioner 3020 to the anger mode. The state determination section then extracts a control command corresponding to an anger category from the anger category DB 3104D on the basis of the anger term W and the volume of the sound uttered by the user 3005a or 3005b and transmits the control command to the air conditioner 3020. The specific control section 3025C of the air conditioner 3020 then receives the control command and controls the state of conditioned air on the basis of the control command.

Since the state of conditioned air is controlled in consideration of not only an anger term W but also the volume of a sound uttered by the user 3005a, 3005b in the air conditioning system 3001 according to the present embodiment, therefore, the air conditioning system 3001 capable of performing control that is more appropriate for anger of a speaker can be provided.

(3-4)

In addition, the air conditioning system 3001 according to the present embodiment further includes the anger category DB (anger category storage section) 3104D that stores anger terms W, sound volumes, and anger categories while associating the anger terms and the sound volume with the anger categories. This configuration achieves an air conditioning system 3001 capable of performing control according to the anger categories.

In addition, depending on the anger category, a slight stimulus might fuel anger of the user 3005. In this case, it is desired not to give unnecessary stimuli. Depending on the anger category, on the other hand, it might be desirable to give stimuli actively in order to reduce anger. The air conditioning system 3001 according to the present embodiment can optimize settings of the anger categories as necessary in accordance with a situation.

(4) Modifications (4-1) Modification A

In the air conditioning system 3001 according to the present embodiment, the processing unit 3025 of the air conditioner 3020 may function as a "position identification section 3025D" that identifies a position of the user 3005 (speaker) as illustrated in FIG. 29. More specifically, the air conditioner 20 includes various sensors as input units 3021, and the position identification section 3025D calculates positional information indicating a position of the user 3005 on the basis of detection values of the sensors.

When the position of the user 3005 is identified, the specific control section 3025C may control the state of conditioned air in accordance with the position of the user 3005. As a result, conditioned air can be precisely controlled in accordance with the position of the user.

Furthermore, the air conditioner 3020 may transmit positional information indicating the position of the user 3005 to the server 3100. Here, the server 3100 also stores control content that reflects positional information regarding the user as the anger category DB 3104D while associating the control content with an anger category. In the case of this configuration, therefore, the control content that reflects the positional information regarding the user is extracted from the anger category DB 3104D. The specific control section 3025C of the air conditioner 3020 can therefore control the state of conditioned air in the anger mode that takes into consideration the positions of the users 3005a and 3005b. As a result, for example, strong wind can be blown onto faces of the users 3005a and 3005b to distract the users 3005a and 3005b. In addition, for example, depending on the anger category, it might be more effective to blow light wind onto the feet of an angry person than to blow wind onto the face in order to reduce anger. In this case, too, control of conditioned air in the anger mode can be finely set by updating the information stored in the anger category DB 3104D in an air conditioning system 3001 according to a present modification A.

(4-2) Modification B

In addition, in the air conditioning system 3001 according to the present embodiment, the processing unit 3025 of the air conditioner 3020 may function as a "sentence output instruction section 3025E" as illustrated in FIG. 30. More specifically, if the air conditioner 3020 is controlled in the anger mode, the sentence output instruction section 3025E outputs a sound of a certain sentence for reducing anger through the speaker of the output unit 3022. The certain sentence for reducing anger may be stored in the storage unit 3024 of the air conditioner 3020 or the storage unit 3104 of the server 3100.

Alternatively, the certain sentence for reducing anger may be stored in the anger category DB 3104D while being associated with an anger category. If the air conditioner 3020 receives a control command in the anger mode, the sentence may be output as a sound. In the case of this configuration, the sentence output instruction section 3025E outputs a sound corresponding to text information such as "It feels slightly hot. Temperature will decrease temporarily" through the speaker of the output unit 3022. Depending on a degree of anger, a harmless and inoffensive word might be desirable.

Since a sentence for reducing anger is output as a sound in addition to control of conditioned air in an air conditioning system 3001 according to a present modification B, an effect of calming down the user 3005 can be improved.

(4-3) Modification C

In addition, the air conditioning system 3001 according to the present embodiment can set whether to announce a start and/or an end of the anger mode while associating the setting with an anger category. Depending on the degree of anger, it might be desirable not to announce a start and/or an end of the anger mode, because the user 3005 might be agitated.

In addition, a manager of the server 3100 can be notified of a start of the anger mode. As a result, the manager of the server 3100 can identify an air conditioner to which the anger mode is set among a plurality of air conditioners connected to the server 100. In other words, since a location of the air conditioner in the anger mode can be identified, a location where there is an "angry person" can be identified. Consequently, a location where a quarrel will occur can be predicted.

(4-4) Modification D

The above-described functions of the server 3100 may be distributed among a plurality of servers and performed. As illustrated in FIG. 31, for example, the air conditioning system 3001 may include a first server 3100A and a second server 3200A instead of the server 3100. Here, the first server 3100A has the above-described function of the sound input analysis section, and the second server 3200A has the other functions. In addition, when the air conditioner 3020 is controlled through sound inputs, a large amount of processing might be necessary to analyze the sound inputs. In this case, too, a sound analysis can be accurately conducted using the first server 3100A, which achieves a neural network constructed in the network NW, in the air conditioning system 3001. By causing the second server 3200A to perform low-load processes other than the analysis of sound inputs, on the other hand, usability of the system and the like can be improved.

(4-5) Modification E

Although the air conditioner 3020 includes a microphone as the input unit 3021 and the processing unit 3025 functions as the sound detection section 3025B in the above description, the air conditioning system 3001 according to the present embodiment is not limited to this configuration.

For example, the air conditioner 3020 need not have the above configuration, and the air conditioning system 3001 may separately include a sound input apparatus 3060 as illustrated in FIG. 32. Here, the sound input apparatus 3060 detects, through a microphone, a sound uttered by the user 3005 in the space (room R) where the air conditioner 3020 is provided. If the sound input apparatus 3060 detects a sound, the sound input apparatus 3060 transmits sound information to the server 3100.

(4-6) Modification F

The air conditioning system 3001 according to the present embodiment can control the state of conditioned air on the basis of the amount of change such as a change in the number of anger terms or a change in the volume of sound. For example, the air conditioning system 3001 may identify a situation in which the number of angry words has decreased or the volume of voice has decreased, for example, and reset the control of conditioned air to an original state.

(4-7) Modification G

The air conditioning system 3001 according to the present embodiment can not only perform the above-described control but also perform various types of control of conditioned air in accordance with settings of the anger categories.

When the users 3005a and 3005b are a husband and a wife and quarrel with each other, for example, the air conditioning system 3001 may identify one who is leading the conversation (who is heated up) on the basis of sound information and direct wind to that person.

For example, when the air conditioning system 3001 has recognized a quarrel (heating up situation), the air conditioner 3020 can blow an ion or the like. Depending on a type of ion or the like, an effect of distracting the user 3005 can be produced.

If the air conditioning system 3001 detects a heated exchange (large sound volume), for example, the air conditioning system 3001 decreases the temperature of conditioned air. As a result, an effect of calming down the user 3005 can be produced.

For example, the air conditioning system 3001 cooperates with a home network and, if the air conditioning system 3001 detects the users 3005a and 3005b having a quarrel, temporarily stops all or some of electrical devices inside a house. Thereafter, the air conditioning system 3001 blows hot air from the air conditioner 3020. As a result, an effect of giving a sense of crisis can be produced. Consequently, an effect of making peace between the users 3005a and 3005b having a quarrel can be produced.

In short, the air conditioning system 3001 can determine a feeling of the user 3005 from sound information in accordance with an anger category. In other words, a feeling of a person can be read from voice. The air conditioning system 3001 can then distract the user 3005 by, for example, blowing cold air onto the excited user 3005. Depending on the anger category, however, a control operation other than blowing of cold air might be performed.

<Additional Remarks>

The present invention is not limited to the above embodiments. In practice, the present invention can be implemented while modifying the components without deviating from the scope thereof. In addition, the present invention can produce various inventions by appropriately combining together a plurality of components disclosed in the above embodiments. For example, some of the components described in the embodiments may be removed. Furthermore, the components in different embodiments may be combined with each other as necessary.

[Fourth Configuration]

(1) Overall Configuration

FIG. 33 illustrates a device control system according to an embodiment. The device control system according to the present embodiment is configured as an indoor environment control system 4090. The indoor environment control system 4090 includes a router 4061, an air conditioner 4062, and a sound input/output apparatus 4063 provided for a building 4060 and a server 4040. The air conditioner 4062, the sound input/output apparatus 4063, and the server 4040 are connected to one another by a network 4050.

The router 4061 includes a switching hub and is connected to the network 4050. The air conditioner 4062 is connected to the router 4061. A link between the router 4061 and the air conditioner 4062 may be achieved by wired communication or wireless communication.

As with the air conditioner 4062, the sound input/output apparatus 4063 is connected to the network 4050 through the router 4061. A sound input unit 4064 and a sound output unit 4065 are provided for the sound input/output apparatus 4063. A link between the router 4061 and the sound input/output apparatus 4063 may be achieved by wired communication or wireless communication.

The network 4050 is, for example, the Internet constructed using the PSTN (public switched telephone network) or the like.

The server 4040 is provided in a place distant from the building 4060 and connected to the network 4050. The server 4040 controls the air conditioner 4062 in response to a sound uttered by a user of the air conditioner 4062. The server 4040 may be achieved by a single computer or a plurality of computers 4040a and 4040b having different functions. For example, one computer 4040a may analyze sounds and execute instructions, and another computer 4040b may control the air conditioner 4062 and detect abnormalities. In this case, the plurality of computers 4040a and 4040b may be provided at distant places and owned or managed by different companies.

(2) Detailed Configuration

FIG. 34 is a block diagram illustrating the configuration of the indoor environment control system 4090.

(2-1) Air Conditioner 4062

The air conditioner 4062 includes an input/output interface section 4621, a processor 4622, and a refrigerant circuit 4623. The input/output interface section 4621 is connected to the network 4050 through the router 4061 and exchanges information with other devices. The refrigerant circuit 4623 includes a sensor and an actuator and conditions air in a room. The processor 4622 controls an actuator of the air conditioner 4062, reads outputs of the sensor, and exchanges information with the input/output interface section 4621.

FIG. 35 is a detailed block diagram illustrating the air conditioner 4062. The air conditioner 4062 includes an outdoor unit 4070 and an indoor unit 4080. The input/output interface section 4621 is mounted on the indoor unit 4080. The processor 4622 includes an outdoor unit control section 4079 mounted on the outdoor unit 4070 and an indoor unit control section 4089 mounted on the indoor unit 4080. The refrigerant circuit 4623 includes a compressor 4071, a four-way switching valve 4072, an outdoor heat exchanger 4073, an outdoor expansion valve 4075, a gas shutoff valve 4077, and a liquid shutoff valve 4078 mounted on the outdoor unit 4070 and an indoor heat exchanger 4081 mounted on the indoor unit 4080. The outdoor unit control section 4079 controls the compressor 4071, the four-way switching valve 4072, a fan 4074, and the outdoor expansion valve 4075 and reads detection values of various sensors, which are not illustrated, mounted on the outdoor unit 4070. The indoor unit control section 4089 controls a fan 4082 and reads detection values of various sensors mounted on the indoor unit 4080, including a room temperature sensor 4083 that detects temperature inside a room.

(2-2) Sound Input/Output Apparatus 4063

Returning to FIG. 34, the sound input/output apparatus 4063 includes an input/output interface unit 4631, a sound input unit 4064, and a sound output unit 4065. The input/output interface section 4621 is connected to the network 4050 through the router 4061 and exchanges information with other devices. The sound input unit 4064 includes a microphone 4641, an amplifier 4642, and an AD converter 4643. The microphone 4641 obtains an analog sound signal. The amplifier amplifies the obtained analog sound signal. The AD converter 4643 performs AD conversion on the amplified analog sound signal and transmits resultant sound data SD to the input/output interface unit 4631. The sound output unit 4065 includes a DA converter 4653, an amplifier 4652, and a speaker 4651. The DA converter 4653 performs DA conversion on output data OD received from the input/output interface unit 4631 and transmits resultant analog output signal to the amplifier 4652. The amplifier 4652 amplifies the analog output signal. The speaker 4651 outputs a sound according to the amplified analog output signal.

(2-3) Server 4040

The server 4040 includes computers 4040a and 4040b. The server 4040 may include any number of computers. Here, only the configuration of the computer 4040a will be described. The computer 4040a includes an input/output interface unit 4041, a processor 4042, and a memory 4043. The input/output interface unit 4041 is connected to the network 4050. The processor 4042 performs various processes. The various processes include transmission and reception of information through the input/output interface unit 4041 and various calculation operations. The memory 4043 stores information through a writing operation or the like performed by the processor 4042.

(3) Functional Blocks

FIG. 36 is a block diagram illustrating functions of the indoor environment control system 4090. The indoor environment control system 4090 includes not only the sound input unit 4064, the sound output unit 4065, and the like but also a plurality of functional blocks, namely a text conversion unit 4011, a sound recognition dictionary 4012, an interpretation unit 4013, a control unit 4014, a storage unit 4017, and a user identification unit 4019.

The functional blocks 4011 to 4019 may be stored in the memories 4043 of the computers 4040a and 4040b of the server 4040 and configured as software to be executed by the processor 4042, such as programs. Alternatively, the functional blocks 4011 to 4019 may be configured as hardware such as integrated circuits and hard drives. Physical positions at which the functional blocks 4011 to 4019 are mounted may be inside the computers 4040a and 4040b, the sound input/output apparatus 4063, the air conditioner 4062, or another place. For example, at least a part of the control unit 4014 is configured as the processor 4622 of the air conditioner 4062.

(4) Basic Operation (4-1) Sound Operation

The user instructs his/her air conditioner 4062 to perform a desired operation through the sound input unit 4064 of the sound input/output apparatus 4063 illustrated in FIG. 34. For example, the user speaks an instruction such as "Turn on the air conditioner" or "Decrease temperature a little" to the sound input unit 4064.

A sound uttered by the user is converted by the AD converter 4643 into sound data SD of a digital signal. The sound data SD is transmitted, for example, to the server 4040 through the network 4050. The text conversion unit 4011 illustrated in FIG. 36 converts the sound data SD into text while referring to the sound recognition dictionary 4012. The interpretation unit 4013 interprets the text and extracts an instruction CM intended by the user.

The control unit 4014 transmits output data OD to the sound output unit 4065 and causes the speaker 4651 illustrated in FIG. 34 to output an audio message such as "Temperature will decrease a little". The control unit 4014 transmits a control signal to the refrigerant circuit 4623 of the air conditioner 4062 to control the air conditioner 4062 to decrease a current control parameter, that is, a value of set temperature, by a certain value.

(4-2) User Identification

The indoor environment control system 4090 has a function of identifying a plurality of users. For example, the user identification unit 4019 receives sound data SD generated from a sound for instructing the air conditioner 4062 to perform an operation and identifies a user through a voiceprint analysis. The storage unit 4017 stores a record of favorite setting values relating to temperature and the like, which are different between users, while associating the record with each user. The record of favorite setting values stored in the storage unit 4017 is retrieved by the control unit 4014 as setting values in accordance with the user's instruction corresponding to the settings and used to control actual state values such as room temperature.

(5) Fine Control Routine for Pursuing Comfort

If a room temperature Tr, which is a state value detected by the room temperature sensor 4083, reaches a set temperature Ts, which is a setting value determined by the user, as a result of an air conditioning operation, the indoor environment control system 4090 starts a fine control routine. The fine control routine is executed in accordance with a flowchart of FIG. 37. In step S0, the fine control routine starts. In step S1, the process branches in accordance with whether the room temperature Tr has reached the set temperature Ts. If a result of step S1 is NO, temperature control for making the room temperature Tr closer to the set temperature Ts is performed in step S2, and the process returns to step S1. If the result of step S1 is YES, the process proceeds to step S3. In step S3, the control unit 4014 causes the sound output unit 4065 to output a message asking the user whether the user is satisfied with the room temperature Tr. In step S4, the sound input unit 4064 obtains the user's voice, and the interpretation unit 4013 extracts the user's instruction. In step S5, the process branches in accordance with the content of the user's instruction. If the content of the instruction indicates that the user is satisfied with the room temperature Tr, the process proceeds to step S6, and the fine control routine ends. If the content of the instruction indicates, in step S5, a request to increase the room temperature Tr a little more, the process proceeds to step S7, and the set temperature Ts is increased by a certain amount ΔT. If the content of the instruction indicates, in step S5, a request to decrease the room temperature Tr a little more, the process returns to step S8, and the set temperature Ts is decreased by the certain amount ΔT. After step S7 or step S8 ends, the process proceeds to step S1.

As described above, the indoor environment control system 4090 repeats the control of an indoor environment (step S2) and the asking of a question to the user (step S3) until the user accepts a latest room temperature Tr.

(6) Characteristics (6-1)

The user can feed back his/her own desire to the indoor environment control system 4090 through the sound input unit 4064 as to whether to accept an environment in which the set temperature Ts is achieved or change the room temperature Tr again. As a result, the user's satisfaction at the control of the indoor environment improves.

(6-2)

The indoor environment control system 4090 repeats the control of the indoor environment and the asking of a question to the user until the user accepts. As a result, the user's satisfaction at the control of the indoor environment further improves.

(6-3)

The sound input unit 4064 receives the user's voice. As a result, the user can give an instruction to the indoor environment control system 4090 using his/her voice, and operation is easy.

(6-4)

For example, at least either the text extraction unit 4011 or the interpretation unit 4013 can be provided in the 40 server 40 provided at the place distant from the air conditioner 4062. As a result, the air conditioner 4062 need not have high processing capability.

(6-5)

The user identification unit 4019 identifies a user from a voiceprint. As a result, the indoor environment can reflect setting values optimal for each user.

(6-6)

A plurality of users can each update his/her optimal setting values. As a result, each user's satisfaction further improves.

(7) Modifications (7-1) First Modification

In the above-described embodiment, a device for adjusting an environment that can be controlled by the indoor environment control system 4090 is only the air conditioner 4062. Alternatively, as illustrated in FIG. 38, an indoor environment control system 4090A may control another indoor environment control device. Indoor environment control devices controlled by the indoor environment control system 4090A according to a first modification are a humidifier 4062A and a lighting device 4062B as well as the air conditioner 4062. As for the humidifier 4062A, the storage unit 4017 stores a set humidity as a set value, and the control unit 4014 controls the humidifier 4062A such that indoor humidity becomes close to the set humidity. As for the lighting device 4062B, the storage unit 4017 stores a set illuminance as a set value, and the control unit 4014 controls the lighting device 6240B such that indoor illuminance becomes close to the set illuminance. Needless to say, an indoor environment control device other than those described above may be provided, and the indoor environment control system 4090A may control the indoor environment control device.

This configuration can more adjust the user's sensory stimuli comfortably.

(7-2) Second Modification

In the above-described embodiment, inputs and outputs of the user in relation to the indoor environment control system 4090 are sounds. Alternatively, as illustrated in FIG. 39, the user may make inputs and outputs in relation to an indoor environment control system 4090B through means other than sounds. The indoor environment control system 4090B according to a second modification includes a remote control 4063A instead of the sound input/output apparatus 4063. The remote control 4063A performs wireless communication or infrared communication directly with the air conditioner 4062. The remote control 4063A is provided with input keys 4064A and an output display 4065A.

This configuration enables the user to inform the indoor environment control system 4090 of his/her desires independently of audition.

[Fifth Configuration]

(1) Overall Configuration

FIG. 40 illustrates a device control system according to an embodiment. The device control system according to the present embodiment is configured as an air conditioning management system 5090. The air conditioning management system 5090 includes a plurality of properties 5060A and 5060B and a server 5040. The air conditioning management system 5090 forms a demand response system in cooperation with a power company 5030. The air conditioning management system 5090 receives power from the power company 5030 and communicates with the power company 5030.

The power company 5030 supplies power to the properties 5060A and 5060B using a power line 5032. The power company 5030 is provided with a power management apparatus 5031. The power management apparatus 5031 can communicate with controllers 5061 of the properties 5060A and 5060B through a network 5050 using a communication line 5033.

The power management apparatus 5031 can transmit "suppression requests", which urge the properties 5060A and 5060B to suppress the amount of power to be used, using the communication line 5033.

(2) Detailed Configuration (2-1) Properties 60A and 60B

The properties 5060A and 5060B are buildings such as houses, office buildings, or factories. The properties 5060A and 5060B are each provided with electrical devices such as an air conditioner 5062, a lighting device 5066, and a fan 5067. The properties 5060A and 5060B are also each provided with the controller 5061, a wattmeter 5068, and a sound input/output apparatus 5063.

(2-1-1) Air Conditioner 5062

The air conditioner 5062 adjusts temperature and the like in a room in which the air conditioner 5062 is provided. Power consumed by the air conditioner 5062 varies depending on power on/off, a heating mode/a cooling mode, a set temperature, an outdoor environment, and the like.

(2-1-2) Lighting Device 5066

Power consumed by the lighting device 5066 varies depending on power on/off, adjustment of illuminance and the like.

(2-1-3) Fan 5067

Power consumed by the fan 5067 varies depending on power on/off.

(2-1-4) Controller 5061

The controller 5061 can notify the power management apparatus 5031 of the power company 5030 of acceptance and refusal of a suppression request. Furthermore, the controller 5061 controls the electrical devices in consideration of presence or absence of a suppression request.

(2-1-5) Wattmeter 5068

The wattmeter 5068 measures the amount of power used in the corresponding property 5060A or 5060B. A result of the measurement is monitored by the controller 5061.

(2-1-6) Sound Input/Output Apparatus 5063

The sound input/output apparatus 5063 operates as a sound remote control for the electrical devices. The sound input/output apparatus 5063 is provided in the same room, for example, as the air conditioner 5062.

(2-2) Server 5040

The server 5040 is used to cause the sound input/output apparatus 5063 to operate as a sound remote control for the electrical devices. The server 5040 may be configured as a single computer or as a plurality of computers having different functions. For example, a certain computer may analyze sounds and extract instructions, and another computer may control the electrical devices and detect abnormalities. In this case, a plurality of computers may be provided at distant places and owned or managed by different companies.

(3) Hardware Configuration

FIG. 41 is a block diagram illustrating the hardware configuration of the air conditioning management system 5090. The drawing illustrates only illustrates only electrical devices provided for one property.

(3-1) Air Conditioner 5062

The air conditioner 5062 includes an input/output interface unit 5621, a processor 5622, and a refrigerant circuit 5623. The input/output interface unit 5621 is connected to the network 50 through the controller 5061 and exchanges information with other devices. The refrigerant circuit 5623 includes a sensor and an actuator and conditions air in a room. The processor 5622 controls the actuator of the air conditioner 5062, reads outputs of the sensor, and exchanges information with the input/output interface unit 5621.

(3-2) Sound Input/Output Apparatus 5063

The sound input/output apparatus 5063 includes an input/output interface unit 5631, a sound input unit 5064, and a sound output unit 5065. The input/output interface unit 5621 is connected to the network 5050 through the controller 5061 and exchanges information with other devices.

The sound input unit 5064 includes a microphone 5641, an amplifier 5642, and an AD converter 5643. The microphone 5641 obtains an analog sound signal. The amplifier 5642 amplifies the obtained analog sound signal. The AD converter 5643 performs AD conversion on the amplified analog sound signal and transmits resultant sound data SD to the input/output interface unit 5631.

The sound output unit 5065 includes a DA converter 5653, an amplifier 5652, and a speaker 5651. The DA converter 5653 performs DA conversion on output data OD received from the input/output interface unit 5631 and transmits a resultant analog output signal to the amplifier 5652. The amplifier 5652 amplifies the analog output signal. The speaker 5651 outputs a sound corresponding to the amplified analog output signal.

(3-3) Server 5040

The server 5040 includes computers 5040a and 5040b. The server 5040 may include any number of computers. Here, only the configuration of the computer 5040a will be described. The computer 5040a includes an input/output interface unit 5041, a processor 5042, and a memory 5043. The input/output interface unit 5041 is connected to the network 5050. The processor 5042 performs various processes. The processes include transmission and reception of information through the input/output interface unit 5041 and various calculation operations. The memory 5043 stores information through a writing operation and the like performed by the processor 5042.

(3-4) Controller 5061

The controller 5061 includes input/output interface units 5611, 5614, and 5615, a processor 5612, and a memory 5613. The input/output interface unit 5611 is connected to the network 5050. The input/output interface unit 5614 is connected to the air conditioner 5062. The input/output interface unit 5615 is connected to the sound input/output apparatus 5063. The memory 5613 stores various pieces of information. The processor 5612 presides over various types of communication, calculations, recording of information, reading of information, and other general processes.

(4) Functional Blocks

FIG. 42 is a block diagram illustrating functions of the air conditioning management system 5090. The air conditioning management system 5090 includes not only the sound input unit 5064, the sound output unit 5065, and the like but also a plurality of functional blocks, namely a text conversion unit 5011, a sound recognition dictionary 5012, an interpretation unit 5013, a control unit 5014, a state extraction unit 5015, a state extraction dictionary 5016, a determination unit 5017, and a storage unit 5018.

The functional blocks 5011 to 5018 may be stored in the memories 5043 of the computers 5040a and 5040b of the server 5040 and configured as software to be executed by the processors 5042, such as programs. Alternatively, the functional blocks 5011 to 5018 may be configured as hardware such as integrated circuits and hard drives. Physical positions at which the functional blocks 5011 to 5018 are mounted may be inside the computers 5040a and 5040b, the sound input/output apparatus 5063, the air conditioner 5062, or other places.

(5) Basic Operation

The user instructs the air conditioner 5062 to perform a desired operation through the sound input unit 5064 of the sound input/output apparatus 5063 illustrated in FIG. 41. For example, the user speaks an instruction such as "Turn on the air conditioner" or "Decrease temperature a little" to the sound input unit 5064.

A sound uttered by the user is converted by the AD converter 5643 into sound data SD of a digital signal. The sound data SD is transmitted, for example, to the server 5040 through the network 5050. The text conversion unit 5011 illustrated in FIG. 42 converts the sound data SD into text while referring to the sound recognition dictionary 5012. The interpretation unit 5013 interprets the text and extracts an instruction CM intended by the user.

The control unit 5014 transmits output data OD to the sound output unit 5065 and causes the speaker 5651 illustrated in FIG. 41 to output an audio message such as "Temperature will decrease a little". The control unit 5014 transmits a control signal to the refrigerant circuit 5623 of the air conditioner 5062 to control the air conditioner 5062 to decrease a current control parameter, that is, a value of set temperature, by a certain value.

The electrical devices other than the air conditioner 5062 can be controlled similarly. For example, if the user says, "Brighter", to the sound input unit 5064, the control unit 5014 increases the illuminance of the lighting device 5066.

(6) Demand Response Operation (6-1) State Extraction

The state extraction unit 5015 analyzes sound data SD transmitted from the sound input unit 5064 while referring to the state extraction dictionary 5016, and detects a feeling of the user in the room. The feeling can be detected in various ways. For example, a degree of excitement of the user obtained from the intensity or a sound waveform of the user's voice may be used as the feeling to be detected.

(6-2) Mode Determination

When the determination unit 5017 has received a suppression request relating to use of power from the power management apparatus, the determination unit 5017 determines whether to accept the suppression request in accordance with the user's feeling detected by the state extraction unit 5015. More specifically, if the user's feeling is positive, the determination unit 5017 determines an "acceptance mode", in which a suppression request is accepted, and if the user's feeling is negative, the determination unit 5017 determines a "refusal mode", in which the suppression request is refused.

(6-3) Notification to Power Management Apparatus 5031

The processor 5612 of the controller 5061 that functions as a part of the control unit 5014 transmits the power management apparatus 5031 acceptance of a suppression request in the case of the "acceptance mode" and refusal of a suppression request in the case of the "refusal mode".

(6-4) Recording

A history of transmission of acceptance or refusal to the power management apparatus 5031 is saved in the storage unit 5018.

(7) Characteristics (7-1)

The determination unit 5017 automatically determines whether to accept a suppression request from the power company. As a result, a burden on the user that would otherwise be caused by a determination is reduced.

(7-2)

When there is a user having a negative feeling, a suppression request is not accepted. As a result, an operation that takes into consideration the user having a negative feeling is performed.

(8) Modifications (8-1) Input of Image or Moving Image

Data regarding an image or a moving image may be obtained using an image input unit such as a camera, instead of obtaining sound data using the sound input unit 5064. The state extraction unit 5015 may detect the user's facial expression, posture, or motion or the like and detect the user's feeling from a result of the detection.

(8-2) Energy-Saving Operation

A process performed on the basis of an output of the determination unit 5017 may be execution of an energy-saving operation, which does not relate to a demand response, instead of transmission of acceptance or refusal to the power management apparatus 5031. That is, the energy-saving operation may be performed in the case of the "acceptance mode", and a normal operation may be performed in the case of a "refusal mode". In the energy-saving operation herein, for example, the rotational speed of a motor in a compressor of the air conditioner 5062 is restricted to lower the performance of the air conditioner 5062.

[ Sixth Configuration]

(1) Overall Configuration

FIG. 43 illustrates a device control system according to an embodiment. The device control system according to the present embodiment is configured as a home system 6090. The home system 6090 includes a building 6060, which is a house, and a server 6040 provided at a distant place. The building 6060 includes a router 6061, a sound input/output apparatus 6063, and devices 6070. The router 6061 and the server 6040 are connected to each other through a network 6050.

(2) Detailed Configuration (2-1) Network 6050

The network 6050 is, for example, the Internet constructed using the PSTN (public switched telephone network) or the like.

(2-2) Router 6061

The router 6061 is connected to the network 6050 and includes a switching hub. The sound input/output apparatus 6063 and the devices 6070 are connected to the router 6061 by a link achieved by wired communication or wireless communication.

(2-3) Devices 6070

The devices 6070 include, for example, an air conditioner 6071, a bathroom water heater 6072, a television 6073, a lighting device 6074, a wearable terminal 6075, a cooking device 6076, and a refrigerator 6077.

(2-4) Sound Input/Output Apparatus 6063

The sound input/output apparatus 6063 is used to operate the devices 6070 through verbal instructions. The sound input/output apparatus 6063 is provided with a sound input unit 6064 and a sound output unit 6065.

(2-5) Server 6040

The server 6040 controls the devices 6070 in response to sounds uttered by the user. The server 6040 may be configured as a single computer or may be achieved by a plurality of computers 6040$a$ and 6040$b$ having different functions. For example, one computer 6040$a$ may analyze sounds and execute instructions, and another computer 6040$b$ may control the air conditioner 6071 and detect abnormalities. In this case, the plurality of computers 6040$a$ and 6040$b$ may be provided at distant places and owned or managed by different companies.

(3) Hardware Configuration

FIG. 44 is a block diagram illustrating the configuration of the home system 6090.

(3-1) Devices 70

The air conditioner 6071, which is one of the devices 6070, includes an input/output interface unit 6711, a processor 6712, and a refrigerant circuit 6713. The input/output interface unit 6711 is connected to the network 6050 through the router 6061 and exchanges information with other devices. The refrigerant circuit 6713 includes a sensor and an actuator and conditions air in a room. The processor 6712 controls an actuator of the air conditioner 6071, reads outputs of the sensor, and exchanges information with the input/output interface unit 6711.

As with the air conditioner 6071, the others of the devices 6070 usually each include a processor, an actuator, a sensor, and an input/output interface. The processor controls the actuator, reads outputs of the sensor, and exchanges information with the input/output interface.

(3-2) Sound Input/Output Apparatus 6063

The sound input/output apparatus 6063 includes an input/output interface unit 6631, a sound input unit 6064, and a sound output unit 6065. The input/output interface unit 6631 is connected to the network 6050 through the router 6061 and exchanges information with other devices.

The sound input unit 6064 includes a microphone 6641, an amplifier 6642, and an AD converter 6643. The microphone 6641 obtains an analog sound signal. The amplifier 6642 amplifies the obtained analog sound signal. The AD converter 6643 performs AD conversion on the amplified analog sound signal and transmits resultant sound data SD to the input/output interface 6631 unit.

The sound output unit 6065 includes a DA converter 6653, an amplifier 6652, and a speaker 6651. The DA converter 6653 performs DA conversion on output data OD received from the input/output interface unit 6631 and transmits a resultant analog output signal to the amplifier 6652. The amplifier 6652 amplifies the analog output signal. The speaker 6651 generates a sound in accordance with the amplified analog output signal.

(3-3) Server 6040

The server 6040 includes computers 6040a and 6040b. The server 6040 may include any number of computers. Here, only the configuration of the computer 6040a will be described. The computer 6040a includes an input/output interface unit 6041, a processor 6042, and a memory 6043. The input/output interface unit 6041 is connected to the network 6050. The processor 6042 performs various processes. The processes include transmission and reception of information through the input/output interface unit 6041 and various calculation operations. The memory 6043 stores information through a writing operation performed by the processor 6042 and the like.

(4) Functional Blocks

FIG. 45 is a block diagram illustrating functions of the home system 6090. The home system 6090 includes not only the sound input unit 6064, the sound output unit 6065, and the like but also a plurality of functional blocks, namely a text extraction unit 6011, a sound recognition dictionary 6012, an interpretation unit 6013, a control unit 6014, a clock unit 6015, a recording unit 6016, a pattern extraction unit 6017, and a prediction unit 6018.

The functional blocks 6011 to 6018 may be configured as software, such as programs, stored in the memories 6043 of the computers 6040a and 6040b of the server 6040 to be executed by the processors 6042. Alternatively, the functional blocks 6011 to 6018 may be configured as hardware such as integrated circuits or hard drives. Physical positions at which the functional blocks 6011 to 6018 are mounted may be inside the computers 6040a and 6040b or may be in the sound input/output apparatus 6063, the air conditioner 6071, or other places. For example, at least a part of the control unit 6014 is configured as the processor 6712 of the air conditioner 6071.

(5) Operation (5-1) Sound Operation

The user instructs the devices 6070 to perform a desired operation through the sound input unit 6064 of the sound input/output apparatus 6063 illustrated in FIG. 44. For example, the user speaks an instruction such as "Turn on the air conditioner" or "Decrease temperature a little" to the sound input unit 6064.

A sound uttered by the user is converted by the AD converter 6643 into sound data SD of a digital signal. The sound data SD is transmitted, for example, to the server 6040 through the network 6050. The text extraction unit 6011 illustrated in FIG. 45 converts the sound data SD into text while referring to the sound recognition dictionary 6012. The interpretation unit 6013 interprets the text and extracts an instruction CM intended by the user. As a result, the interpretation unit 6013 determines, for example, that the instruction CM relates to the air conditioner 6071.

The control unit 6014 transmits output data OD to the sound output unit 6065 and causes the speaker 6651 illustrated in FIG. 44 to generate an audio message such as "Temperature will decrease a little". The control unit 6014 transmits a control signal to the refrigerant circuit 6713 of the air conditioner 6071 to control the air conditioner 6071 to decrease a current control parameter, that is, a value of set temperature, by a certain amount.

(5-2) Obtaining of Device Operations

The server 6040 obtains outputs of the sensors provided in the devices 6070 and the content of instructions CM transmitted to the devices 6070. The sensor outputs and the control instructions CM are stored in the recording unit 6016 as a log illustrated in FIG. 46 while being associated with time points measured by the clock unit 6015.

(5-3) Extraction of Behavior Pattern of User

The pattern extraction unit 6017 extracts, by analyzing the log, a device operation pattern that frequently occurs. For example, characteristic device operation patterns include the following.

(5-3-1) Ones Where Dates and Times Are Strongly Correlated with Device Operations Records of instructions to certain devices given or detection performed at specific dates, days, and times.

The lighting device 6074 is turned on around 7 p.m. on weekdays. (Returning from work)

The wearable terminal 6075 detects an increase in a heart rate around 6 p.m. (Jogging in the evening)

The cooking device 6076 is used around 6 p.m. (Preparation of supper)

(5-3-2) Ones Where Plurality of Device Operations Are Strongly Correlated with Each Other Records of sequential instructions to different devices or detection operations within a predetermined period of time.

The set temperature of the air conditioner 6071 is decreased after the bathroom water heater 6072 is used. (Stronger cooling after a bath)

The set temperature of the air conditioner 6071 is increased after an increase in the heart rate is detected by the wearable terminal 6075. (Reduced cooling after jogging)

The set temperature of the air conditioner 6071 is decreased during use of the cooking device 6076. (Stronger cooling during cooking)

(5-3-3) Ones Where Dates and Times Are Strongly Correlated with Operations of a Plurality of Devices Around 8 p.m. on Fridays, a door of the refrigerator 6077 is opened after the television 6073 is turned on. (Watching television while drinking)

(5-4) Prediction of User's Behavior

The prediction unit 6018 predicts a pattern that is likely to occur in the near future from a device operation pattern extracted by the pattern extraction unit 6017. It is assumed, for example, that present time is 5:55 p.m. and the set temperature of the air conditioner 6071 is 26° C. The prediction unit 6018 predicts that "it is highly probable that the set temperature of the air conditioner 71 will be changed to 25° C. five minutes later, around 6 p.m."

(5-5) Device Control

The control unit 6014 performs control on the basis of prediction. The following two modes, for example, are used for the control.

(5-5-1) Advance Achievement Mode

The control unit 6014 performs in advance an operation that the user will likely perform before the user operates one of the devices 6070. For example, the control unit 6014 changes the set temperature of the air conditioner 6071 from 26° C. to 25° C. at 6 p.m. on the basis of the above prediction.

(5-5-2) Advice Mode

The control unit 6014 outputs a message to the user to inform the user of a predicted operation. For example, the control unit 6014 causes the sound output unit 6065 to output a message, "It's 6 p.m. It might be good to decrease the temperature of the air conditioner to 25° C.", at 6 p.m. on the basis of the above prediction.

(6) Characteristics (6-1)

Characteristic sequential instruction patterns can be obtained. As a result, the home system 6090 can determine patterns of control that the user will likely feel comfortable with.

(6-2)

The prediction unit 6018 predicts, on the basis of a sequential instruction pattern, control of a device that the user will likely perform next. As a result, the home system 6090 can determine patterns of control that the user will likely feel comfortable with.

(6-3)

A message output unit informs the user of control of a device that the user might like to perform next. As a result, the user can be kept from forgetting a device operation for making himself/herself feel comfortable.

(6-4)

The sound output unit 6065 informs the user of control of a device that the user might like to perform next. As a result, the user can be kept from forgetting a device operation for making himself/herself feel comfortable.

(6-5)

The user can give instructions using his/her voice. As a result, the user can easily control the home system 6090.

(6-6)

The home system 6090 controls the air conditioner 6071. As a result, the home system 6090 can achieve a temperature or the like that the user will feel comfortable with.

(7) Modifications (7-1) First Modification

As illustrated in FIG. 47, a smartphone 6063A may be used instead of the sound input/output apparatus 6063 according to the above embodiment. The devices are not illustrated in the drawing. The smartphone 6063A may be connected to the network 6050 through wireless communication with the router 6061, a 4G network provided by a mobile carrier, or the like. Text messages may be used instead of audio messages. An image or an animation of a character may be displayed on a screen of the smartphone 6063A as if the character were reading messages.

Furthermore, input/output means in any form, such as a touch panel, a keyboard, a camera, or an LED indicator, may be employed instead of the sound input/output apparatus 6063 or the smartphone 6063A.

(7-2) Second Modification

In a second modification illustrated in FIG. 48, a home system 6090B includes a functional block of a context unit 6019. The context unit 6019 generates a message that matches a pattern output from the prediction unit while referring to context of a lifestyle of a person, a country, a region, or the like.

If the lighting device 6074 is turned on on Friday night, the sound output unit 6065 may output a consoling message such as "All your efforts this week were very much appreciated. There is a well-chilled beer in the fridge".

The context unit 6019 may be achieved, for example, by a neural network.

(7-3) Third Modification

The pattern prediction performed by the prediction unit 6018 may be presented to the user by the sound output unit 6065 or another output means. In this case, a determination unit that determines an event in which the user has operated a device as presented as a success and an event in which the user has performed an operation different from a presented one as a failure may also be provided. In addition, a pattern presentation result recording unit that records a history of successes and failures of presentation may be provided.

With this configuration, a history of successes and failures can be analyzed as well as a log of device operations. As a result, the user's behavior can be predicted more accurately and presentation can more likely produce successful results after recording of the history.

(7-4) Fourth Modification

When a pattern of device operations is presented to the user in the third modification, the content of the presentation may be determined in consideration of information regarding the outside of the building 6060.

When a power transmission network is close to a limit of the capacity thereof in the summer, for example, a message, "The set temperature of the air conditioner is usually 25° C., but how about changing it to 26° C. today?", may be presented.

[Seventh Configuration]

A device control system 7400 according to an embodiment of a device control system in the present disclosure, a first device 7010, a second device 7020, and a third device 7030 according to an embodiment of devices in the present disclosure controlled by the device control system 7400, and an embodiment of a method for controlling these devices will be described hereinafter with reference to the drawings.

(1) Outlines

Outlines of the device control system 7400 and the first device 7010, the second device 7020, and the third device 7030 controlled by the device control system 7400 will be described with reference to FIG. 49.

FIG. 49 is a schematic block diagram illustrating the device control system 7400 and the first device 7010, the second device 7020, and the third device 7030 controlled by the device control system 7400. Although not illustrated in FIG. 49 in order to avoid making the drawing complex, the third device 7030 also includes components such as a sound input unit, a sound data transmission unit, a start/stop request reception unit, a start/stop information reception unit, a notification unit, a switch, and a remote control as with the first device 7010 and the second device 7020.

The first device 7010, the second device 7020, the third device 7030, and the device control system 7400 are connected to one another by a network 7040 (refer to FIG. 49). The network 7040 is the Internet, for example, but may be a WAN or the like, instead.

The first device 7010, the second device 7020, and the third device 7030 are devices that can be operated using sounds. Here, the first device 7010, the second device 7020, and the third device 7030 are devices provided in the same building, such as a detached house. This installation place is just an example, however, and these devices may be provided in an office building, a hotel, a factory, or the like, instead. Here, the first device 7010 and the second device 7020 are provided in a first space (e.g., a first floor of the house), and the third device 7030 is provided in a second space (e.g., a second floor of the house).

Although a case where three devices (the first device 7010, the second device 7020, and the third device 7030) are provided in a building will be described here as an example, the number of devices provided is not limited to this. Two, or four or more, devices may be provided in a building, instead. In addition, although the first device 7010, the second device 7020, and the third device 7030 provided in a single building will be described here as an example, devices may be provided in a plurality of buildings and connected to the device control system 7400 through the network 7040, instead.

In the present embodiment, the first device 7010, the second device 7020, and the third device 7030 are home appliances. Home appliances include, for example, an air conditioner, a television, a recorder, an audio device, a refrigerator, a microwave, a washing machine, a lighting device, and the like. Types of devices enumerated above are examples. The first device 7010, the second device 7020, and the third device 7030 may be home appliances other than those enumerated, or devices other than home appliances, instead. The first device 7010, the second device 7020, and the third device 7030 may be devices of the same type or devices of different types. In the present embodiment, the first device 7010 and the third device 7030 are air conditioners, and the second device 7020 is a television, although the devices are not limited to these.

Components, functions, and the like relating to sound operations for the first device 7010, the second device 7020, and the third device 7030 will be described later. Since home appliances such as an air conditioner and a television are widely known devices, description of elements other than the components and the functions relating to the sound operations for the first device 7010, the second device 7020, and the third device 7030 is omitted herein.

The device control system 7400 is a system that receives sound data transmitted from the first device 7010, the second device 7020, and the third device 7030 and that analyzes the received sound data. The device control system 7400 is a system that transmits signals (instructions and information) based on results of analysis of sound data to the first device 7010, the second device 7020, and the third device 7030 in order to control the first device 7010, the second device 7020, and the third device 7030.

The device control system 7400 includes a first server 7100, a second server 7200, and a third server 7300 (refer to FIG. 49). The first server 7100, the second server 7200, and the third server 7300 are communicably connected to one another by the network 7040.

The first server 7100, the second server 7200, and the third server 7300 are usually provided at a place different from the building in which the first device 7010, the second device 7020, and the third device 7030 are provided. The first server 7100, the second server 7200, and the third server 7300 may be provided at the same place or different places.

The first server 7100 receives sound data transmitted from the first device 7010, the second device 7020, and the third device 7030 and analyzes the received sound data. The first server 7100 performs various processes for starting/stopping of functions relating to processes for recognizing a sound corresponding to the first device 7010, the second device 7020, and the third device 7030. Details will be described later.

The sound recognition processing corresponding to the first device 7010 refers to a series of processing in which the first device 7010 receives a sound, the first device 7010 transmits sound data regarding the received sound, and the first server 7100 receives the sound data transmitted from the first device 7010 and analyzes the received sound data. More specifically, the sound recognition processing corresponding to the first device 7010 refers to a series of processing in which a sound input unit 7012 receives a sound, a sound data transmission unit 7014 transmits sound data regarding the received sound, and a sound data reception unit 7110 receives the sound data transmitted from the first device 7010 and causes a sound analysis unit 7120 to analyze the received sound data. The sound input unit 7012 and the sound data transmission unit 7014 of the first device 7010 and the sound data reception unit 7110 and the sound analysis unit 7120 of the device control system 7400 will be described later.

The functions relating to the sound recognition processing corresponding to the first device 7010 include, for example, the following functions:

1) A function of receiving a sound executed by the sound input unit 7012
2) A function of transmitting sound data executed by the sound data transmission unit 7014
3) A function of receiving, with the sound data reception unit 7110, sound data transmitted from the first device 7010
4) A function of analyzing, with the sound analysis unit 7120, sound data transmitted from the first device 7010
5) A function of accumulating sound data transmitted from the first device 7010 in a storage unit 7190 of the first server 7100, which will be described later The processes for recognizing a sound corresponding to the second device 7020 and the third device 7030 and the functions relating to the processes for recognizing a sound corresponding to the second device 7020 and the third device 7030 are the same as the sound recognition processing corresponding to the first device 7010 and the functions relating to the sound recognition processing corresponding to the first device 7010, and description thereof is omitted herein.

The second server 7200 transmits a signal based on a result of an analysis conducted by the sound analysis unit 7120 of the first server 7100 on sound data transmitted from the first device 7010 or the third device 7030 (air conditioner) to the first device 7010 or the third device 7030 that has transmitted the sound data. More specifically, for example, the second server 7200 transmits an instruction (signal) to start an operation to the first device 7010 on the basis of a result of an analysis (a result of an analysis indicating that the content of sound data is an instruction to start an operation) of sound data regarding a sound, "Start operation", transmitted from the first device 7010.

Here, the second server 7200 transmits a signal based on the result of the analysis of the sound data transmitted from the first device 7010 or the third device 7030 to the first device 7010 or the third device 7030 that has transmitted the sound data. The device control system 7400, however, is not limited to this mode. When the first device 7010 and the third device 7030 are air conditioners manufactured by different manufacturers or when the first device 7010 and the third device 7030 are air conditioners of different types manufactured by the same manufacturer, for example, the device control system 7400 may include a fourth server (not illustrated) in addition to the first to third servers. The second server 7200 may be configured to transmit, to the first device 7010, a signal based on a result of an analysis of sound data transmitted from the first device 7010, and the fourth server may be configured to transmit, to the third device 7030, a signal based on a result of an analysis of sound data transmitted from the third device 7030. The second server 7200 may be configured to transmit a signal based on a result of an analysis of sound data transmitted from the first device 7010 or the third device 7030 to the first device 7010 or the third device 7030 that has transmitted the sound data, regardless of a difference between the manufacturers of the air conditioners, which are the first device 7010 and the third device 7030, and a difference between the types of air conditioner.

The third server 7300 transmits a signal based on a result of an analysis conducted by the sound analysis unit 7120 of the first server 7100 on sound data transmitted from the second device 7020 (a television in the present embodiment) to the second device 7020, which has transmitted the sound data. More specifically, for example, the second server 7200 transmits an instruction signal for turning on the second device 7020 on the basis of a result of an analysis (a result of an analysis indicating that the content of sound data is an instruction to turn on) of sound data regarding a sound, "Turn on", transmitted from the second device 7020.

Although the third server 7300 transmits a signal based on a result of an analysis of sound data to the second device 7020 here, an operation performed is not limited to this. For example, the device control system 7400 need not include the third server 7300, and the second server 7200 may function as the third server 7300 according to the present embodiment, instead.

(2) Detailed Configuration

The components, the functions, and the like relating to the sound operations for the devices (the first device 7010, the second device 7020, and the third device 7030) and the device control system 7400 will be further described hereinafter.

(2-1) First Device, Second Device, and Third Device

The first device 7010, the second device 7020, and the third device 7030 are examples of a first device and examples of a second device.

The components, the functions, and the like relating to the sound operations for first device 7010, the second device 7020, and the third device 7030 will be described hereinafter while taking the first device 7010 as an example.

A sound input unit 7022, a sound data transmission unit 7024, a start/stop request reception unit 7026, a start/stop information reception unit 7027, a notification unit 7028, a switch 7021*a*, and a remote control 7021*b* of the second device 7020 are the same as the sound input unit 7012, the sound data transmission unit 7014, the start/stop request reception unit 7016, the start/stop information reception unit 7017, the notification unit 7018, the switch 7011*a*, and the remote control 7011*b*, respectively, of the first device 7010. The third device 7030, too, has the same configuration as the first device 7010 with respect to the sound operation. Description of the second device 7020 and the third device 7030, therefore, is omitted herein.

The first device 7010 mainly includes, as the components relating to the sound operation, the sound input unit 7012 including a microphone, a control board (not illustrated) including a CPU and a memory storing a program and the like to be executed by the CPU, a communication interface (not illustrated) that achieves a connection to the network 7040, the notification unit 7018 including LEDs, the physical switch 7011*a* provided for a main body (not illustrated) of the first device, the remote control 7011*b* used to transmit various instructions to the first device 7010, and the like. The remote control 7011*b* may be connected to the main body of the first device 7010 by wire or may transmit a signal to the main body of the first device 7010 wirelessly (e.g., using an infrared signal).

The first device 7010 functions as the sound data transmission unit 7014, the start/stop request reception unit 7016, the start/stop information reception unit 7017, and the like when the CPU of the control board has executed the program.

The switch 7011*a*, the remote control 7011*b*, the sound input unit 7012, the sound data transmission unit 7014, the start/stop request reception unit 7016, the start/stop information reception unit 7017, and the notification unit 7018 of the first device 7010 will be described hereinafter.

(2-1-1) Switch and Remote Control

The switch 7011*a* and the remote control 7011*b* are examples of an instruction reception unit. The instruction reception unit is a functional unit that receives an instruction to stop at least a part of the functions relating to the sound recognition processing, in which the sound input unit 7012 receives a sound, the sound data transmission unit 7014 transmits sound data, and the sound analysis unit 7120 of the device control system 7400 is caused to analyze the sound data transmitted from the sound data transmission unit 7014. The switch 7011*a* and the remote control 7011*b* are functional units that receive an instruction to start (resume) at least a part of the functions relating to the sound recognition processing.

The switch 7011*a* is a physical switch (e.g., a press-button switch).

The remote control 7011*b* is used for operations of the first device 7010 as an air conditioner, such as turning on and off of the first device 7010, setting of operation modes, and inputting of a set temperature. The remote control 7011*b* is provided with a switch that receives an instruction to start or stop at least a part of the functions relating to the sound recognition processing corresponding to the first device 7010.

If the switch 7011*a* or the remote control 7011*b* receives an instruction to start or stop at least a part of the functions relating to the sound recognition processing corresponding to the first device 7010, the first device 7010 preferably transmits a function start notification signal or a function stop notification signal to the device control system 7400.

The function start notification signal or the function stop notification signal is a signal for notifying that an instruction to start or stop at least a part of the functions relating to the sound recognition processing corresponding to the first device 7010 has been received. Information indicating a function for which an a start or stop instruction has been received is preferably attached to the function start notification signal or the function stop notification signal as well as the notification of the reception of the instruction to start or stop the function.

(2-1-2) Sound Input Unit

The sound input unit 7012 includes the microphone (not illustrated) that receives sounds and receives sounds.

The function of receiving a sound executed by the sound input unit 7012 is preferably configured such that a start (execute) or stop instruction can be given.

The function of receiving a sound executed by the sound input unit 7012 is preferably configured such that a start or stop instruction can be given in accordance with an instruction to the switch 7011*a* (pressing of the switch 7011*a*) or an instruction from the remote control 7011*b* (an operation on the remote control 7011*b*). If the function of receiving a sound executed by the sound input unit 7012 is started or stopped in accordance with an instruction to the switch 7011*a* or an instruction from the remote control 7011*b*, the first device 7010 preferably transmits a signal (a function start notification signal or a function stop notification signal) for notifying the first server 7100 of the start or the stop to the first server 7100.

An instruction to start or stop the function of receiving a sound executed by the sound input unit 7012 is preferably given when the start/stop request reception unit 7016 has received a request to start or stop the function of receiving a sound executed by the sound input unit 7012.

(2-1-3) Sound Data Transmission Unit

The sound data transmission unit 7014 transmits a sound received by the sound input unit 7012 to the device control system 7400 including the sound analysis unit 7120 as sound data. The sound data transmission unit 7014 transmits, to the device control system 7400, a digital sound signal (sound data) obtained, for example, by performing A/D conversion on a sound received by the sound input unit 7012.

The function of transmitting sound data executed by the sound data transmission unit 7014 is preferably configured such that a start (execute) or stop instruction can be given.

The function of transmitting sound data executed by the sound data transmission unit 7014 is preferably configured such that a start or stop instruction can be given in accordance with an instruction to the switch 7011*a* or an instruction from the remote control 7011*b*. If the function of transmitting sound data executed by the sound data transmission unit 7014 is started or stopped in accordance with an instruction to the switch 7011*a* or an instruction from the remote control 7011*b*, the first device 7010 preferably transmits a signal (a function start notification signal or a function stop notification signal) for notifying the first server 7100 of the start or the stop.

The function of transmitting sound data executed by the sound data transmission unit 7014 may be started or stopped in accordance with a sound input from the sound input unit 7012. For example, the first device 7010 includes a sound recognition chip that recognizes only specific sounds (e.g., sounds for giving an instruction to start or stop the function of transmitting sound data executed by the sound data transmission unit 7014) among sounds input to the sound input unit 7012. When such a sound recognition chip is included, an instruction to start or stop the function of transmitting sound data executed by the sound data transmission unit 7014 can be given in accordance with a specific sound input to the sound input unit 7012. When the function of transmitting sound data executed by the sound data transmission unit 7014 has been started or stopped in accordance with a sound input to the sound input unit 7012, too, the first device 7010 preferably transmits, to the first server 7100, a signal (a function start notification signal or a function stop notification signal) for notifying the first server 7100 of the start or the stop.

If the start/stop request reception unit 7016 receives a request to start or stop the function of transmitting sound data executed by the sound data transmission unit 7014, the function of transmitting sound data executed by the sound data transmission unit 7014 is preferably started or stopped in accordance with the request.

(2-1-4) Start/Stop Request Reception Unit

The start/stop request reception unit 7016 receives a request to start or stop a function relating to the sound recognition processing corresponding to the first device 7010 transmitted from a start/stop request unit 7180 of the device control system 7400, which will be described later. The request to start or stop a function received by the start/stop request reception unit 7016 is a function that can be started or stopped by the first device 7010. The request to start or stop a function received by the start/stop request reception unit 7016 is, for example, a request to start or stop the function of receiving a sound executed by the sound input unit 7012 or a request to start or stop the function of transmitting sound data executed by the sound data transmission unit 7014. If the start/stop request reception unit 7016 receives a signal for requesting a start or a stop of a function relating to the sound recognition processing corresponding to the first device 7010, the first device 7010 starts or stops the function relating to the sound recognition processing corresponding to the first device 7010.

(2-1-5) Start/Stop Information Reception Unit

The start/stop information reception unit 7017 receives function stop information transmitted from a start/stop information transmission unit 7170 of the device control system 7400, which will be described later.

The function stop information is information regarding a determination of a stop of at least a part (second function) of functions relating to sound recognition processing corresponding to a device (the first device 7010) in accordance with a stop of at least a part (first function) of functions relating to sound recognition processing corresponding to another device (a device other than the first device 7010) that can be operated using sounds. In other words, function stop information is information transmitted to the first device 7010 when a start/stop determination unit 7160 of the device control system 7400, which will be described later, has determined a stop of at least a part of functions relating to sound recognition processing corresponding to a device (the first device 7010) in accordance with a stop of at least a part of functions relating to sound recognition processing corresponding to another device (a device other than the first device 7010) that can be operated using sounds, in order to notify the first device 7010 of the stop.

The start/stop information reception unit 7017 also receives function start information transmitted from the start/stop information transmission unit 7170 of the device control system 7400, which will be described later.

The function start information is information regarding a determination of a start of functions relating to sound recognition processing corresponding to a device (the first device 7010) in accordance with a start of functions relating to sound recognition processing corresponding to another device (a device other than the first device 7010) that can be operated using sounds. In other words, function start information is information transmitted to the first device 7010 when the start/stop determination unit 7160 of the device control system 7400, which will be described later, has determined a start of functions relating to sound recognition processing corresponding to a device (the first device 7010) (enabling of the sound recognition processing corresponding to the device (the first device 7010)) in accordance with a start of the functions relating to the sound recognition processing corresponding to another device (a device other than the first device 7010) that can be operated using sounds and enabling of the sound recognition processing, in order to notify the first device 7010 of the start.

(2-1-6) Notification Unit

The notification unit 7018 is a functional unit that notifies the user of the first device 10 whether the sound recognition processing corresponding to the first device 7010 is enabled. The notification unit 7018 includes, for example, LEDs.

The notification unit 7018 notifies the user that at least a part of the functions relating to the sound recognition processing corresponding to the first device 7010 has been stopped. In other words, the notification unit 7018 notifies the user that the sound recognition processing corresponding to the first device 7010 has been stopped. More specifically, the notification unit 7018 turns on an LED of a first color (e.g., a red LED) if the switch 7011*a* or the remote control 7011*b*, which is an example of the instruction reception unit, or the sound input unit 7012 receives an instruction to stop one of the functions relating to the sound recognition processing corresponding to the first device 7010 or the start/stop information reception unit 7017 receives function stop information.

The notification unit 7018 also notifies the user that the functions relating to the sound recognition processing corresponding to the first device 7010 have been started. The notification unit 7018 notifies the user that all the functions relating to the sound recognition processing corresponding to the first device 7010 have been started (have not been stopped). In other words, the notification unit 7018 notifies the user that the sound recognition processing corresponding to the first device 7010 is enabled (executable). More specifically, if the switch 7011a or the remote control 7011b, which is an example of the instruction reception unit, or the sound input unit 7012 receives an instruction to start the functions relating to the sound recognition processing corresponding to the first device 7010 or the start/stop information reception unit 7017 receives function start information, the notification unit 7018 turns on an LED of a second color (e.g., a blue LED).

(2-2) Device Control System

The first server 7100, the second server 7200, and the third server 7300 of the device control system 7400 will be described.

(2-2-1) First Server

The first server 7100 is a computer including a processor, storage devices including a main storage device and an auxiliary storage device, a communication interface, and the like. The first server 7100 is communicably connected to the first device 7010, the second device 7020, the third device 7030, the second server 7200, and the third server 7300 through the network 7040.

The first server 7100 performs various processes by executing programs stored in the storage unit 7190 (storage device) using the processor. The first server 7100 includes, as functional units that perform the various processes, the sound data reception unit 7110, the sound analysis unit 7120, an analysis result transmission unit 7130, a detection unit 7140, an identification unit 7150, the start/stop determination unit 7160, the start/stop information transmission unit 7170, and the start/stop request unit 7180.

The storage unit 7190 includes an association information storage area 7192 and a sound data storage area 7194 as storage areas for information regarding the processes for recognizing a sound corresponding to the first device 7010, the second device 7020, and the third device 7030 and information regarding starts and stops of at least a part of the functions relating to the processes for recognizing a sound.

In the association information storage area 7192, identification codes of devices controlled by the device control system 7400 are associated with identification codes of devices associated with the foregoing devices and stored.

Here, when a certain device (referred to as a "device A") and another device (referred to as a "device B") are associated with each other, it is preferable to start or stop at least a part (second function) of functions relating to sound recognition processing corresponding to the device B when at least a part (first function) of functions relating to sound recognition processing corresponding to the device A has been started or stopped. More specifically, for example, when the device A and the device B are provided relatively close to each other, it is often preferable to start or stop at least a part of the functions relating to the sound recognition processing corresponding to the device B when at least a part of the functions relating to the sound recognition processing corresponding to the device A has been started or stopped.

Which device should be associated with the device A is determined, for example, on the basis of information input by a user of the device A to the first server 7100 from an information terminal, which is not illustrated, or the like.

In a specific example, if information indicating that the device A and the device B are provided in the same space is input, for example, the device A and the device B are stored in the association information storage area 7192 as devices associated with each other. In the example illustrated in FIG. 49, for example, since the first device 7010 and the second device 7020 are provided in the same space (the first space), the first device 7010 and the second device 7020 are stored while being associated with each other. Since the third device 7030 is provided in a space (the second space) different from the first device 7010 and the second device 7020, the third device 7030 is not associated with the first device 7010 and the second device 7020 when stored.

In another example, if information indicating that the device A and the device B are provided in the same building is input, the device A and the device B may be stored in the association information storage area 7192 as devices associated with each other.

In another example, when a plurality of devices are communicating using a plurality of access points and a wireless LAN in a building, devices using the same access point may be stored in the association information storage area 7192 as devices associated with each other.

In yet another example, the device A and the device B may be stored in the association information storage area 7192 as devices associated with each other at the request of a user of the device A and the device B.

The sound data reception unit 7110, the sound analysis unit 7120, the analysis result transmission unit 7130, the detection unit 7140, the identification unit 7150, the start/stop determination unit 7160, the start/stop information transmission unit 7170, and the start/stop request unit 7180 will be described hereinafter.

(2-2-1-1) Sound Data Reception Unit

The sound data reception unit 7110 is an example of a first sound data reception unit and a second sound data reception unit. The sound data reception unit 7110 receives sound data transmitted from the sound data transmission unit 7014 of the first device 7010, the sound data transmission unit 7024 of the second device 7020, and a sound data transmission unit (not illustrated) of the third device 7030. After the sound data reception unit 7110 receives sound data transmitted from the sound data transmission unit 7014 of the first device 7010, the sound data transmission unit 7024 of the second device 7020, and the sound data transmission unit (not illustrated) of the third device 7030, the received sound data is preferably temporarily accumulated in the sound data storage area 7194 before sound analyses are conducted. This timing of the accumulation of sound data is an example, and sound data may be accumulated in the sound data storage area 7194 before or during sound analyses.

The function of receiving, with the sound data reception unit 7110, sound data transmitted from the first device 7010 (hereinafter simply referred to as a function of receiving sound data for the sake of simplicity of description), which is an example of one of the functions relating to the sound recognition processing corresponding to the first device 7010, is preferably configured to be started or stopped from the first device 7010.

More specifically, for example, a start or a stop of the function of receiving sound data is preferably configured to be requested to the first server 7100 in accordance with an instruction to the switch 7011a of the first device 7010 or an instruction from the remote control 7011b of the first device 7010 (using a function start notification signal or a function stop notification signal). When requested to start or stop the function of receiving sound data, the first server 7100 preferably starts or stops the function of receiving sound data in accordance with the request.

Alternatively, a start or a stop of the function of receiving sound data may be instructed through a sound input from the sound input unit 7012. If a sound for requesting a start or a stop of the function of receiving sound data is input to the sound input unit 7012, the sound data reception unit 7110 receives sound data regarding the sound, and the sound analysis unit 7120 recognizes that the sound is requesting a start or a stop of the function of receiving sound data, the first server 7100 preferably executes or stops the function of receiving sound data in accordance with the request.

If the start/stop determination unit 7160, which will be described later, determines that at least a part of the functions relating to the sound recognition processing corresponding to the first device 7010 should be stopped, the first server 7100 is preferably able to execute or stop the function of receiving sound data.

The function of accumulating sound data transmitted from the first device 7010 in the sound data storage area 7194 of the storage unit 7190 (hereinafter simply referred to as a function of accumulating sound data for the sake of simplicity of description), which is an example of one of the functions relating to the sound recognition processing corresponding to the first device 7010, too, is preferably configured to be started or stopped from the first device 7010. More specifically, a start or a stop of the function of accumulating sound data may be achieved in the same manner as a start or a stop of the function of receiving sound data, and description thereof is omitted.

If the start/stop determination unit 7160, which will be described later, determines that at least a part of the functions relating to the sound recognition processing corresponding to the first device 7010 is to be stopped, the first server 7100 is preferably able to execute or stop the function of accumulating sound data.

A start and a stop of the function of receiving, with the sound data reception unit 7110, sound data transmitted from the first device 7010 and the function of accumulating sound data transmitted from the first device 7010 in the sound data storage area 7194 of the storage unit 7190 have been described here. A start and a stop of a function of receiving, with the sound data reception unit 7110, sound data transmitted from the second device 7020 or the third device 7030 are the same as in the above description, and description thereof is omitted.

(2-2-1-2) Sound Analysis Unit

The sound analysis unit 7120 is an example of a first sound analysis unit and a second sound analysis unit. The sound analysis unit 7120 analyzes the content of sound data received by the sound data reception unit 7110 (the first device 7010, the second device 7020, and the third device). More specifically, for example, the sound analysis unit 7120 analyzes sound data to obtain a feature value and generates text information from the feature value using a sound recognition dictionary including an acoustic model, a language model, and a pronunciation dictionary stored in the storage device. The text information generated by the sound analysis unit 7120 is not limited but may be text information such as "operation start", "set temperature 25 degrees", or "cooling".

The function of analyzing, with the sound analysis unit 7120, sound data transmitted from the first device 7010 (hereinafter simply referred to as a function of analyzing sound data for the sake of simplicity of description), which is an example of one of the functions relating to the sound recognition processing corresponding to the first device 7010, is preferably configured to be started or stopped from the first device 7010. More specifically, a start or a stop of the function of analyzing sound data may be achieved in the same manner as a start or a stop of the function of receiving sound data, and description thereof is omitted.

If the start/stop determination unit 7160, which will be described later, determines that at least a part of the functions of the sound recognition processing corresponding to the first device 7010 is to be stopped, the first server 7100 is preferably able to execute or stop the function of analyzing sound data.

A start and a stop of the function of analyzing, with the sound analysis unit 7120, sound data transmitted from the first device 7010 have been described here. A start and a stop of functions of analyzing, with the sound analysis unit 7120, sound data transmitted from the second device 7020 and the third device 7030 are the same as in the above description, and description thereof is omitted.

(2-2-1-3) Analysis Result Transmission Unit

The analysis result transmission unit 7130 transmits a result (text information generated by the sound analysis unit 7120) of a sound analysis conducted by the sound analysis unit 7120 to the second server 7200 or the third server 7300. The result of the sound analysis preferably includes information regarding a transmission source of sound data subjected to the sound analysis.

The analysis result transmission unit 7130 may transmit a result of a sound analysis to a server associated with a transmission source of sound data subjected to the sound analysis. Here, if the transmission source of the sound data subjected to the sound analysis is the first device 7010 or the third device 7030, for example, the analysis result transmission unit 7130 transmits the result of the sound analysis to the second server 7200. If the transmission source of the sound data subjected to the sound analysis is the second device 7020, on the other hand, the analysis result transmission unit 7130 transmits the result of the sound analysis to the third server 7300.

In another mode, the analysis result transmission unit 7130 may select a transmission destination of a result of a sound analysis on the basis of the content of the result of the sound analysis (e.g., selects the second server 7200 if the content corresponds to an air conditioner and the third server 7300 if the content is an instruction to a television) and transmit the result of the analysis to the selected server.

(2-2-1-4) Detection Unit

The detection unit 7140 detects that the first device 7010 has received an instruction to stop at least a part (first function) of the functions relating to the sound recognition processing corresponding to the first device 7010. Similarly, the detection unit 7140 detects that the second device 7020 has received an instruction to stop at least a part of the functions relating to the sound recognition processing corresponding to the second device 7020 and that the third device 7030 has received an instruction to stop at least a part of the functions relating to the sound recognition processing corresponding to the third device 7030.

The detection unit 7140 also detects that the first device 7010 has received an instruction to start the first function that has been stopped. Similarly, the detection unit 7140 detects that the second device 7020 has received an instruction to start a stopped function relating to the sound recognition processing corresponding to the second device 7020 and that the third device 7030 has received an instruction to start a stopped function relating to the sound recognition processing corresponding to the third device 7030.

More specifically, as described above, the detection unit 7140 detects that the first device 7010 has received an instruction to start or stop the first function relating to the sound recognition processing corresponding to the first device 7010 on the basis of a signal (a function start notification signal or a function stop notification signal) transmitted from the first device 7010 when the switch 7011*a* or the remote control 7011*b* has received an instruction to start or stop at least a part of the functions relating to the sound recognition processing corresponding to the first device 7010. If sound data analyzed by the sound analysis unit 7120 indicates an instruction to start or stop the first function relating to the sound recognition processing corresponding to the first device 7010, the detection unit 7140 detects that the first device 7010 has received an instruction to start or stop the first function relating to the sound recognition processing corresponding to the first device 7010.

Detection of the second device 20 having received an instruction to stop at least a part of the functions relating to the sound recognition processing and the third device 30 having received an instruction to stop at least a part of the functions relating to the sound recognition processing may also be performed in the same manner.

The detection unit 7140 need not detect that the first device 7010 has received an instruction to start or stop the first function relating to the sound recognition processing on the basis of a signal function start notification signal or a function stop notification signal transmitted from the first device 7010. If the first function is the communication function of the first device 7010, for example, the detection unit 7140 may detect that the first device 7010 has received a start or a stop of the first function relating to the sound recognition processing on the basis of whether the first server 7100 can communicate with the first device 7010.

(2-2-1-5) Identification Unit

The identification unit 7150 identifies devices associated with the first device 7010, the second device 7020, and the third device 7030. The identification unit 7150 identifies devices associated with the first device 7010, the second device 7020, and the third device 7030 on the basis of information stored in the association information storage area 7192 of the storage unit 7190.

(2-2-1-6) Start/Stop Determination Unit

If the detection unit 7140 detects that a certain device (referred to as a device A) has received an instruction to stop at least a part (first function) of functions relating to sound recognition processing corresponding to the device A, the start/stop determination unit 7160 determines at least a part (second function) of functions relating to sound recognition processing corresponding to another device (referred to as a device B), in which a sound input unit receives a sound, sound data regarding the received sound is transmitted, a sound data reception unit 7110 receives the transmitted sound data, and a sound analysis unit 7120 is caused to analyze the received sound data, is to be stopped. More specifically, if the detection unit 7140 detects that the device A has received an instruction to stop the first function relating to the sound recognition processing corresponding to the device A and the device B is included in devices determined by the identification unit 7150 to be associated with the device A, the start/stop determination unit 7160 determines that the second function relating to the sound recognition processing corresponding to the device is to be stopped.

This will be described while taking a specific example.

It is assumed, for example, that the first device 7010 and the second device 7020 are associated with each other but the first device 7010 and the third device 7030 are not associated with each other in the association information storage area 7192. In other words, it is assumed that devices determined by the identification unit 7150 to be associated with the first device 7010 include the second device 7020 but do not include the third device 7030. It is also assumed that the detection unit 7140 has then detected that the first device 7010 has received an instruction to stop the first function relating to the sound recognition processing corresponding thereto. In this case, the start/stop determination unit 7160 determines that at least a part (second function) of the functions relating to the sound recognition processing corresponding to the second device 7020 is to be stopped. The start/stop determination unit 160 does not stop, on the other hand, any function relating to the sound recognition processing corresponding to the third device 30.

The first function to be stopped in the sound recognition processing corresponding to the device A and the second function relating to the sound recognition processing corresponding to the device B, the second function being to be stopped on the basis of the stop of the first function, are preferably of the same type.

When the second function and the first function are of the same type and the first function is the function of receiving a sound executed by the sound input unit 7012, the second function is a function of receiving a sound executed by the sound input unit 7022. In addition, when the second function and the first function are of the same type and the first function is the function of transmitting sound data executed by the first device 7010, for example, the second function is the function of transmitting sound data executed by the second device 7020. In addition, when the second function and the first function are of the same type and the first function is the function of analyzing, with the sound analysis unit 7120, sound data transmitted from the first device 7010, the second function is a function of analyzing, with the sound analysis unit 7120, sound data transmitted from the second device 7020.

The first and second functions, however, need not be of the same type. For example, the second function relating to the sound recognition processing corresponding to the device B may be predetermined (regardless of a type of first function), the second function being to be stopped when the first function has been stopped in the sound recognition processing corresponding to the device A.

If the start/stop determination unit 7160 determines that the second function relating to the sound recognition processing corresponding to the device B is to be stopped, and if the device control system 7400 can stop the second function, the first server 7100 performs a process for stopping the second function. Functions that can be stopped by the device control system 7400 include the function of receiving, with the sound data reception unit 7110, sound data transmitted from the device, the function of analyzing, with the sound analysis unit 7120, sound data transmitted from the device, and the function of accumulating sound data transmitted from the device in the sound data storage area 7194 of the storage unit 7190 of the first server 7100. If the device control system 7400 cannot stop the second function (a function to be stopped by the device B), on the other hand, the start/stop request unit 7180, which will be described later, transmits a stop request to the device B.

If the detection unit 7140 detects that a certain device (referred to as a device A) has received an instruction to start (resume) at least a part (a first function that has been stopped) of functions relating to sound recognition processing corresponding to the device A, the start/stop determination unit 7160 determines that at least a part (a second function that has been stopped) of functions relating to sound recognition processing corresponding to another device (referred to as a device B), in which a sound input unit receives a sound, sound data regarding the received sound is transmitted, a sound data reception unit 7110 receives the transmitted sound data, and a sound analysis unit 7120 is caused to analyze the received sound data, is to be started (resumed). More specifically, if the detection unit 7140 detects that the device A has received an instruction to start the first function relating to the sound recognition processing corresponding to the device A and devices determined by the identification unit 7150 to be associated with the device A include the device B, the start/stop determination unit 7160 determines that the second function relating to the sound recognition processing corresponding to the device B is to be started. That is, if it is detected that the sound recognition processing corresponding to the device A has become executable and the devices determined by the identification unit 7150 to be associated with the device A include the device B, the start/stop determination unit 7160 determines that the sound recognition processing corresponding to the device B is executable.

If the start/stop determination unit 7160 determines that the second function relating to the sound recognition processing corresponding to the device B is to be started (resumed), and if the device control system 7400 can start the second function (in other words, if the device control system 7400 has stopped the second function), the first server 7100 performs a process for starting the second function. If the device control system 7400 cannot start the second function (a function to be started by the device B), on the other hand, the start/stop request unit 7180, which will be described later, transmits a start request to the device B.

(2-2-1-7) Start/Stop Information Transmission Unit

If the start/stop determination unit 7160 determines that a second function relating to sound recognition processing corresponding to a certain device is to be started or stopped, the start/stop information transmission unit 7170 transmits function start information or function stop information to the second device 7020 so that a notification unit of the device issues a notification about the stop of the second function.

In a specific example, if the start/stop determination unit 7160 determines that the second function relating to the sound recognition processing corresponding to the second device 7020 is to be started or stopped, for example, the start/stop information transmission unit 7170 transmits function start information or function stop information to the second device 7020 so that the notification unit 7028 of the second device 7020 issues a notification about the stop of the second function.

If the second function is to be started or stopped by the device (i.e., if the second function is the function of receiving a sound executed by the sound input unit of the device or the function of transmitting sound data executed by the sound data transmission unit, the start/stop request unit 7180, which will be described later, transmits a signal for requesting a start or a stop of the second function to the device. If the second function is to be started or stopped by the device, therefore, a start request or a stop request, which will be described later, may be transmitted instead of function start information or function stop information. In other words, if the second function is to be started or stopped by the device, the start/stop request unit 7180 may perform the function of the start/stop information transmission unit 7170.

(2-2-1-8) Start/Stop Request Unit

The start/stop request unit 7180 transmits a signal for requesting a stop of a second function to the second device 7020 in accordance with a determination made by the start/stop determination unit 7160.

More specifically, if the start/stop determination unit 7160 determines that a second function relating to sound recognition processing corresponding to a certain device is to be started or stopped, and the device control system 7400 cannot stop the second function (a function to be stopped by the device), the start/stop request unit 7180 generates a start or stop request and transmits the start or stop request to the device.

(2-2-2) Second Server and Third Server

The second server 7200 is a computer including a processor, storage devices including a main storage device and an auxiliary storage device, a communication interface, and the like. The second server 7200 is communicably connected to at least the first device 7010, the third device 7030, and the first server 7100 through the network 7040.

The third server 7300 is a computer similar to the second server 7200. The second server 7200 is communicably connected to at least the second device 7020 and the first server 7100 through the network 7040.

The second server 7200 performs various processes by executing programs stored in the storage unit using the processor. The second server 7200 includes, as functional units that perform the various processes, an analysis result reception unit 7210 and a signal generation/transmission unit 7220.

The analysis result reception unit 7210 receives a result (e.g., text data) of an analysis conducted by the sound analysis unit 7120 of the first server 7100 on sound data transmitted from the first device 7010 or the third device 7030.

The signal generation/transmission unit 7220 generates and transmits a signal (instruction) on the basis of a result (text data) of an analysis received by the analysis result reception unit 7210 such that the first device 7010 or the third device 7030 that has transmitted sound data enters an operation state corresponding to the result of the analysis (e.g., if the result of the analysis is text data, "Start the operation of the air conditioner", the operation of the device that has transmitted the sound data starts.

The same holds for the third server 7300. The third server 7300 includes an analysis result reception unit 7310 and a signal generation/transmission unit 7320.

The analysis result reception unit 7310 receives a result (e.g., text data) of an analysis conducted by the sound analysis unit 7120 of the first server 7100 on sound data transmitted from the second device 7020.

The signal generation/transmission unit 7320 generates and transmits a signal (instruction) on the basis of a result (text data) of an analysis received by the analysis result reception unit 7310 such that the second device 7020 that has transmitted sound data enters an operation state corresponding to the result of the analysis (e.g., if the result of the analysis is text data, "Turn on", the device is turned on.

(3) Sound Operation for Device

A sound operation for a device will be described. The sound operation for a device can be performed when sound recognition processing corresponding to the device is executable (when functions necessary to perform the sound recognition processing have not been stopped).

Here, the sound operation for a device will be described with reference to FIG. 50 while taking a case where the first device 7010 is subjected to the sound operation as an example. A processing flow when the third device 7030 is subjected to a sound operation is the same as that performed when the first device 7010 is subjected to a sound operation except for the device involved, and description thereof is omitted.

First, it is assumed in step S1 that an instruction sound (e.g., "Start the operation of the air conditioner") is input to the sound input unit 7012 of the first device. As a result, the sound data transmission unit 7014 transmits sound data regarding the sound received by the sound input unit 7012 to the first server 7100 of the device control system 7400.

Next, in step S2, the sound data reception unit 7110 of the first server 7100 receives the sound data.

Next, in step S3, the sound data received by the sound data reception unit 7110 is stored in the sound data storage area 7194 of the storage unit 7190. The sound data stored in the sound data storage area 7194 is used for a sound analysis in a next step, namely step S4, and stored in the sound data storage area 7194 as history data regarding sound data.

Although the sound data is stored in the sound data storage area 7194 before the sound analysis of the sound data is conducted here, a result of the sound analysis may be stored in the storage unit 7190 as history data instead of, or in addition to, this operation.

Next, in step S4, the sound analysis unit 7120 conducts the sound analysis of the sound data stored in the sound data storage area 7194. The analysis result transmission unit 7130 transmits an obtained result of the sound analysis to the second server 7200.

In step S5, the analysis result reception unit 7210 of the second server 7200 receives the result of the analysis transmitted from the analysis result transmission unit 7130.

Next, in step S6, the signal generation/transmission unit 7220 generates a signal (instruction or information) on the basis of a result of an analysis (a result of an analysis indicating that the content of sound data is an instruction to start an operation) and transmits the signal to the first device 7010.

Next, in step S7, the first device 7010 receives the signal transmitted from the signal generation/transmission unit 7220 and, if the signal is an instruction, performs an operation according to the instruction.

FIG. 51 is a sequence diagram illustrating a sound operation for a device at a time when the second device 7020 is subjected to a sound operation. Although the third server 7300 is used instead of the second server 7200 here, a process is the same as when the first device 7010 is subjected to the sound operation, and description thereof is omitted.

(4) Process for Stopping Second Function Relating to Process for Recognizing Sound Corresponding to Another Device at Time When First Function Relating to Process for Recognizing Sound Corresponding to Certain Device Has Been Stopped Next, a process for stopping a second function relating to sound recognition processing corresponding to another device at a time when a first function relating to sound recognition processing corresponding to a certain device has been stopped will be described with reference to sequence diagrams of FIGS. 52 and 53.

FIG. 52 illustrates a process for stopping a second function relating to sound recognition processing corresponding to another device (a device other than the first device 7010) at a time when the function of receiving a sound executed by the sound input unit 7012 is stopped as an example of the first function relating to the sound recognition processing corresponding to the first device 7010.

It is assumed here that devices determined, on the basis of the information stored in the association information storage area 7192 of the storage unit 7190, by the identification unit 7150 to be associated with the first device 7010 include the second device 7020 but do not include the third device 7030.

It is also assumed here that the first function (i.e., the function of receiving a sound executed by the sound input unit 7012) to be stopped in the sound recognition processing corresponding to the first device 7010 and the second function relating to the sound recognition processing corresponding to the other device, the second function being to be stopped on the basis of the stop of the first function, are of the same type.

Although the first and second functions are the function of receiving a sound executed by the sound input units in the sequence diagram of FIG. 52, a processing flow is the same (except for a function to be stopped) as when the first and second functions are the function of transmitting sound data executed by the sound data transmission units.

First, it is assumed that in step S21, an instruction of the function of receiving a sound executed by the sound input unit 7012 is given to the physical switch 7011a, which is an example of the instruction reception unit.

As a result, the sound input unit 7012 of the first device 7010 no longer receives a sound (step S23). In step S23, for example, power is not supplied to electrical and electronic circuits for operating the sound input unit 7012. In step S24, the notification unit 7018 turns on the LED of the first color (e.g., a red LED) (with the LED of the second color (e.g., a blue LED) turned off) to notify the user that the sound recognition processing corresponding to the first device 7010 has been stopped.

As a result of the reception of the instruction by the switch 7011a in step S21, the first device 7010 notifies (function stop notification signal) the first server 7100 that the function of receiving a sound executed by the sound input unit 7012 has been stopped. When the first server 7100 is notified that the function has been stopped, it is preferable that not only the first server 7100 is notified that the function has been stopped but also information with which a type of function that has been stopped can be identified is transmitted. In step S22, the detection unit 7140 of the first server 7100 detects, on the basis of the signal transmitted from the first device 7010, that an instruction to stop the first function relating to the sound recognition processing corresponding to the first device 7010 has been received.

Next, in step S25, the identification unit 7150 of the first server 7100 identifies devices associated with the first device 7010 on the basis of the information stored in the association information storage area 7192 of the storage unit 7190. Here, the devices associated with the first device 7010 include the second device 7020 but do not include the third device 7030.

Next, in step S26, the start/stop determination unit 7160 determines, on the basis of results of steps S22 and S25, that at least a part (second function) of the functions relating to the sound recognition processing corresponding to the second device 7020 is to be stopped. Here, in particular, the start/stop determination unit 7160 determines that the function of receiving a sound executed by the sound input unit 7022, which is of the same type as that of the first function, is to be stopped as an example of the second function relating to the sound recognition processing corresponding to the second device 7020. The start/stop determination unit 7160 does not stop, on the other hand, any function relating to the sound recognition processing corresponding to the third device 7030.

The device control system 7400 cannot stop the function of receiving a sound executed by the sound input unit 7022 (a function to be stopped by the second device 7020). In step S27, therefore, the start/stop request unit 7180 transmits a request to stop the second function (the function of receiving a sound executed by the sound input unit 22) to the second device 7020.

If the start/stop request reception unit 7026 of the second device 7020 receives the stop request (step S28), the function of receiving a sound executed by the sound input unit 7022 is instructed to stop accordingly, and the function of receiving a sound executed by the sound input unit 7022 is stopped (step S29).

Next, in step S30, since the start/stop determination unit 7160 has determined in step S26 that the second function (the function of receiving a sound executed by the sound input unit 7022) relating to the sound recognition processing corresponding to the second device 7020 is to be stopped, the start/stop information transmission unit 7170 transmits function stop information to the second device 7020 so that the notification unit 7028 of the second device 7020 issues a notification about the stop of the second function.

If the start/stop information reception unit 7027 of the second device 7020 receives the function stop information (step S31), the notification unit 7018 turns on the LED of the first color (e.g., a red LED) (with the LED of the second color (e.g., a blue LED) turned off).

Although the first server 7100 transmits the function stop information as well as the stop request here, the transmission of the function stop information may be omitted. Upon receiving the stop request, the notification unit 7018 of the second device 7020 may turn on the LED of the first color (e.g., a red LED) (with the LED of the second color (e.g., a blue LED) turned off). In other words, the stop request may also serve as the function stop information.

A processing flow when the function of receiving a sound executed by the sound input unit 7022 is stopped in step S1 as an example of the first function relating to the sound recognition processing corresponding to the second device 7020 is the same except that the process performed by the first device 7010 is performed by the second device 7020 and the process performed by the second device 7020 is performed by the first device 7010, and description thereof is omitted. When the function of receiving a sound executed by the sound input unit is stopped in step S1 as an example of the first function relating to the sound recognition processing corresponding to the third device 7030, only the function of receiving a sound executed by the sound input unit of the third device 7030 is stopped and the first device 7010 and the second device 7020 are not particularly affected, since there is no device associated with the third device 7030 in the present embodiment.

Next, FIG. 53 illustrates a process for stopping a second function relating to sound recognition processing corresponding to another device (a device other than the first device 7010) at a time when the function of receiving, with the sound data reception unit 7110, sound data transmitted from the first device 7010 (hereinafter referred to as a first sound data reception function for the sake of simplicity of description) is stopped as an example of the first function relating to the sound recognition processing corresponding to the first device 7010.

It is assumed here that the devices determined, on the basis of the information stored in the association information storage area 7192 of the storage unit 7190, by the identification unit 7150 to be associated with the first device 7010 include the second device 7020 but do not include the third device 7030. It is also assumed here that the first function (i.e., the function of receiving first sound data) to be stopped in the sound recognition processing corresponding to the first device 7010 and the second function (hereinafter referred to as a second sound data reception function for the sake of simplicity of description) relating to the sound recognition processing corresponding to the other device, the second function being to be stopped on the basis of the stop of the first function, are of the same type.

Although the first and second functions are the function of receiving sound data with the sound data reception unit 7110 in the sequence diagram of FIG. 53, a processing flow is the same (except for a function to be stopped) as when the first and second functions are the function of analyzing sound data with the sound analysis unit 7120 or the function of accumulating sound data in the storage unit 7190.

First, it is assumed that, in step S41, an instruction to stop the function of receiving first sound achieved is given to the physical switch 7011a, which is an example of the instruction reception unit.

In step S42, the notification unit 7018 turns on the LED of the first color (e.g., a red LED) (with the LED of the second color (e.g., a blue LED) turned off) to notify the user that the first function relating to the sound recognition processing corresponding to the first device 7010 has been stopped.

As a result of the reception of the instruction by the switch 7011a in step S41, the first device 7010 notifies (function stop notification signal) the first server 7100 that the function of receiving first sound data is to be stopped (a stop of the first sound data reception function is requested). When the first server 7100 is notified that the function is to be stopped, it is preferable that not only the first server 7100 is notified that the function has been stopped but also information with which a type of function that has been stopped can be identified is transmitted. In step S43, the detection unit 7140 of the first server 7100 detects, on the basis of the signal transmitted from the first device 7010, that an instruction to stop the first function relating to the sound recognition processing corresponding to the first device 7010 has been received.

The first server 7100 gives an instruction to stop the first sound data reception function in accordance with the notification (request) about the stop of the function of receiving first sound data (step S44). As a result, the sound data reception unit 7110 no longer receives sound data transmitted from the first device 7010.

Next, in step S45, the identification unit 7150 of the first server 7100 identifies devices associated with the first device 7010 on the basis of the information stored in the association information storage area 7192 of the storage unit 7190. Here, the devices associated with the first device 7010 include the second device 7020 but do not include the third device 7030.

Next, in step S46, the start/stop determination unit 7160 determines, on the basis of results of steps S43 and S45, that at least a part (second function) of the functions relating to the sound recognition processing corresponding to the second device 7020 is to be stopped. Here, in particular, the start/stop determination unit 7160 determines that the second sound data reception function, which is of the same type as that of the first function, is to be stopped as an example of the second function relating to the sound recognition processing corresponding to the second device 7020. The start/stop determination unit 7160 does not stop, on the other hand, any function relating to the sound recognition processing corresponding to the third device 7030.

The device control system 7400 can stop the second sound data reception function. In step S47, therefore, the first server 7100 gives an instruction to stop the second sound data reception function (step S44). As a result, the sound data reception unit 7110 no longer receives sound data transmitted from the second device 20.

Next, in step S48, since the start/stop determination unit 7160 has determined in step S47 that the second function (the second sound data reception function) relating to the sound recognition processing corresponding to the second device 7020 is to be stopped, the start/stop information transmission unit 7170 transmits function stop information to the second device 7020 so that the notification unit 7028 of the second device 7020 issues a notification about the stop of the second function.

If the start/stop information reception unit 7027 of the second device 7020 receives the function stop information (step S51), the notification unit 7018 turns on the LED of the first color (e.g., a red LED) (with the LED of the second color (e.g., a blue LED) turned off) (step S52).

(5) Process for Starting (Resuming) Second Function Relating to Process for Recognizing Sound Corresponding to Another Device at Time When First Function Relating to Process for Recognizing Sound Corresponding to Certain Device Has Been Started (Resumed)

A process for starting a second function relating to sound recognition processing corresponding to another device at a time when a first function relating to sound recognition processing corresponding to a certain device has been started will be described with reference to sequence diagrams of FIGS. 54 and 55.

FIG. 54 illustrates a process for starting a second function relating to sound recognition processing corresponding to another device (a device other than the first device 7010) at a time when the function of receiving a sound executed by the sound input unit 7012 is started as an example of the first function relating to the sound recognition processing corresponding to the first device 7010.

It is assumed here that devices determined, on the basis of the information stored in the association information storage area 7192 of the storage unit 7190, by the identification unit 7150 to be associated with the first device 7010 include the second device 7020 but do not include the third device 7030. It is also assumed here that the first function (i.e., the function of receiving a sound executed by the sound input unit 7012) to be started in the sound recognition processing corresponding to the first device 7010 and the second function relating to the sound recognition processing corresponding to the other device, the second function being to be started on the basis of the start of the first function, are of the same type.

Although the sequence diagram of FIG. 54 is different from that of FIG. 52 in that the first and second functions are started in FIG. 54 whereas the first and second functions are stopped in FIG. 52, a processing flow is substantially the same. The sequence diagram of FIG. 54, therefore, is omitted here.

FIG. 55 illustrates a process for starting a second function relating to sound recognition processing corresponding to another device (a device other than the first device 7010) at a time when the function of receiving, with the sound data reception unit 7110, sound data transmitted from the first device 7010 (hereinafter referred to as a first function of receiving sound data for the sake of simplicity of description) is started as an example of the first function relating to the sound recognition processing corresponding to the first device 7010.

It is assumed here that devices determined, on the basis of the information stored in the association information storage area 7192 of the storage unit 7190, by the identification unit 7150 to be associated with the first device 7010 include the second device 7020 but do not include the third device 7030. It is also assumed here that the first function (i.e., the first sound data reception function) to be started in the sound recognition processing corresponding to the first device 7010 and the second function relating to the sound recognition processing corresponding to the other device (hereinafter referred to as a second sound data reception function for the sake of simplicity of description), the second function being to be started on the basis of the start of the first function, are of the same type.

Although the sequence diagram of FIG. 55 is different from that of FIG. 53 in that the first and second functions are started in FIG. 55 whereas the first and second functions are stopped in FIG. 53, a processing flow is substantially the same. The sequence diagram of FIG. 55, therefore, is omitted here.

(6) Characteristics (6-1)

The device control system 7400 according to the present embodiment controls the first device 7010, which is an example of a first device, and the second device 7020, which is an example of a second device. The first device 7010 includes the sound input unit 7012, which is an example of a first sound input unit, and transmits sound data regarding a sound received by the sound input unit 7012. The second device 7020 includes the sound input unit 7022, which is an example of a second sound input unit, and transmits sound data regarding a sound received by the sound input unit 7022. The device control system 7400 includes the sound data reception unit 7110, which is an example of a first sound data reception unit and a second sound data reception unit, the sound analysis unit 7120, which is an example of a first sound analysis unit and a second sound analysis unit, the detection unit 7140, and the start/stop determination unit 7160. The sound data reception unit 7110 receives sound data transmitted from the first device 7010. The sound data reception unit 7110 receives sound data transmitted from the second device 7020. The sound analysis unit 7120 analyzes sound data received by the sound data reception unit 7110. The detection unit 7140 detects that the first device 7010 has received an instruction to stop a first function, which is a part of the functions relating to the sound recognition processing corresponding to the first device 7010, in which the sound input unit 7012 receives a sound, sound data regarding the received sound is transmitted, the sound data reception unit 7110 receives the transmitted sound data, and the sound analysis unit 7120 is caused to analyze the received sound data. If the detection unit 7140 detects that the first device 7010 has received an instruction to stop the first function, the start/stop determination unit 7160 determines that a second function, which is at least a part of the functions relating to the sound recognition processing corresponding to the second device 7020, in which the sound input unit 7022 receives a sound, sound data regarding the received sound is transmitted, the sound data reception unit 7110 receives the transmitted sound data, and the sound analysis unit 7120 is caused to analyze the received sound data, is to be stopped.

In the device control system 7400, if the first device 7010 receives an instruction to stop the first function, which is at least a part of the functions relating to the sound recognition processing corresponding thereto, the second function, which is at least a part of the functions relating to the sound recognition processing corresponding to the second device 7020, is stopped. In other words, in the device control system 7400, if the user stops the sound recognition processing corresponding to the first device 7010, the sound recognition processing corresponding to the second device 7020 is also stopped. When the device control system 7400 is used, therefore, processes for recognizing a sound corresponding to a plurality of devices need not be individually stopped and can be stopped through a simple operation.

(6-2)

In the device control system 7400 according to the present embodiment, the second function is the function of receiving a sound executed by the sound input unit 7022 or the function of transmitting sound data executed by the second device 7020.

Since the second device 7020 does not transmit sound data here, problems such as those of privacy and interception of sound data that would otherwise be caused when sound data is transmitted tend to be prevented.

(6-3)

The device control system 7400 according to the present embodiment includes the start/stop request unit 7180, which is an example of a stop request unit. The start/stop request unit 7180 transmits a signal for requesting a stop of the second function to the second device 7020 in accordance with a determination made by the start/stop determination unit 7160.

Since an instruction to stop the second function in the second device 7020 is directly given to the second device 7020 here, the sound recognition processing corresponding to the second device 7020 can be reliably stopped.

(6-4)

In the device control system 7400 according to the present embodiment, the second function may be the function of receiving, with the sound data reception unit 7110, sound data transmitted from the second device 7020, the function of analyzing, with the sound analysis unit 7120, sound data transmitted from the second device 7020, or the function of accumulating sound data transmitted from the second device 7020.

Here, the sound recognition processing corresponding to the second device 7020 can be stopped only by a process performed by the device control system 7400.

(6-5)

In the device control system 7400 according to the present embodiment, the second function is of the same type as that of the first function.

When the second function and the first function are of the same type and the first function is the function of receiving a sound executed by the sound input unit 12, for example, the second function is the function of receiving a sound executed by the sound input unit 7022. When the second function and the first function are of the same type and the first function is the function of transmitting sound data executed by the first device 7010, for example, the second function is the function of transmitting sound data executed by the second device 7020. When the second function and the first function are of the same type and the first function is the function of analyzing, with the sound analysis unit 7120, sound data transmitted from the first device 7010, for example, the second function is the function of analyzing, with the sound analysis unit 7120, sound data transmitted from the second device 7020.

Here, when a function relating to the sound recognition processing corresponding to the first device 7010 has been stopped, a function of the same type relating to the sound recognition processing corresponding to the second device 7020 can also be stopped. Both the first device 7010 and the second device 7020 can therefore enter a state desired by the user in terms of the processes for recognizing a sound.

(6-6)

In the device control system 7400 according to the present embodiment, the second device 7020 includes the notification unit 7028 that issues a notification about a stop of the second function. The device control system 7400 includes the start/stop information transmission unit 7170, which is an example of a stop information transmission unit. If the start/stop determination unit 7160 determines that the second function is to be stopped, the start/stop information transmission unit 7170 transmits function stop information to the second device 7020 so that the notification unit 7028 issues a notification about the stop of the second function.

Here, if the user stops the sound recognition processing corresponding to the first device 7010, the user can understand that the sound recognition processing has also been stopped for the second device 7020.

(6-7)

The device control system 7400 according to the present embodiment includes the identification unit 7150 that identifies devices associated with the first device 7010. If the detection unit 7140 detects that the first device 7010 has received an instruction to stop the first function and the devices determined by the identification unit 7150 to be associated with the first device 7010 include the second device 7020, the start/stop determination unit 7160 determines that the second function is to be stopped for the second device 7020.

Here, the sound recognition processing corresponding to the second device 7020 associated with the first device 7010 can be stopped along with the sound recognition processing corresponding to the first device 7010. Conversely, if it is determined that the first device 7010 and the second device 7020 are not associated with each other, the sound recognition processing corresponding to the second device 7020 remains enabled even if the sound recognition processing corresponding to the first device 7010 is stopped.

(6-8)

In the device control system 7400 according to the present embodiment, an instruction to stop the first function received by the first device 7010 includes an instruction to the physical switch 7011*a*, an instruction given using the remote control 7011*b*, or a verbal instruction to the sound input unit 7012.

(6-9)

In the device control system 7400 according to the present embodiment, the detection unit 7140 detects that the first device 7010 has received an instruction to start the first function. The device control system 7400 includes the start/stop determination unit 7160, which is an example of a start determination unit. If the detection unit 7140 detects that the first device 7010 has received an instruction to start the first function, the start/stop determination unit 7160 determines that the second device 7020 is to start the second function.

Here, if the first device 7010 receives an instruction to start (resume) the first function relating to the sound recognition processing, the second function relating to the sound recognition processing corresponding to the second device 7020 is also started (resumed). In other words, with the device control system 7400, the user can enable the sound recognition processing corresponding to the second device 7020 by enabling the sound recognition processing corresponding to the first device 7010. As a result, when the device control system 7400 is used, processes for recognizing a sound corresponding to a plurality of devices need not be individually enabled and can be started through a simple operation.

(6-10)

The second device 7020 according to the present embodiment can be operated using sounds. The second device 7020 includes the sound input unit 7022, the sound data transmission unit 7024, the instruction reception units (e.g., the switch 7021a, the remote control 7021b, and the sound input unit 7022), and the start/stop information reception unit 7027, which is an example of a stop information reception unit. The sound input unit 7022 receives a sound. The sound data transmission unit 7024 transmits sound data regarding a sound received by the sound input unit 7022 to the device control system 7400 including the sound analysis unit 7120. The instruction reception unit receives an instruction to stop at least a part of the functions relating to the sound recognition processing, in which the sound input unit 7022 receives a sound, the sound data transmission unit 7024 transmits sound data, and the sound analysis unit 7120 of the device control system 7400 is caused to analyze the transmitted sound data. The start/stop information reception unit 7027 receives function stop information, which is transmitted from the device control system 7400, relating to a determination of a stop of at least a part of the functions relating to the sound recognition processing corresponding to the second device 7020 according to a stop of at least a part of functions relating to sound recognition processing corresponding to another device (e.g., the first device 7010) that can be operated using sounds.

Although not described, the same holds for the first device 7010 and the third device 7030.

In the second device 7020, the sound recognition processing corresponding to the second device 7020 can be stopped by an instruction from the user, and the sound recognition processing corresponding to the second device 7020 can be stopped in accordance with a stop of sound recognition processing corresponding to another device (e.g., the first device 7010). When the second device 7020 is used, therefore, processes for recognizing a sound corresponding to a plurality of devices need not be individually stopped and can be stopped through a simple operation.

When a function relating to sound recognition processing can be stopped using the physical switch 7021a, the reliability of the stop of the sound recognition processing can be increased (occurrence of a state in which the sound recognition processing has not been stopped can be suppressed).

(6-11)

The control method according to the present embodiment is a method for controlling the first device 7010 and the second device 7020. The first device 7010 includes the sound input unit 7012, which is an example of a first sound input unit, and the sound data transmission unit 7014, which is an example of a first sound data transmission unit. The sound data transmission unit 7014 transmits first sound data regarding a sound received by the sound input unit 7012 to the device control system 7400. The device control system 7400 includes the sound data reception unit 7110, which is an example of a first sound data reception unit that receives the first sound data, and the sound analysis unit 7120, which is an example of a first sound analysis unit that analyzes the first sound data received by the sound data reception unit 7110. The second device 7020 includes the sound input unit 7022, which is an example of a second sound input unit, and the sound data transmission unit 7024, which is an example of a second sound data transmission unit. The sound data transmission unit 7024 transmits second sound data regarding a sound received by the sound input unit 7022 to the device control system 7400. The device control system 7400 includes the sound data reception unit 7110, which is an example of a second sound data reception unit that receives second sound data, and the sound analysis unit 7120, which is an example of a second sound analysis unit that analyzes the second sound data received by the sound data reception unit 7110. The control method includes a detection step (step S22 or S42) and a determination step (step S26 or S48). In the detection step, it is detected that the first device 7010 has received an instruction to stop a first function, which is at least a part of functions relating to sound recognition processing corresponding thereto, in which the sound input unit 7012 receives a first sound, the sound data transmission unit 7014 transmits first sound data, the sound data reception unit 7110 receives the transmitted first sound data, and the sound analysis unit 7120 is caused to analyze the received first sound data. In the determination step, if it is detected that the first device 7010 has received an instruction to stop the first function, it is determined that a second function, which is at least a part of functions relating to sound recognition processing corresponding to the second device 7020, in which the sound input unit 7022 receives a second sound, the sound data transmission unit 7024 transmits second sound data, the sound data reception unit 7110 receives the transmitted second sound data, and the sound analysis unit 7120 is caused to analyze the received second sound data, is to be stopped.

In the control method, if it is detected that the first device 7010 has received an instruction to stop the first function, which is at least a part of the functions relating to the sound recognition processing corresponding thereto, it is determined that the second function, which is at least a part of the functions relating to the sound recognition processing corresponding to the second device 7020, is to be stopped, too. When the control method is used, therefore, processes for recognizing a sound corresponding to a plurality of devices need not be individually stopped and can be stopped through a simple operation.

(7) Modifications

Modifications of the above embodiment will be described hereinafter. The modifications may be combined with each other insofar as no contradictions are caused.

(7-1) Modification A

Although the device control system 7400 includes three servers (the first server 7100, the second server 7200, and the third server 7300) in the above embodiment, servers included in the device control system 7400 are not limited to these.

For example, the device control system 7400 may include a single server having the same functions as the first server 7100, the second server 7200, and the third server 7300, instead. Alternatively, for example, the device control system 7400 may include two, or four or more, servers, and these servers may be configured to have the same functions as the first server 7100, the second server 7200, and the third server 7300.

Alternatively, for example, the same functions as those of the first server 7100 may be achieved by a plurality of cooperating servers that are different from the second server 7200 and the third server 7300.

(7-2) Modification B

Although the first device 10, the second device 20, and the third device 30 are home appliances in the above embodiment, types of the first device 10, the second device 20, and the third device 30 are not limited to this. For example, the first device 10 may be a sound operation device for a home appliance, instead.

The sound operation device is a device that includes a sound input unit which receives a sound and that transmits sound data regarding the sound received by the sound input unit to the device control system 7400, receives a signal based on a result of an analysis of the sound data conducted by the device control system 7400, and controls, in accordance with the signal, the operation of a home appliance to be operated. In a specific example, the sound operation device is a sound operation device (sound remote control) for the first device 7010. The sound operation device receives an instruction sound (e.g., a sound, "Start the operation of the air conditioner") to the first device 7010 and transmits sound data regarding the received sound to the device control system 7400. The sound operation device then receives a signal based on a result of an analysis of sound data conducted by the device control system 7400 (a signal indicating that a result of an analysis indicating that the content of sound data is an instruction to start the operation of the air conditioner) and transmits, from an infrared signal transmission unit of the sound operation device, an instruction signal for starting the operation to the air conditioner to be operated.

Alternatively, for example, the sound operation device may include a sound input unit that receives a sound and control an operation target by transmitting sound data regarding the sound received by the sound input unit to the device control system 7400 and causing the device control system 7400 to transmit a signal based on a result of an analysis of the sound data to the operation target connected through the network 7040.

(7-3) Modification C

Although the sound data reception unit 7110 functions as the first sound data reception unit and the second sound data reception unit and the sound analysis unit 7120 functions as the first sound analysis unit and the second sound analysis unit in the above embodiment, the functions of the sound data reception unit 7110 and the sound analysis unit 7120 are not limited to these.

For example, the first sound data reception unit that receives sound data transmitted from the first device 7010 and the third device 7030 and the first sound analysis unit that analyzes the sound data received by the first sound data reception unit may be provided for the second server and the second sound data reception unit that receives sound data transmitted from the second device 7020 and the second sound analysis unit that analyzes the sound data received by the second sound data reception unit may be provided for the third server, instead of providing the sound data reception unit 7110 and the sound analysis unit 7120 for the first server 7100.

Although the embodiment and the modifications have been described above, it should be understood that modes and details may be modified in various ways without deviating from the spirit and the scope described in the claims.

INDUSTRIAL APPLICABILITY

The present disclosure can be widely applied to a device control system that controls a plurality of devices that can be operated using sounds, the devices that are controlled by the device control system and that can be operated using sounds, and a method for controlling these devices and is effective.

REFERENCE SIGNS LIST

[First Configuration]
1001 device control system (control system)
1005 user
1010 first-type device (control device)
1020 second-type device (control device)
1060 sound input reception unit
1070 infrared output apparatus
1100 server
1104T specific control storage section
1110 sound input analysis section
1120 control content identification section
1130 first control section (control section)
1135 second control section (control section)
1400 setting facilitation apparatus
1410 keyword input reception section
1420 control command selection section
1430 specific control registration section
G edit screen
GK keyword image
GO control command image
K keyword
O control command
NW network
P setting facilitation program
[Second Configuration]
2011 text extraction unit
2012 sound recognition dictionary
2013 interpretation unit
2014 control unit
2016 device information obtaining unit
2017 storage unit
2018 calculation unit
2019 authentication unit
2040 server
2050 network
2060 building
2061 router
2062 air conditioner
2063 sound input/output apparatus
2064 sound input unit
2065 sound output unit
2069 reference environment sensor
2090 environment control system
2091 air conditioner
2092 fan
2093 humidifier
2094 power window
2095 lighting device
2096 curtain device
2097 electric aroma diffuser
2099 target environment sensor
RS reference space
TS target space
[Third Configuration]
3001 air conditioning system
3005a user (speaker)
3005b user (speaker)
3020 air conditioner (air conditioning apparatus)
3020P information processing unit
3021 input unit
3022 output unit 3023 communication unit
3024 storage unit
3025 processing unit
3025A conditioned-air output section
3025B sound detection section
3025C specific control section
3025D position identification section
3025E sentence output instruction section
3060 sound input apparatus
30100 server (information processing apparatus)
3100A first server (first information processing apparatus)
3101 input unit
3102 output unit
3103 communication unit
3104 storage unit
3104D anger category DB (anger category storage unit)
3110 sound input analysis section
3125 state determination section
3200A second server (second information processing apparatus)
NW network
[Fourth Configuration]
4011 text extraction unit
4012 sound recognition dictionary
4013 interpretation unit
4014 control unit
4015 user identification unit
4016 storage unit
4040 server
4050 network
4060 building
4061 router
4062 air conditioner (indoor environment control device)
4063 sound input/output apparatus
4064 sound input unit
4065 sound output unit
4070 outdoor unit
4080 indoor unit
4090 indoor environment control system
[Fifth Configuration]
5011 text extraction unit
5012 sound recognition dictionary
5013 interpretation unit
5014 control unit
5015 state extraction unit
5016 state extraction dictionary
5017 determination unit
5018 storage unit
5030 power company
5031 power management apparatus
5040 server
5050 network
5060A, 5060B property
5061 controller
5062 air conditioner
5063 sound input/output apparatus
5064 sound input unit
5065 sound output unit
5066 lighting device
5067 fan
5068 wattmeter
5090 air conditioning management system
[Sixth Configuration]
6011 text extraction unit
6013 interpretation unit
6014 control unit
6015 clock unit
6016 recording unit
6017 pattern extraction unit
6018 prediction unit
6019 context unit
6040 server
6050 network
6060 building
6061 router
6063 sound input/output apparatus
6064 sound input unit
6065 sound output unit
6071 air conditioner
6072 bathroom water heater
6073 television
6074 lighting device
6075 wearable terminal
6076 cooking device
6077 refrigerator
6090 home system
[Seventh Configuration]
7010 first device (device)
7011a switch (physical switch, instruction reception unit)
7011b remote control (remote controller, instruction reception unit)
7012 sound input unit (first sound input unit, instruction reception unit)
7014 sound data transmission unit (first sound data transmission unit)
7016 start/stop request reception unit (stop information reception unit)
7017 start/stop information reception unit (stop information reception unit)
7018 notification unit
7020 second device (device)
7021a switch (physical switch, instruction reception unit)
7021b remote control (remote controller, instruction reception unit)
7022 sound input unit (second sound input unit, instruction reception unit)
7024 sound data transmission unit (second sound data transmission unit)
7026 start/stop request reception unit (stop information reception unit)
7027 start/stop information reception unit (stop information reception unit)
7028 notification unit
7110 sound data reception unit (first sound data reception unit, second sound data reception unit)
7120 sound analysis unit (first sound analysis unit, second sound analysis unit)
7140 detection unit
7150 identification unit
7160 start/stop determination unit (stop determination unit, start determination unit)
7170 start/stop information transmission unit (stop information transmission unit)
7180 start/stop request unit (stop request unit)
7400 device control system
S22, S42 detection step
S26, S48 determination step

CITATION LIST

Patent Literature

[PTL 1] Japanese Unexamined Patent Application Publication No. 2006-308848
[PTL 2] Japanese Patent No. 2552744
[PTL 3] Japanese Unexamined Patent Application Publication No. 2006-320621
[PTL 4] Japanese Unexamined Patent Application Publication No. 2001-324202
[PTL 5] International Publication No. 2012/176690
[PTL 6] Japanese Unexamined Patent Application Publication No. 2009-290967
[PTL 7] Japanese Unexamined Patent Application Publication No. 2010-181064

The invention claimed is:

1. A setting facilitation apparatus that is used for a control system including a sound input reception unit which receives an input of a sound uttered by a user, a sound input analysis section which analyzes the sound, a control section which controls a plurality of control devices on a basis of a result of the analysis conducted by the sound input analysis section, and a specific control storage section which stores an input of a sound corresponding to a certain keyword and a certain type of control performed on the control device as specific control while associating the input of the sound and the certain type of control with each other, the setting facilitation apparatus facilitating setting of the specific control, the setting facilitation apparatus comprising:
a keyword input reception section that receives an input of information corresponding to the keyword from the user;
a control command selection section that displays a certain control command to the plurality of control devices on an edit screen and that receives selection of the control command from the user; and
a specific control registration section that registers the keyword input by the user via the keyword input reception section and the control command selected by the user via the control command selection section to the specific control storage section while associating the keyword and the control command with each other in accordance with instructions by the user,
the specific control registration section being configured to display on the edit screen the keyword, the control command, and a sign indicating association of the keyword with the control command,
the control section being configured to transmit a signal to at least part of the plurality of control devices via a network and a server.

2. An environment control system that adjusts an environment using a target environment control device provided in a target space, the environment control system comprising:
a device information obtaining unit that obtains information regarding the target environment control device;
a storage unit that stores a state of an environment to be achieved;
a calculation unit that calculates a control parameter of the target environment control device for achieving the state of the environment; and
a control unit that controls the target environment control device on a basis of the control parameter,
the state of the environment being calculated by the calculation unit based on information obtained by the device information obtaining unit from a reference environment control device or a reference environment sensor provided in a reference space, which is different from the target space,
the storage unit being configured to update the state of the environment to a value calculated by the calculation unit based on information obtained by the device information obtaining unit from the target environment control device or a target environment sensor provided in the target space.

3. An air conditioning system comprising:
a conditioned-air blowout section that blows out conditioned air to a target space;
a sound detection section for detecting a sound uttered by a speaker present in the target space;
a sound input analysis section that analyzes an input of the sound and converts the input of the sound into verbal information;
a determination section that determines whether the verbal information obtained as a result of the analysis conducted by the sound input analysis section includes a certain anger term, and
a control section that controls a state of the conditioned air if the determination section determines that the verbal information includes the anger term.

4. An indoor environment control system comprising:
a storage unit that stores a set value of an indoor environment, the stored set value being associated with a user;
a detection unit that detects a state value of the indoor environment;
a user identification unit configured to identify the user based on a voice print analysis;
an indoor environment control device that adjusts the indoor environment in accordance with the set value associated with the user identified by the user identification unit;
a sound output unit that outputs an audible message for asking the user whether to accept the state value if the state value detected by the detection unit reaches the set value; and
a sound input unit that obtains an audible answer of the user to the message.

5. An air conditioning management system comprising:
an air conditioner;
a sound input unit that obtains a sound uttered by a user;
a state extraction unit that extracts a state of the user from the sound;
a determination unit that determines whether to perform an energy-saving operation on a basis of the state of the user;
a control unit that performs the energy-saving operation in accordance with the determination made by the determination unit, and
an input/output interface unit configured to communicate with a power management apparatus of a power company,
the energy-saving operation including responding with acceptance to a suppression request from the power company.

6. A home system comprising:
an input unit that receives an instruction from a user;
a clock unit that obtains a time point;
a recording unit that records a log in which the time point and the instruction are associated with each other;
a control unit that controls a plurality of devices in accordance with the instruction;

a pattern extraction unit that, by analyzing the log, extracts a sequential instruction pattern including a plurality of the instructions given to the plurality of devices within a certain time difference, and an output unit that audibly outputs a message to the user based on the sequential instruction pattern extracted by the pattern extraction unit, the message being output to the user to prompt the user for the instruction.

7. A device control system that controls a first device which includes a first sound input unit and which transmits sound data regarding a sound received by the first sound input unit and a second device which includes a second sound input unit and which transmits sound data regarding a sound received by the second sound input unit, the device control system comprising:

a first sound data reception unit that receives the sound data transmitted from the first device;

a second sound data reception unit that receives the sound data transmitted from the second device;

a first sound analysis unit that analyzes the sound data received by the first sound data reception unit;

a second sound analysis unit that analyzes the sound data received by the second sound data reception unit;

a detection unit that detects that the first device has received an instruction to stop a first function, which is at least a part of functions relating to sound recognition processing, in which the first sound input unit receives a sound, sound data regarding the received sound is transmitted, the first sound data reception unit receives the transmitted sound data, and the first sound analysis unit is caused to analyze the received sound data; and a stop determination unit that, if the detection unit detects that the first device has received the instruction to stop the first function, determines to stop a second function, the second function being at least a part of functions relating to sound recognition processing corresponding to the second device, in which the second sound input unit receives a sound, sound data regarding the received sound is transmitted, the second sound data reception unit receives the transmitted sound data, and the second sound analysis unit is caused to analyze the received sound data.

* * * * *